(12) United States Patent
Kamio et al.

(10) Patent No.: US 8,310,471 B2
(45) Date of Patent: Nov. 13, 2012

(54) DISPLAY APPARATUS AND METHOD FOR DRIVING THE SAME

(75) Inventors: Tomomi Kamio, Tokyo (JP); Takahiro Harada, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 502 days.

(21) Appl. No.: 12/498,961

(22) Filed: Jul. 7, 2009

(65) Prior Publication Data

US 2010/0171769 A1 Jul. 8, 2010

(30) Foreign Application Priority Data

Jul. 8, 2008 (JP) .................................. 2008-178131
Aug. 26, 2008 (JP) .................................. 2008-216105
Aug. 26, 2008 (JP) .................................. 2008-216106

(51) Int. Cl.
G06F 3/038 (2006.01)
G09G 5/00 (2006.01)
(52) U.S. Cl. ......................................... 345/204; 345/87
(58) Field of Classification Search .................... None
See application file for complete search history.

(56) References Cited

U.S. PATENT DOCUMENTS

| | | | |
|---|---|---|---|
| 4,931,787 A | 6/1990 | Shannon | |
| 5,448,258 A | 9/1995 | Edwards | |
| 2005/0001805 A1 | 1/2005 | Jeon et al. | |
| 2005/0200788 A1 | 9/2005 | Edwards | |
| 2006/0158408 A1 | 7/2006 | Hirose | |
| 2007/0105318 A1 | 5/2007 | Jeon et al. | |
| 2007/0159444 A1* | 7/2007 | Liu et al. | 345/100 |
| 2008/0018585 A1* | 1/2008 | Lee et al. | 345/100 |
| 2008/0048963 A1 | 2/2008 | Hsu | |
| 2008/0074369 A1 | 3/2008 | Hsu | |
| 2008/0198290 A1* | 8/2008 | Su et al. | 349/48 |
| 2008/0238817 A1 | 10/2008 | Mamba et al. | |

FOREIGN PATENT DOCUMENTS

| | | |
|---|---|---|
| JP | S63-311388 A | 12/1988 |
| JP | H2-044723 U | 3/1990 |
| JP | H3-53218 A | 3/1991 |
| JP | H5-188395 A | 7/1993 |

(Continued)

OTHER PUBLICATIONS

Korean Office Action dated Jan. 19, 2011, in a counterpart Korean patent application No. 10-2009-0061611.

(Continued)

*Primary Examiner* — Amare Mengistu
*Assistant Examiner* — Antonio Xavier
(74) *Attorney, Agent, or Firm* — Chen Yoshimura LLP

(57) ABSTRACT

A display apparatus includes a first scanning line disposed in a first direction, a second scanning line disposed to accompany the first scanning line, and a first signal line crossing the first and second scanning lines. The display apparatus also includes a first pixel electrode connected to the first signal line via a first switching element having a terminal that is connected to the first scanning line so that the first pixel electrode is applied with a gray scale signal under control of the first switching element, and a second pixel electrode connected to the first pixel electrode via a second switching element having a terminal that is connected to the second scanning line so that the second pixel electrode is applied with a gray scale signal through the first pixel electrode under control of the first switching element and the second switching element.

13 Claims, 29 Drawing Sheets

FOREIGN PATENT DOCUMENTS

| | | | |
|---|---|---|---|
| JP | H5-265045 A | 10/1993 | |
| JP | H6-214214 A | 8/1994 | |
| JP | 2003-255911 A | 9/2003 | |
| JP | 2004-334216 A | 11/2004 | |
| JP | 2006-500617 A | 1/2006 | |
| JP | 2006-201315 A | 8/2006 | |
| JP | 2008-52244 A | 3/2008 | |
| JP | 2008-241829 A | 10/2008 | |
| KR | 20050057537 A | 6/2005 | |
| WO | 2004/027748 A1 | 4/2004 | |

OTHER PUBLICATIONS

Japanese Office Action dated Apr. 20, 2010, in a counterpart Japanese patent application of Application No. 2008-178131.

Chinese Office Action in a counterpart application No. 200910140178.5, dated Mar. 31, 2011.

Japanese Office Action dated Jun. 29, 2010, in a counterpart Japanese Patent Application No. JP2008-216105.

Japanese Office Action dated Jun. 29, 2010, in a counterpart Japanese Patent Application No. JP2008-216106.

Japanese Office Action in a counterpart application No. 2010-119018, dated Jun. 21, 2011.

Japanese Office Action in a counterpart application No. 2010-119019, dated Jun. 21, 2011.

Japanese Office Action in a counterpart application No. 2008-178131, dated May 31, 2011.

Japanese Office Action dated Jul. 3, 2012, in a counterpart Japanese patent application No. 2008-178131.

Japanese Office Action dated Jul. 24, 2012 in a counterpart Japanese patent application No. 2010-119018.

Japanese Office Action dated Jul. 24, 2012, in a counterpart Japanese patent application No. 2010-119019.

* cited by examiner

DISPLAY APPARATUS AND METHOD FOR DRIVING THE SAME

CROSS-REFERENCE TO RELATED APPLICATIONS

This application is based upon and claims the benefit of priority from the prior Japanese Patent Application No. 2008-178131, filed Jul. 8, 2008, Japanese Patent Application No. 2008-216105, filed Aug. 26, 2008, and Japanese Patent Application No. 2008-216106, filed August 26, all of which are hereby incorporated by reference in their entireties.

BACKGROUND OF THE INVENTION

1. Field of the Invention

The invention relates to a display apparatus for an active matrix type and a method for driving a display apparatus.

2. Description of the Related Art

In an active matrix type liquid crystal display (LCD) apparatus, a plurality of scanning lines is arranged in rows of a display, and a plurality of signal lines is arranged in columns. Each pixel is located among two scanning lines and two signal lines, and an image is displayed by applying desired voltages to the pixels. In conventional display apparatus, one signal line is required for each column of the pixels, and one scanning line is required for each row of the pixels. Therefore, the number of output terminals of source drivers for driving the signal lines (the number of terminals for connecting to the signal lines) is required to be the same as the number of the signal lines. Similarly, the number of output terminals of gate drivers for driving the scanning lines (the number of terminals for connecting to the scanning lines) is also required to be the same as the number of the scanning lines.

As a scheme for reducing the total number of output terminals (the number of connecting terminals), for example, a method is disclosed in Japanese Patent Application Laid Open JP2006-201315. In Japanese Patent Application Laid Open JP2006-201315, two TFTs are disposed across one signal line, and one of the TFTs is connected to a first scanning line and the other one of the TFTs is connected to a second scanning line. That technique also utilizes an image output circuit for applying image signals for four pixels, and has a first switching element and a second switching element for switching the image signals that are applied to a signal line. The first switching element and the second switching element can be alternately turned on by control signals from a first control line and a second control line, respectively. Thus, two pixels can be controlled by one signal line using two TFTs. As a result, the number of scanning lines is increased twice as much, and the number of signal lines is reduced to half. Therefore, when the number of rows is small and the number of columns is large, this technique can decrease the total number of output terminals.

However, in the method disclosed in Japanese Patent Application Laid Open JP2006-201315, although the number of signal lines may be reduced to half with respect to the number of pixels in each row as described above, the number of scanning lines is increased two-fold with respect to the number of pixels in each column. Thus, the total number of output terminals (the number of connecting terminals) cannot always be decreased.

SUMMARY OF THE INVENTION

The present invention has been devised in view of the above-describe situation, and aims to provide a display apparatus and a method for driving a display apparatus, in which the number of signal lines can be reduced while the number of scanning lines is not substantially increased.

In an exemplary embodiment of an aspect of display apparatuses in accordance with the invention, a display apparatus includes a first scanning line disposed in a first direction, a second scanning line disposed to accompany the first scanning line, and a first signal line crossing the first and second scanning lines. The display apparatus also includes a first pixel electrode connected to the first signal line via a first switching element having a terminal that is connected to the first scanning line so that the first pixel electrode is applied with a gray scale signal under control of the first switching element, and a second pixel electrode connected to the first pixel electrode via a second switching element having a terminal that is connected to the second scanning line so that the second pixel electrode is applied with a gray scale signal under control of the first switching element and the second switching element.

In an exemplary embodiment of another aspect of display apparatuses in accordance with the invention, a display apparatus includes a first pixel located adjacent to an intersection of a scanning line and a signal line, and a second pixel applied with a gray scale signal applied to the signal line via the first pixel. The first pixel is connected to the second pixel via a first switching element that is connected to the scanning line intersecting with the signal line, and is connected to the signal line via a second switching element that is connected to a different scanning line from the scanning line connected to the first switching element.

In an exemplary embodiment of another aspect of display apparatuses in accordance with the invention, a display apparatus includes a first pixel located adjacent to an intersection of a scanning line and a signal line, and a second pixel applied with a gray scale signal applied to the signal line via the first pixel. The first pixel is connected to the signal line via a first switching element that is connected to the scanning line intersecting with the signal line, and is connected to the second pixel via a second switching element that is connected to a different scanning line from the scanning line connected to the first switching element.

In another aspect, the present invention provides a display device in which at least two pixel columns are assigned to one signal line, the display device including a signal line assigned with at least two pixel columns, a first connecting control means for electrically connecting and disconnecting a prescribed pixel belonging to one of the two pixel columns and a prescribed pixel belonging to the other one of the two pixel columns, and a second connecting control means for electrically connecting and disconnecting said signal line and said prescribed pixel belonging to the one of the two pixel columns. The display apparatus also includes a gray scale signal applying means configured to apply a gray scale signal for said prescribed pixel belonging to the one of the pixel columns to the signal line when the first connecting means disconnects the respective prescribed pixels of the two pixel columns, the gray scale signal applying means being configured to apply a gray scale signal for said prescribed pixel belonging to the other one of the two pixel columns to the signal line when the first connecting means connects the respective prescribed pixels of the two pixel columns.

In an exemplary embodiment of another aspect of display apparatuses in accordance with the invention, a display apparatus includes a first pixel having a first electrode located adjacent to an intersection of a scanning line and a signal line; a second pixel having a second electrode applied with a gray scale signal applied to the signal line via the first pixel; a third pixel having a third electrode applied with a gray scale signal applied to the signal line via the first and second pixels in series; a first switching element switching on and off between the signal line and the first electrode; a second switching element switching on and off between the first electrode and the second electrode; and a third switching element switching on and off between the second electrode and the third electrode.

In an exemplary embodiment of another aspect of display apparatuses in accordance with the invention, a display apparatus includes first and second scanning lines disposed in a prescribed direction, and a first signal line crossing the first and second scanning lines. The display apparatus also includes a first pixel electrode connected to the first signal line via a first TFT transistor having a gate electrode connected to the first scanning line and applied with a gray scale signal under control of the first TFT transistor, and a second pixel electrode connected to the first pixel electrode via a second switching element having a gate electrode connected to the second scanning line and applied with a gray scale signal under control of the first and second TFT transistors.

In an exemplary embodiment of an aspect of a method for driving a display apparatus in accordance with the invention, a method includes: a first writing step for writing a first gray scale signal onto a first pixel and at the same time writing the first gray scale signal onto a second pixel through the first pixel; a disconnecting step for electrically disconnecting the first pixel from the second pixels while maintaining the first gray scale signal at the second pixel that has been written thereto in the first storing step; and a second writing step for writing a second gray scale signal onto the first pixel after electrically disconnecting the first pixel from the second pixel in the disconnecting step.

In another aspect, the present invention provides a method for driving a display apparatus in which two columns of pixels are assigned to one signal line, a method including a first connecting control step for electrically connecting or disconnecting a prescribed pixel belong to one of the two pixel columns and a prescribed pixel belong to the other one of the two pixel columns; a second connecting control step for electrically connecting or disconnecting the signal line and said prescribed pixel belonging to said one of the two pixel columns; and a gray scale signal applying step for applying a gray scale signal for said prescribed pixel belonging to the one of the two pixel columns to the signal line when the first connecting control step disconnects the respective prescribed pixels of the two pixel columns, and applying a gray scale signal for the prescribed pixel belonging to the other one of the two pixel columns when the first connecting control step connects the respective prescribed pixels of the two pixel columns.

In another aspect, the present invention provides a method for driving a display apparatus in which two pixel columns are assigned to one signal line, the method including applying a gray scale signal on the signal line for a pixel in one of the two pixel columns to said pixel in said one of the two pixel columns and to another pixel in the other one of the two pixel columns at the same time; disconnecting said pixel in said one of the two pixel columns and said another pixel in the other one of the two pixel columns; and thereafter applying a gray scale signal on the signal line for the another pixel in the other one of the two pixel columns to said another pixel.

According to the above-described invention, the number of scanning lines is not substantially increased and the number of signal lines can be decreased.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Exemplary embodiments of the invention will now be described with reference to the figures.

First Embodiment

Figure 1:
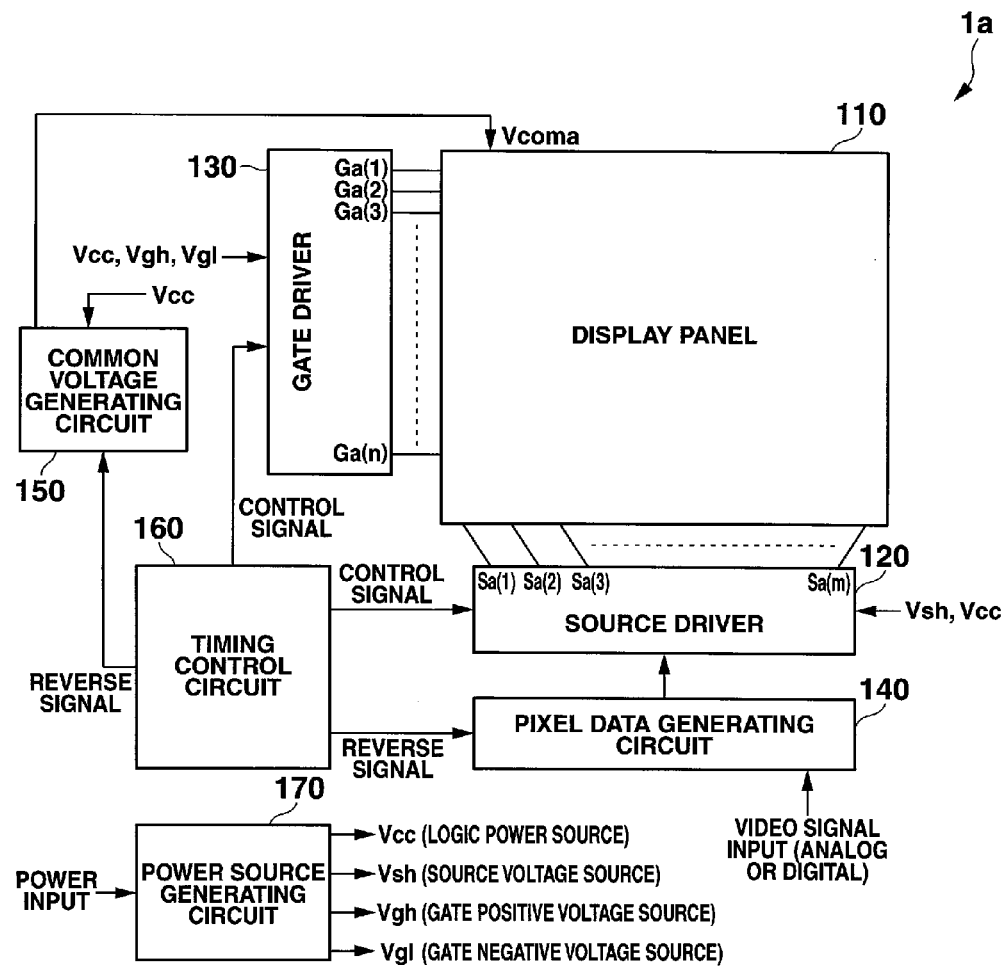
FIG. 1 is a block diagram showing a schematic whole structure of a display apparatus of a first exemplary embodiment.

A schematic whole structure of a display apparatus 1a in a first exemplary embodiment of the present invention is shown in FIG. 1. The display apparatus 1a is an LCD apparatus that includes a display panel 110, a source driver 120, a gate driver 130, a pixel data generating circuit 140, a common-voltage generating circuit 150, a timing control circuit 160 and a power source generating circuit 170.

Figure 2:
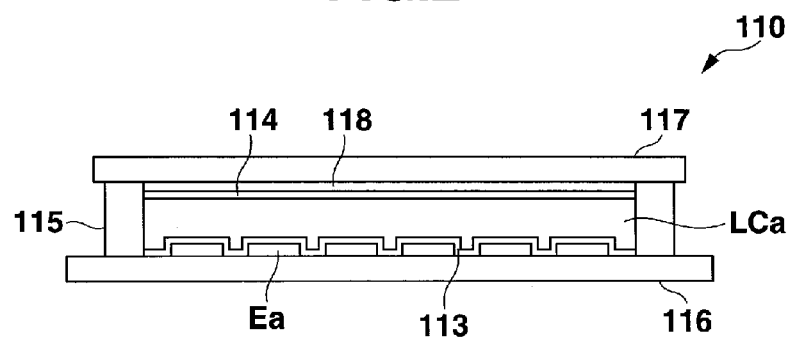
FIG. 2 is a figure showing a cross-section structure of a display panel of the first exemplary embodiment.

The display panel 110 includes two transparent substrates 116, 117 located opposite with respect to each other and a liquid crystal LCa sandwiched between the transparent substrates 116 and 117 that are bonded by a sealing material 115 as shown in FIG. 2. On substrate 116, a plurality of scanning lines Ga (for instance, scanning lines of n lines) is formed so as to extend in the row direction and a plurality of signal lines Sa (for instance, signal lines of m lines) is formed so as to extend in the column direction. On the transparent plate 116, a plurality of pixel electrodes Ea is formed in matrix so as to correspond to respective pixels Pa, and a plurality of thin film transistors (TFTs) is formed to connect the respective source electrode to the corresponding pixel electrode Ea. On the other substrate 117, a common electrode 118 is formed to face each pixel electrode Ea so that the common electrode 118 establishes a common potential for each pixel Pa. On the pixel electrode Ea and the common electrode 118, respectively, alignment films 113 and 114 are formed, which determine an initial alignment of the liquid crystal.

Figure 3:
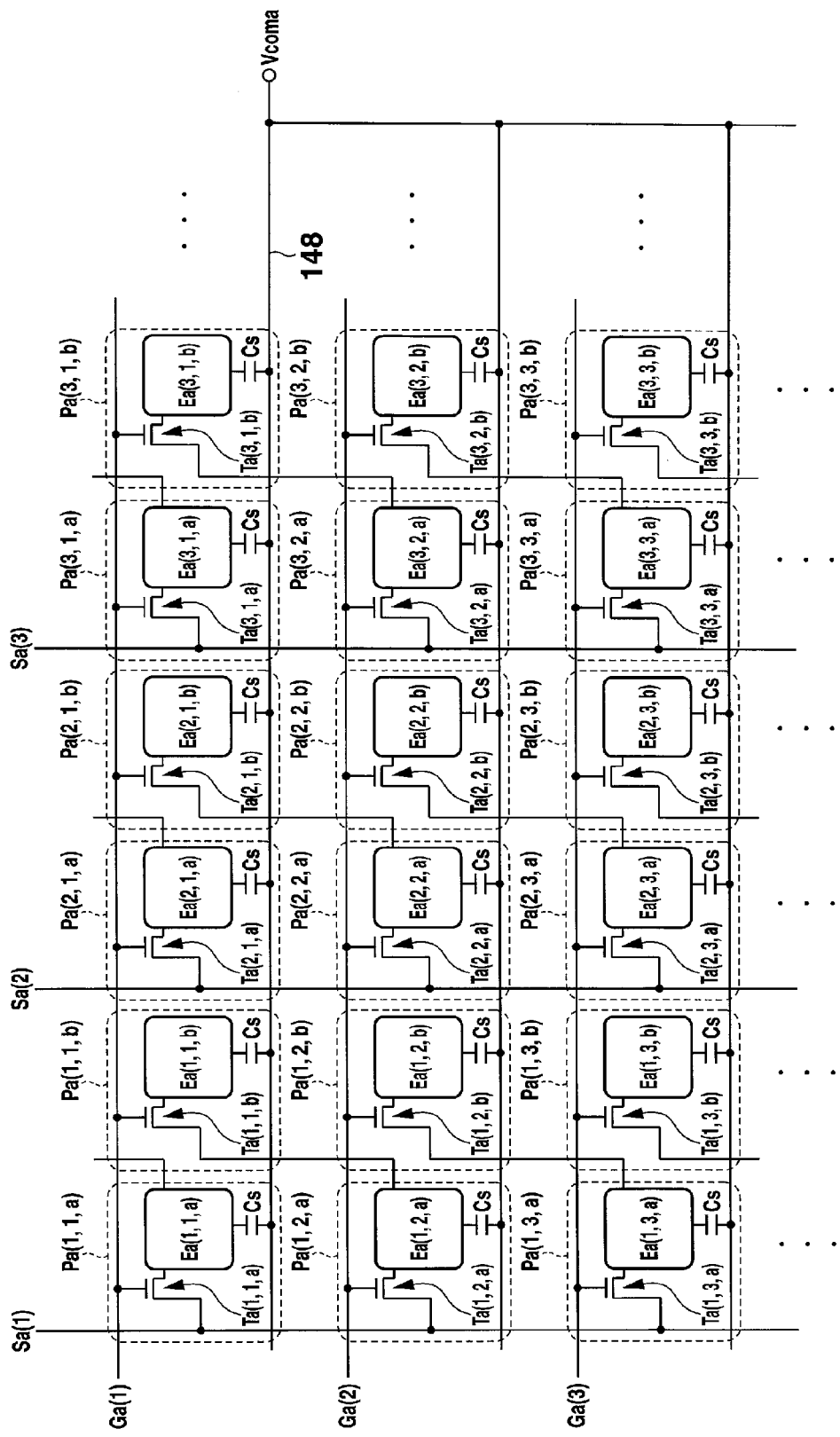
FIG. 3 is a figure showing a pixel location in the display apparatus of the first exemplary embodiment.
Figure 4:
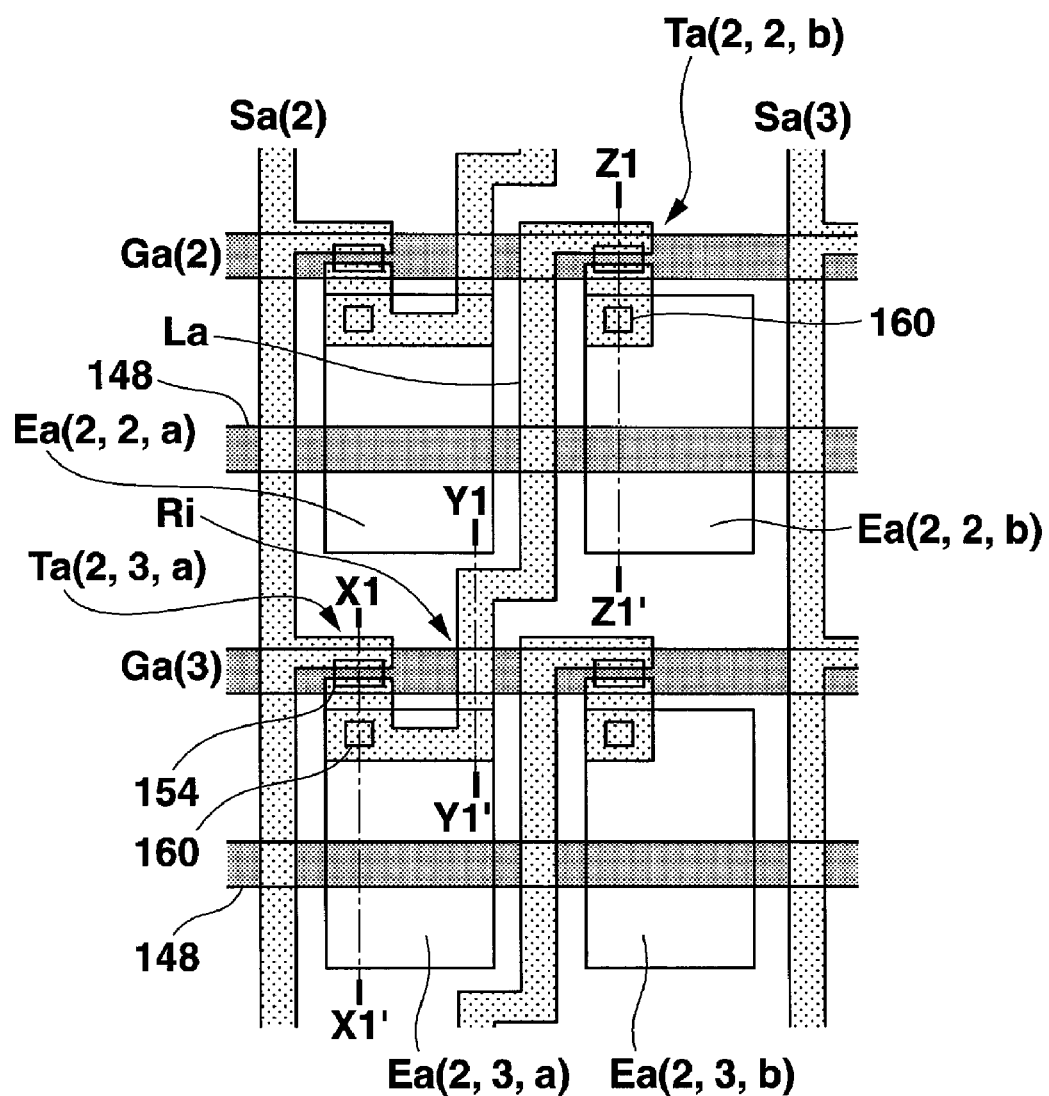
FIG. 4 is a top view depicting a pixel structure in the display apparatus of the first exemplary embodiment.
Figure 5:
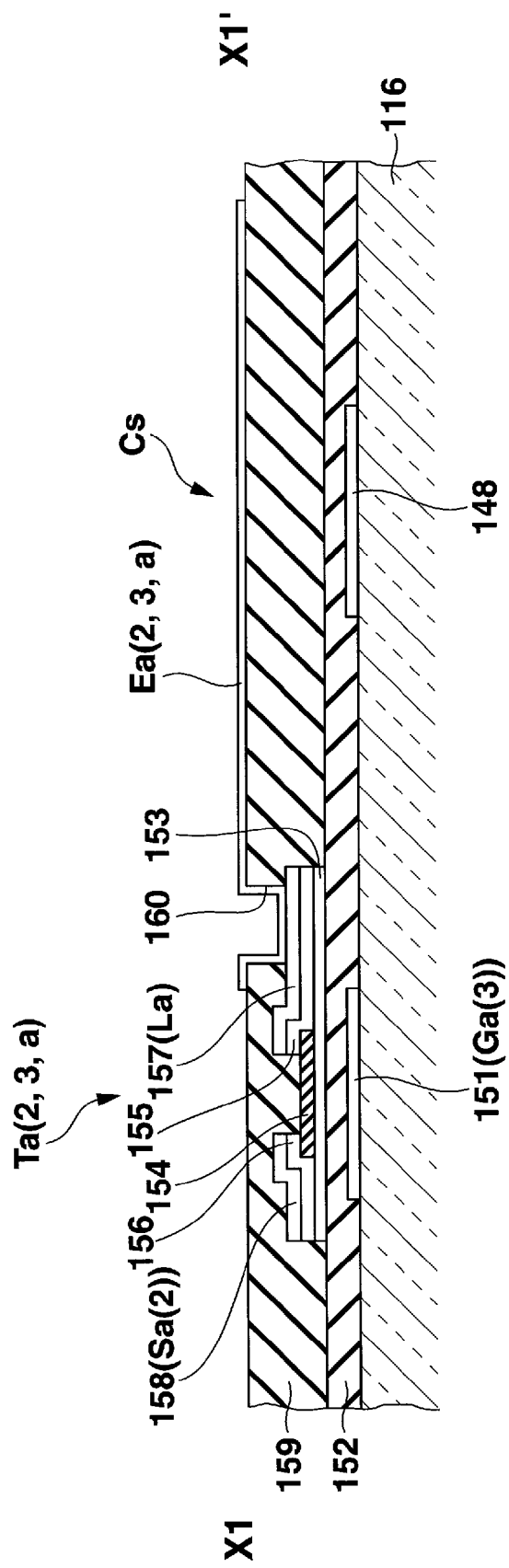
FIG. 5 is a cross-section view depicting the pixel structure in the display apparatus of the first exemplary embodiment and depicting a cross-section view of a line X1-X1' shown in FIG. 4.
Figure 6:
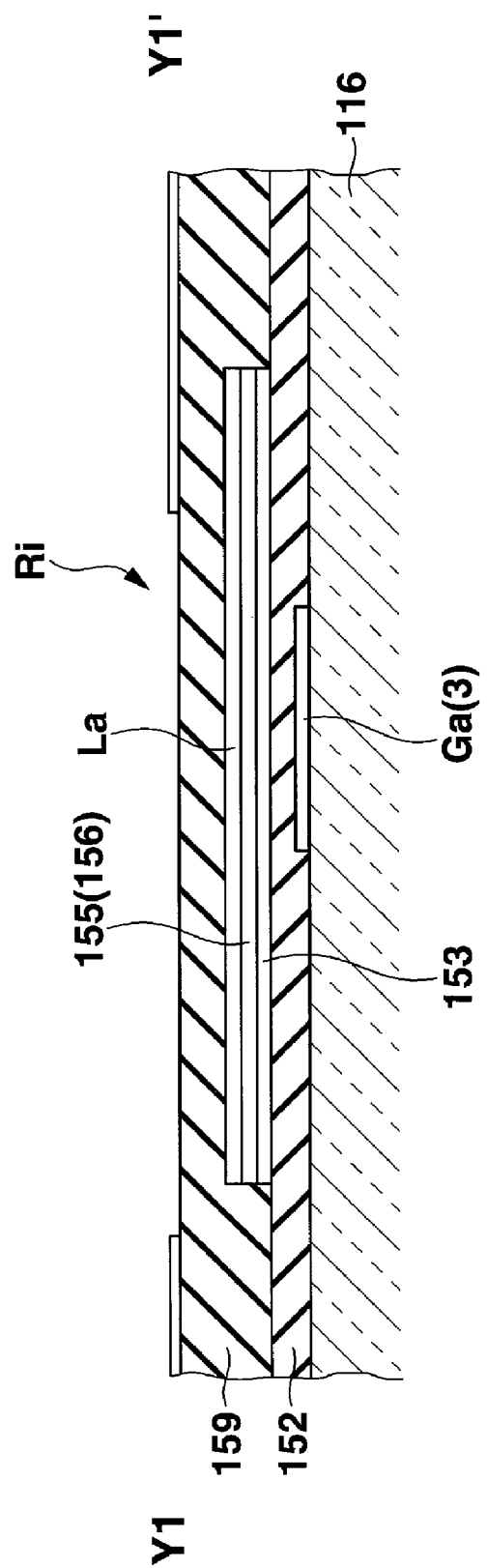
FIG. 6 is a cross-section view depicting the pixel structure in the display apparatus of the first exemplary embodiment and depicting a cross-section view of a line Y-Y1' shown in FIG. 4.
Figure 7:
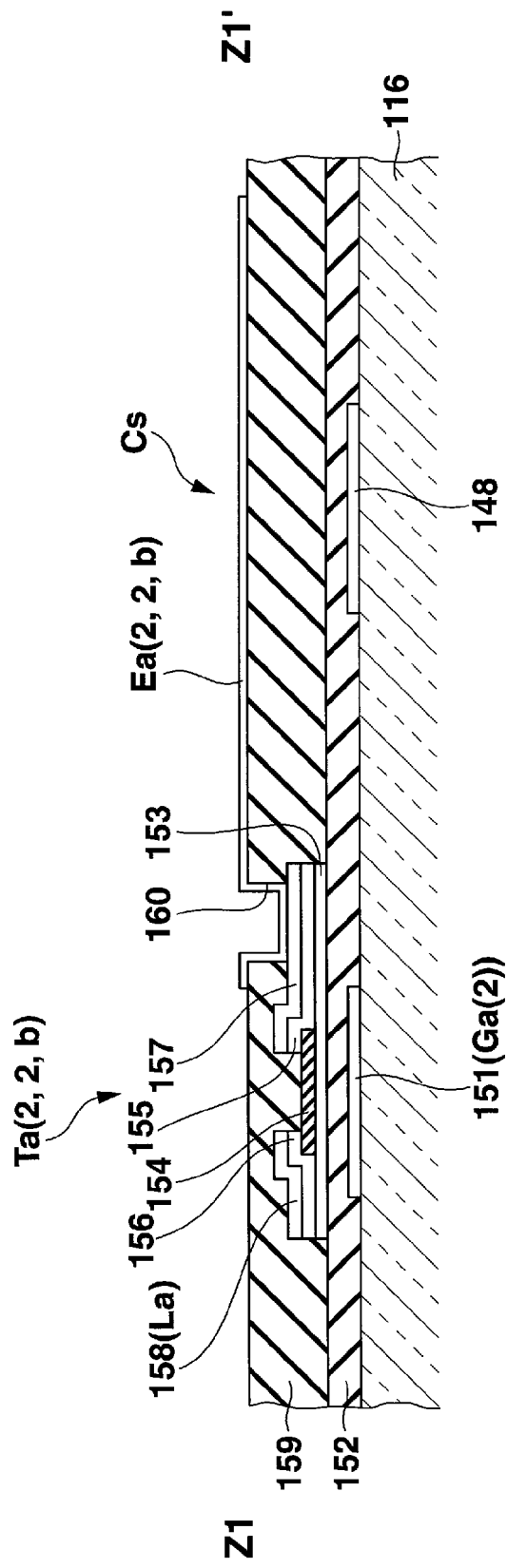
FIG. 7 is a cross-section view depicting the pixel structure in the display apparatus of the first exemplary embodiment and depicting a cross-section view of a line Z1-Z1' shown in FIG. 4.

As shown in FIG. 3, an the display panel 110, a plurality of scanning lines Ga(j) is disposed so as to extend in rows, and a plurality of signal lines Sa(i) is disposed so as to extend in columns so that the they intersect with each other (in substantially perpendicularly in case of FIG. 3). In connection with each of intersection (i, j) formed by the scanning line Ga (j) and the signal line Sa (i), a first pixel Pa (i, j, a) and a second pixel Pa (i, j, b) are provided adjacent to the intersection in the extending direction of the scanning lines. The first pixel Pa (i, j, a) includes a first pixel electrode Ea (i, j, a) that is connected to two thin film transistors, and the second pixel Pa (i, j, b) includes a second pixel electrode Ea (i, j, b) that is connected to one thin film transistor. Therefore, with respect to each row of pixels in the display panel 110, the first pixel Pa (i, j, a) and the second pixel Pa (i, j, b) alternately appear. With respect to each column of pixels, either first pixels Pa (i, j, a) or second pixels Pa (i, j, b) alone appear in this particular example. Here, i=1, 2, ..., m, and j=1, 2, ..., n.

The first pixel electrode Ea (i, j, a) and a first thin film transistor Ta (i, j, a) are formed in the first pixel Pa (i, j, a), and the first pixel electrode Ea (i, j, a) is connected to a source electrode (or drain electrode; they may be interchangeable) of the first thin film transistor Ta (i, j, a). Of the first thin film transistor Ta (i, j, a), the gate electrode is connected to the scanning line Ga (j) and the drain electrode is connected to the signal line Sa (i). The second pixel electrode Ea (i, j, b) and a second thin film transistor Ta (i, j, b) are formed in the second pixel Pa (i, j, a), and the second pixel electrode Ea (i, j, b) is connected to a source electrode of the second thin film transistor Ta (i, j, b). Of the second thin film transistor Ta (i, j, b), the gate electrode is connected to the scanning line Ga (j), and the drain electrode is connected to a first pixel electrode of the next row Ea (i, j+1, a). Therefore, with respect to the second pixel Pa (i, j, b), a desired gray scale signal carried by the signal line Sa (i) is written onto the second pixel electrode Ea (i, j, b) via the first pixel electrode Ea (i, j+1, a) located in the next row.

Thus, the display panel 110 is configured to assign two columns of pixels to one signal line. In the pixel structure of the display panel 110, the number of signal lines can be reduced to half in comparison with a display panel that assigns one pixel column to one signal line. In other words, the number of signal line can be reduced to half with respect to the number of pixels in one row. On the other hand, because the last row needs one additional line for the respective second pixels to receive appropriate gray scale signals, (e.g., in case of the 240 rows, the number of scanning lines should be increased to 241 by adding one to 240), the number of scanning lines remains nearly equal to the number of pixels in one row.

A specific structure of each pixel will now be described with reference to FIGS. 4-7. The transparent substrate 116 is provided with the scanning lines Ga (j), designated portions of which function as gate electrodes 151 for respective TFTs. Auxiliary capacity lines 148 are provided on the same level as the scanning line Ga (j). The scanning line Ga (j) and the auxiliary capacity lines 148 are formed at once. A gate insulating film 152 is formed on the scanning lines Ga (j) and the auxiliary capacity lines 148. A semiconductor thin film 153 composed of intrinsic amorphous silicon is provided on the gate insulating film 152. A channel protection film 154 is provided at a center part on an area of the semiconductor films 153 over the scanning line Ga (j). Contact layers 155, 156 composed of n-typed amorphous silicon are provided on the respective sides of the channel protection films 154 on the semiconductor films 153. On contact layer 155, a source electrode 157 is provided, and on contact layer 156, a drain electrode 158, which may function as part of scanning line Sa (i) or as part of an interconnection line La, is provided. Consequently, the first thin film transistor Ta (i, j, a) and the second thin film transistor Ta (i, j, b) each include the gate electrode 151, the gate insulating film 152, the semiconductor film 153, the channel protection film 154, the contact layers 155, 156, the source electrode 157 and the drain electrode 158. The source electrode 157 of the first thin film transistor Ta (i, j, a) is connected to the drain electrode 158 of the second thin film transistor Ta (i, j−1, b) that is located in the preceding row, via the interconnection line La.

A planarization film 159 is provided on the entire surface over the gate film 152, the first thin film transistor Ta (i, j, a), and the second thin film transistor Ta (i, j, b), etc. In the planarization film 159, a contact hole 160 is formed at a portion corresponding to the source electrode 157. Then a first pixel electrode Ea (i, j, a) and a second pixel electrode Ea (i, j, b), which are made of ITO, are formed on the planarization film 159. These pixel electrodes are electrically connected to the source electrode 157 of the first and second thin film transistors, respectively, via the corresponding contact holes 160. In this example, portions of auxiliary capacity line 148 that overlap with the pixel electrodes Ea (i, j, a) and Ea (i, j, b), respectively, function as auxiliary capacitance electrodes, and therefore auxiliary capacities Cs are formed between the these portions of the lines 148 and the pixel electrodes Ea (i, j, a) and Ea (i, j, b), respectively. At the first pixel Pa (i, j, a) and the second pixel Pa (i, j, b), the display status is controlled by changing the alignment state of the liquid crystal molecules LCa located between the common electrode 118 and the pixel electrodes Ea (i, j, a) and Ea (i, j, b), respectively, in accordance with voltage differentials between the common electrode 118 and the pixel electrodes Ea (i, j, a) and Ea (i, j, b), respectively.

The source driver 120 is connected to the signal lines Sa (i). In accordance with a horizontal synchronous signal (e.g. clock signal, start signal, latch control signal) output from the timing control circuit 160, the source driver 120 receives pixel data for the corresponding pixels from the pixel data generating circuit 140 in a prescribed unit and output to the signal line Sa (i) a gray scale signal corresponding to the pixel data at a prescribed timing. The gate driver 130 is connected to the scanning lines Ga (j). The gate driver 130 receives a vertical control signal from the timing control circuit 160, and outputs scanning signals to the scanning lines Ga (j) The scanning signal is a signal for turning on/off the first thin film transistor Ta (i, j, a) and the second thin film transistor Ta (i, j, b) that are connected to the corresponding signal line Ga (j).

The pixel data generating circuit 140 generates the pixel data for the respective pixels in accordance with a video signal (analog or digital) provided from an external of the display apparatus 1a, and outputs the pixel data to the source driver 120. In the case, the pixel data generating circuit 140 receives a reverse signal (FRP) from the timing control circuit 160 at every prescribed interval (e.g. every frame or every field for one line). The pixel data generating circuit 140 reverses the bit data of pixel data for outputting to the source driver 120 every time the circuit 140 receives the reverse signal. The polarity of the gray scale signal applied to each pixel is thereby reversed at the prescribed interval by reversing the bit data of pixel data at the desirable interval, and therefore a driving voltage for liquid crystal at each pixel becomes an alternating-current voltage. The common-voltage generating circuit 150 generates a common signal Vcoma, the polarity of which is reversed at the prescribed interval in accordance with the reverse signal output from the timing control circuit 160, and provides it to the common electrode 118.

The timing control circuit 160 generates control signals such as a vertical control signal, a horizontal control signal, a reverse signal, etc. For instance, the timing control circuit 160 outputs the reverse signal to the pixel data generating circuit 140 and to the common-voltage generating circuit 150, outputs the vertical control signal to the gate driver 130, and outputs the horizontal control signal to the source driver 120. The power source generating circuit 170 generates voltage sources Vgh, Vgl that are needed for generating the scanning signal, and provides them to the gate driver 130. The power source generating circuit 170 also generates a voltage source Vsh that is required for generating the gray scale signal, and supplies the voltage source Vsh to the source driver 120. In addition, the power source generating circuit 170 generates logic power source Vcc, and provides the power source Vcc to the source driver 120 and the gate driver 130.

Figure 8:
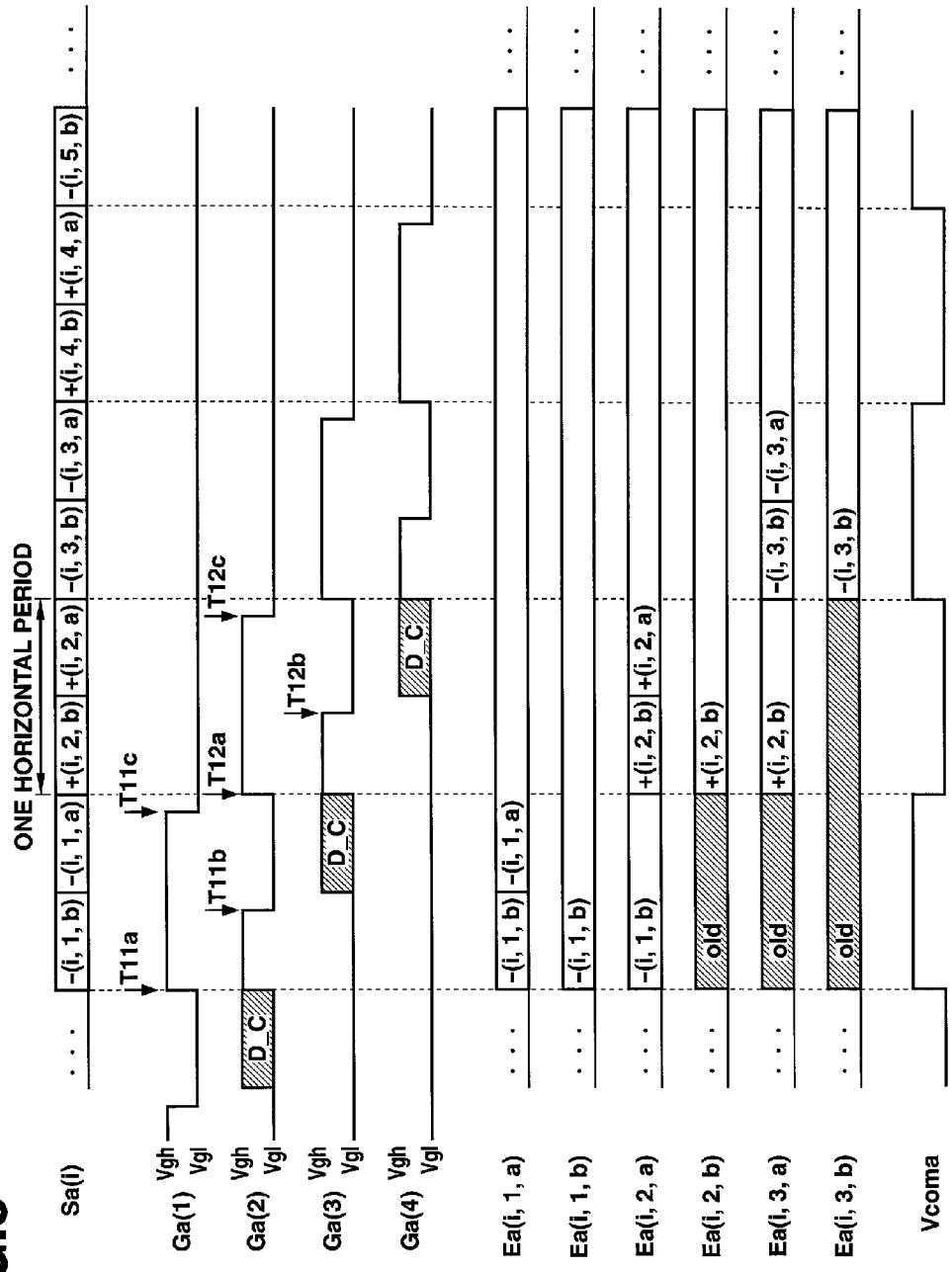
FIG. 8 is a timing chart showing an operation of the display apparatus of the first exemplary embodiment.
Figure 9:
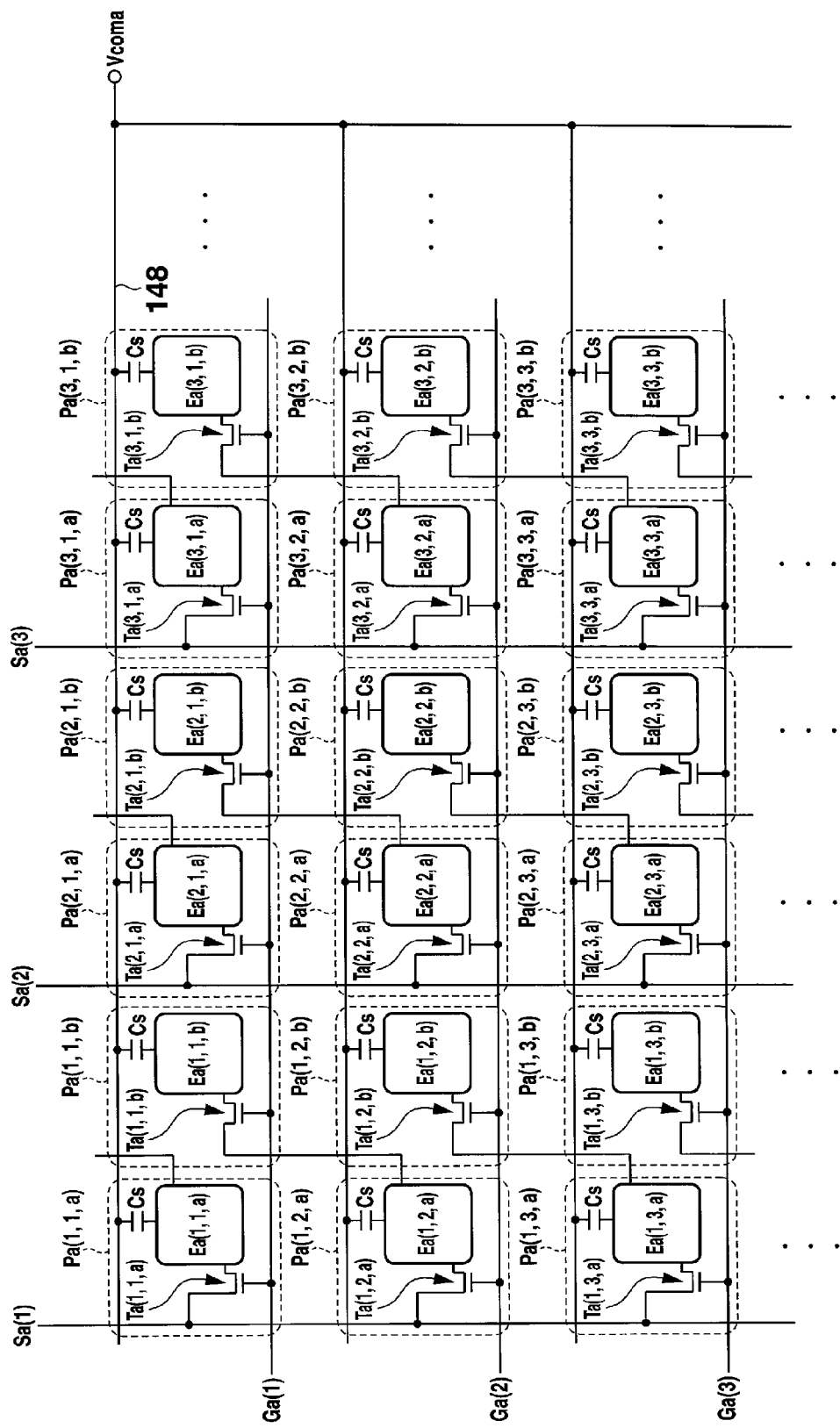
FIG. 9 is a figure showing an exemplary variation of the pixel location in the display apparatus of the first exemplary embodiment.
Figure 10:
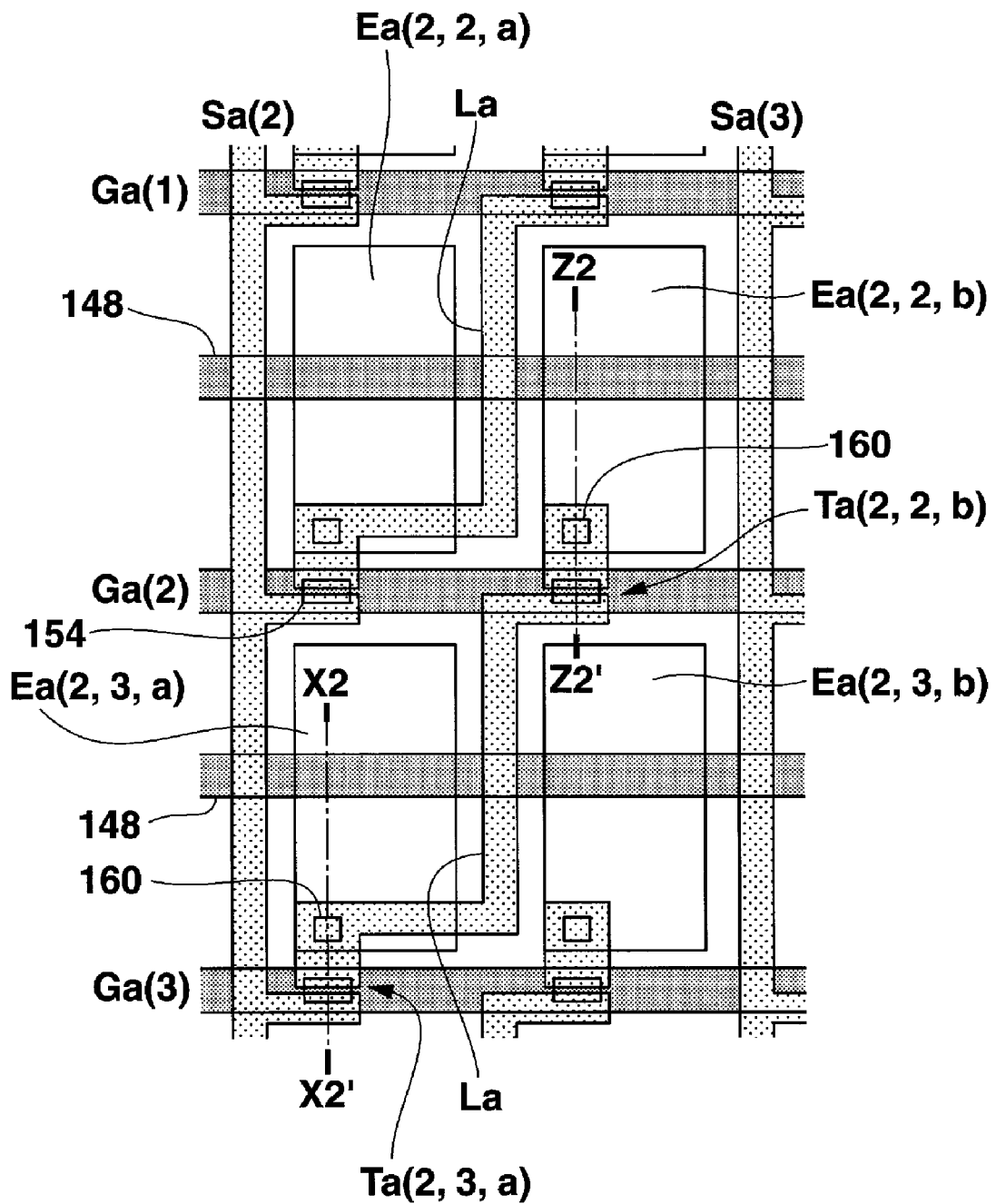
FIG. 10 is a top view depicting an exemplary variation of the pixel structure in the display apparatus of the first exemplary embodiment.
Figure 11:
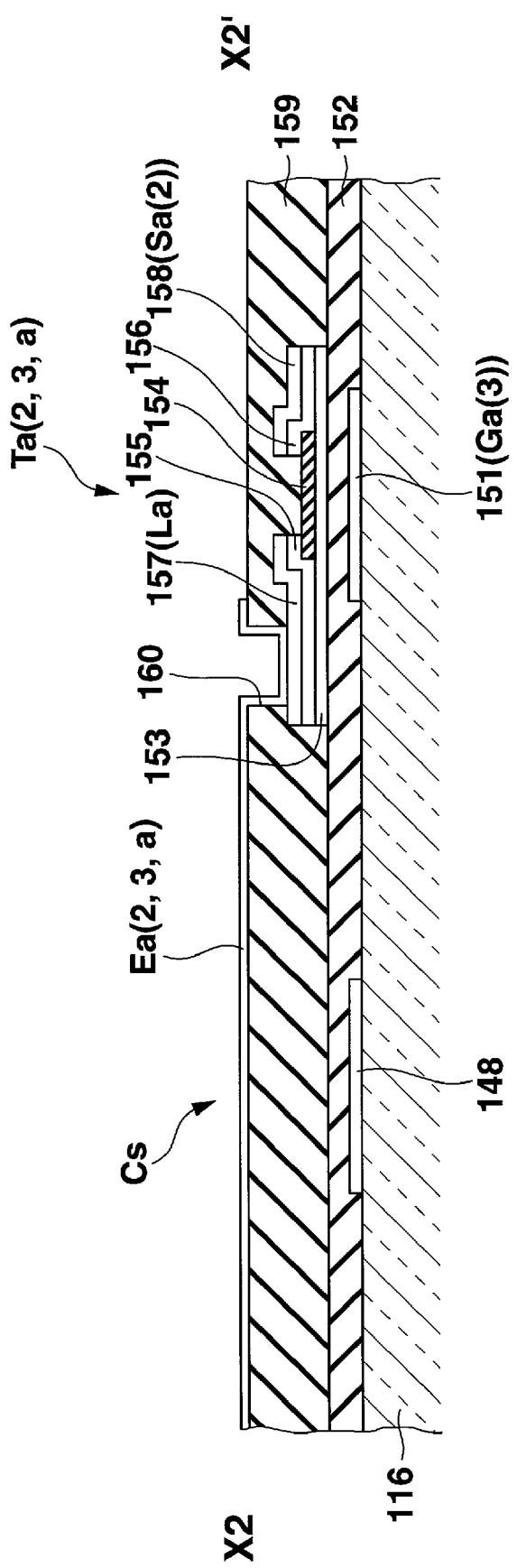
FIG. 11 is a cross-section view depicting an exemplary variation of the pixel structure in the display apparatus of the first exemplary embodiment and depicting a cross-section of a line X2-X2' shown in FIG. 10.
Figure 12:
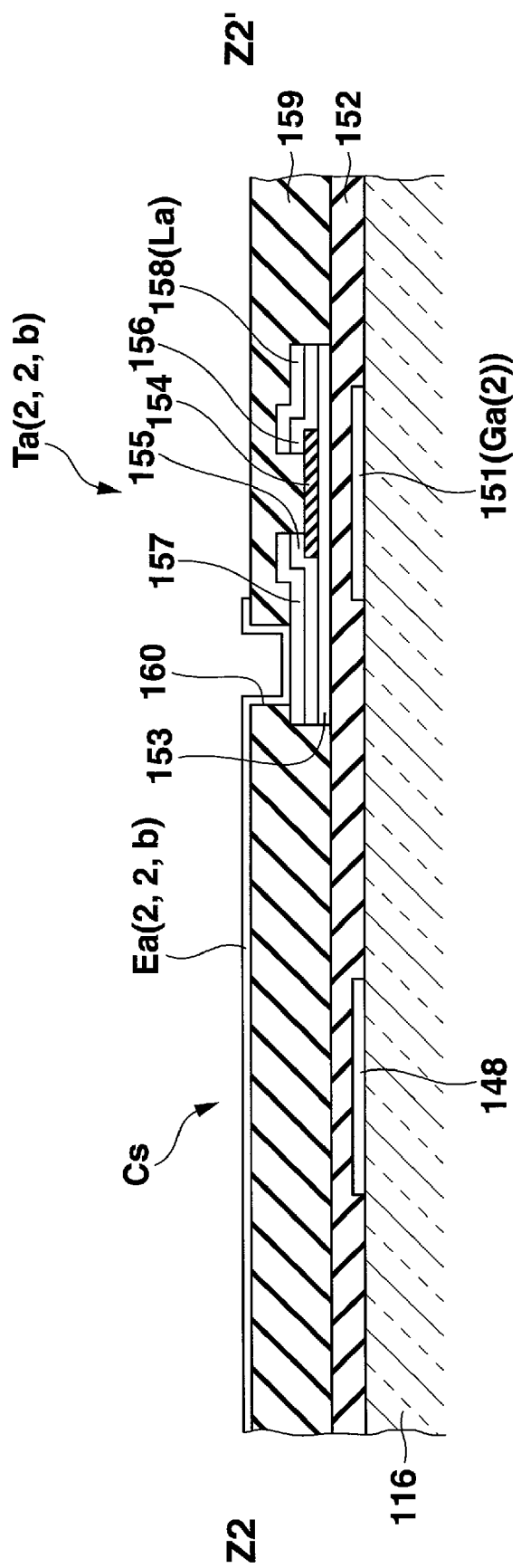
FIG. 12 is a cross-section view depicting an exemplary variation of the pixel structure in the display apparatus of the first exemplary embodiment and depicting a cross-section of a line Z2-Z2' shown in FIG. 10.

An operation of the display apparatus 1a will now be given with reference to a timing chart shown in FIG. 8. From the top, FIG. 8 shows: a gray scale signal applied to the signal line Sa (i), a first scanning signal applied to a first scanning line Ga (1), a second scanning signal applied to a second scanning Ga (2), a third scanning signal applied to a third scanning line Ga (3), a fourth scanning signal applied to a fourth scanning line Ga (4), an applying state of a gray scale signal at a first pixel electrode Ea (i, 1, a) in the first row of pixels (row j=1), an applying state of a gray scale signal at a second pixel electrode Ea (i, 1, b) in the first row, an applying state of a gray scale signal at a first pixel electrode Ea (i, 2, a) in the second row, an applying state of a gray scale signal at a second pixel electrode Ea (i, 2, b) in the second row, an applying state of a gray scale signal at a first pixel electrode Ea (i, 3, a) in the third row, an applying state of a gray scale signal at a second pixel electrode Ea (i, 3, b) in the third row, and a common signal Vcoma provided to the common electrode 118. In FIG. 8, the gray scale signals provided from the signal line Sa (i) to indicate for which pixel the signals are for. The mark "old" shows the state of the voltage according to the gray scale signal applied to the pixel written in the previous frame.

In the display apparatus 1a, pixel data related to the first pixel electrode Ea (i, j, a) and pixel data related to the second pixel electrode Ea (i, j, b) are alternately input to the source driver 120 every half horizontal period. Specifically, the pixel data for the second pixel electrode Ea (i, j, b) in a particular pixel row is input in a first half of every horizontal period, and the pixel data for the first pixel electrode Ea (i, j, a) in the pixel row is input in the last half of every horizontal period. The reverse signal is controlled so as to reverse the bit data of the pixel data (that is, the polarity of gray scale signal) every frame and every horizontal period. When the polarity reversal of the bit data in the pixel data is not carried out, the gray scale signal is marked as "+" in FIG. 8, and when the polarity reversal of the bit data in the pixel data is carried out, the gray scale signal is marked as "−". Accordingly, as shown in FIG. 8, for the present frame, the gray scale signals applied to the first pixel electrode Ea (i, j, a) and the gray scale signals applied to the second pixel electrode Ea (i, j, b) in the respective rows of pixel are provided in the signal line Sa (i) in the following order: −(i, 1, b), −(i, 1, a), +(i, 2, b), +(i, 2, a), −(i, 3, b), −(i, 3, a). The above provision of gray scale signals to the signal line Sa (i) is repeated every frame.

In the display apparatus 1a, the scanning signal input into the scanning line Ga (i) is turned to High (Vgh) twice every frame. In a prescribed horizontal period of each frame, for example, the writing operation of the gray scale signals for displaying the first and second pixels Pa (i, 1, a), Pa (i, 1, b) in the first row is performed. The scanning signals of the first and second scanning lines Ga (1), Ga (2) are both turned to High in synchronization with a start timing T11a of the horizontal period. The period during which the scanning signal on the first scanning line Ga (1) should remain at High in this case is, for example, from the moment at which the gray scale signal −(i, 1, b) starts being applied to the signal line Sa (1) until just before the completion of the application of the gray scale signal −(i, 1, a) which occurs after the application of the gray scale signal −(i, 1, b). The period during which the scanning signal on the second scanning line Ga (2) should remain at High in this case is, for example, from the moment at which the gray scale signal −(i, 1, b) starts being applied to the signal line Sa (2) until just before the completion of applying the gray scale signal −(i, 1, b). Alternatively, the moment at which the scanning signal of the second scanning line Ga (2) should be raised to High can be set in advance of the start timing T11a by a half of the horizontal period. This timing is shown as the "D_C" in FIG. 8. A shorter duration for the "D_C" is also possible. By adjusting the HIGH period appropriately in this way, the pulse widths of the HIGH pulses in each scanning signal can be made the same, for example. This may prove advantageous from the circuit design perspectives because then there is no need to generate differing pulse widths.

The first and second thin film transistors Ta (i, 1, a), Ta (i, 1, b) connected to the first scanning line Ga (1) are both turned on when the scanning signal of the first scanning line Ga (1) is raised to High at the timing T11a. The first and second thin film transistors Ta (i, 2, a), Ta (i, 2, b) connected to the second scanning line Ga (2) are also both turned on when the scanning signal of the first scanning line Ga (2) is raised to High. Therefore, the gray scale signal −(i, 1, b) applied to the signal line Sa (i) is written onto the first and second pixel electrodes Ea (i, 1, a), Ea (i, 1, b) in the first pixel row and onto the first pixel electrode Ea (i, 2, a) in the second row.

At a time T11b, the scanning signal of the second scanning line Ga (2) is turned from High to Low (Val) while maintaining the scanning signal of the first scanning line Ga (1) at High. At the timing T11b, the second thin film transistor Ta (i, 1, b) connected to the first scanning line Ga (1) is maintained in the state of on, however, the first thin film transistor Ta (i, 2, a) connected to the second scanning line Ga (2) is turned off. Therefore, the second pixel electrode Ea (i, 1, b) in the first row maintains the applied gray scale signal −(i, 1, b). The first pixel electrode Ea (i, 2, a) in the second row in this case stores a gray scale signal −(i, 1, b) which is not intended for that pixel as is apparent from the signal designation. However, the storing of the wrong gray scale signal does not cause a problem in the display because that lasts only for a very short period—about one horizontal period to two horizontal periods, as will be explained below. Shortly after the time T11b, the gray scale signal applied to the scanning line Sa (i) changes from −(i, 1, b) to −(i, 1, a), and therefore, the first pixel electrode Ea (i, 1, a) in the first row is now applied with the gray scale signal −(i, 1, a) via the first thin film transistor Ta (i, 1, a), which is connected to the first scanning line Ga (1) and has been maintained in the state of ON. Thus, the first pixel Pa (i, 1, a) in the first row displays a pixel image according to the gray scale signal −(i, 1, a).

At a time T11c, the scanning signal of the first scanning line Ga (1) is turned from High to Low. As a result, the first pixel electrode Ea (i, 1, a) in the first row maintains the gray scale signal −(i, 1, a). In addition, the electrical connection between the second pixel electrode Ea (i, 1, b) in the first row and the first pixel electrode Ea (i, 2, a) in the second row is cut off by the second thin film transistor Ta (i, 1, b) (which is turned off) connected to the first scanning line Ga (1). Accordingly, in the horizontal period as described above, the corresponding gray scale signals are written onto the first and second pixels Pa (i, 1, a), Pa (i, 1, b), respectively, in the first row.

In the next horizontal period, gray scale signals for the first and second pixels Pa (i, 2, a), Pa (i, 2, b) in the second row are written onto the respective pixels to the corresponding pixel electrodes in a manner similar to the case for the first and second pixels in the first row described above. In this horizontal period, the scanning signals of the second and third scanning line Ga (2), Ga (3) are raised to High in synchronization with a start time T12a of the horizontal period. The period during which the scanning signal of the second scanning line Ga (2) is kept at High is, for example, from the moment at which the gray scale signal +(i, 2, b) starts being applied to the signal line Sa (i) until just before the gray scale signal +(i, 2, a), which is provided after the gray scale signal +(i, 2, b), is terminated. The period during which the scanning signal of the third scanning line Ga (3) is kept at High, for example, from the moment when the gray scale signal +(i, 2, b) starts being applied to the signal line Sa (i) until just before the gray scale signal +(i, 2, b) is terminated. Alternatively, the time at which the scanning signal of the third scanning line Ga (3) is raised to High can be set in advance of the start timing T12a by a half of the horizontal period. This period is marked as "D_C" in FIG. 8.

At the time T12a, the first and second thin film transistors Ta (i, 2, a), Ta (i, 2, b) connected to the second scanning line Ga (2) are both turned on as described above by turning the scanning signal of the second scanning line Ga (2) to High. The first and second thin film transistors Ta (i, 3, a), Ta (i, 3, b) connected to the third scanning line Ga (3) are turned on by turning the scanning signal of the third scanning line Ga (3) to High. Therefore, the gray scale signal +(i, 2, b) applied to the signal line Sa (i) is written onto the first and second pixel electrodes Ea (i, 2, a), Ea (i, 2, b) in the second pixel row and the first pixel electrode Ea (i, 3, a) in the third row.

At a time T12b, the scanning signal of the third scanning line Ga (3) is turned from High to Low while maintaining the scanning signal of the second scanning line Ga (2) at High. At the time T12b, the second thin film transistor Ta (i, 2, b) connected to the second scanning line Ga (2) is maintained in the state of on, however, the first thin film transistor Ta (i, 3, a) connected to the third scanning line Ga (3) is turned off. Therefore, the second pixel electrode Ea (i, 2, b) in the second pixel row is written with the gray scale signal +(i, 2, b) corresponding to the coordinates thereof. At this time, the first pixel electrode Ea (i, 3, a) in the third row is written with a gray scale signal +(i, 2, b) that is not intended for that pixel. However, the display performance is not affected because this state lasts only for a very short period and is resolved within approximately one horizontal period to two horizontal periods. Shortly after the time T12b, the gray scale signal applied to the scanning line Sa (i) is turned from +(i, 2, b) to +(i, 2, a). Thus, the first pixel electrode Ea (i, 2, a) in the second pixel row is applied with the gray scale signal +(i, 2, a) via the first thin film transistor Ta (i, 2, a), which is connected to the second scanning line Ga (2) and which has been maintained in the state of on. The first pixel Pa (i, 2, a) in the second pixel row displays a pixel image in accordance with the gray scale signal +(i, 2, a). That is to say, the state in which a wrong gray scale signal +(i, 2, b) is provided in the pixel electrode Ea(i, 2, a) is quickly resolved, and that pixel is provided with the correct gray scale signal.

At a time T12c, the scanning signal of the second scanning line Ga (2) is turned from High to Low, and therefore the first pixel electrode Ea (i, 2, a) in the second pixel row maintains the gray scale signal +(i, 2, a). In the case, the electrical connection between the second pixel electrodes Ea (i, 2, b) in the second pixel row and the first pixel electrode Ea (i, 3, a) in the third pixel row is cut off by the second thin film transistor Ta (i, 2, b) (which is turned off now) connected to the second scanning line Ga (2). Accordingly, in the horizontal period as described above, the appropriate gray scale signals am applied to the first and second pixels Pa (i, 2, a), Pa (i, 2, b) in the second pixel row. For the subsequent horizontal period, similar writing operations are performed for the successive rows of the pixels, and as a result, the display apparatus 1a can display an appropriate video image in accordance with the video signal.

As described above, in the display apparatus 1a, the number of signal lines and the number of output terminals in the source driver can be significantly reduced while the number of scanning lines is not affected. This is realized by connecting the pixels connected to the prescribed signal line to another set of pixels via the thin film transistors. Accordingly, a pitch between terminals of LSI of the source driver can be made wider, and the source driver can be easily connected when mounting the source driver on the display panel 110. In addition, the invention allows the LSI of the source driver to be miniaturized because the number of output terminals of the source driver can be reduced. In the above-described first exemplary embodiment, the gate of the second thin film transistor Ta (i, j−1, b), which connect Ea (i, j, a) to Ea (I, j−1, b), is connected to the scanning line that is located above the j−1th row of pixels (i.e., above Ea(i, j−1, b).

Figure 13:
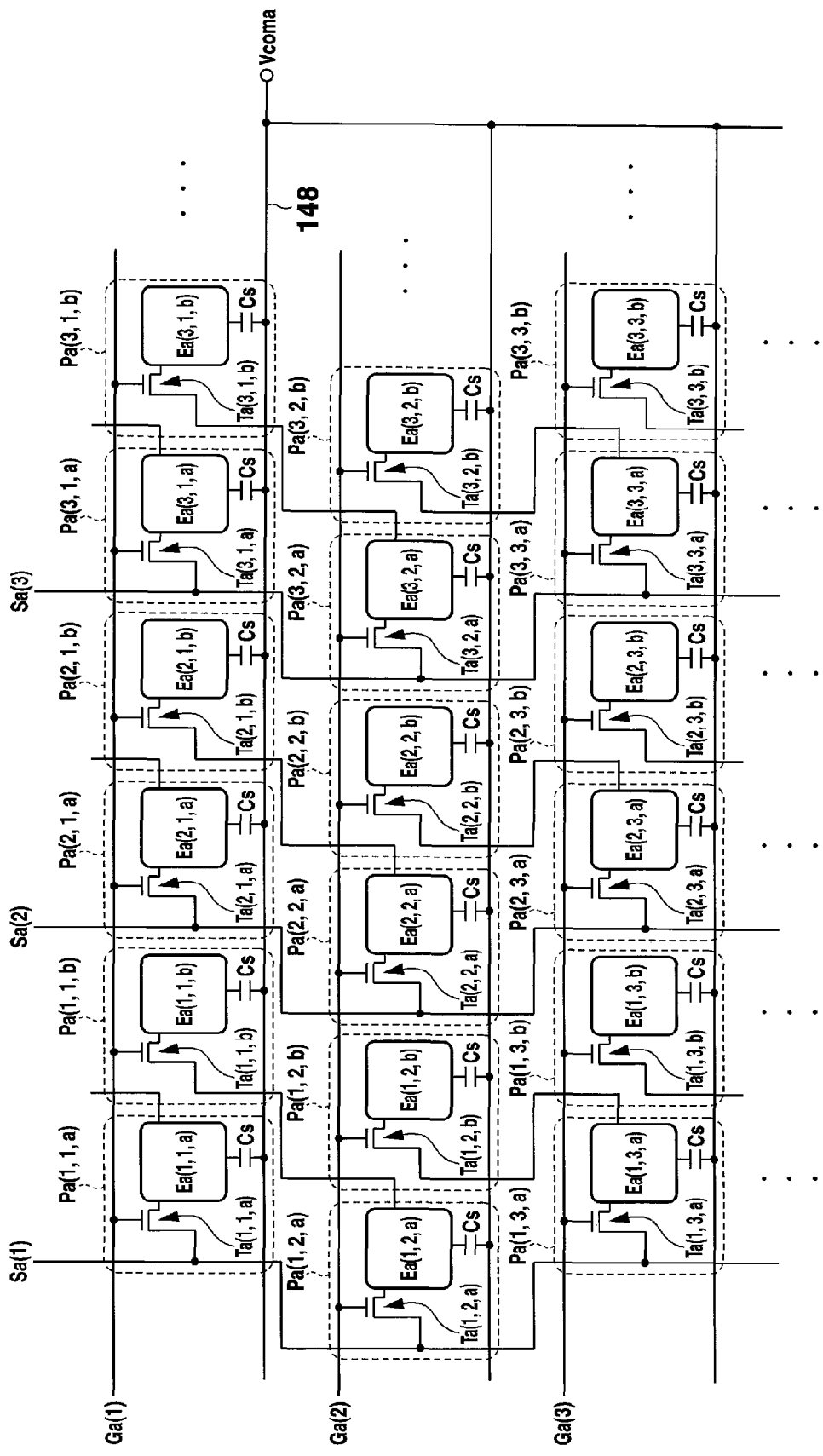
FIG. 13 is a figure showing an exemplary pixel location in case of delta-formation with respect to the pixel location in the display apparatus of the first exemplary embodiment.
Figure 14:
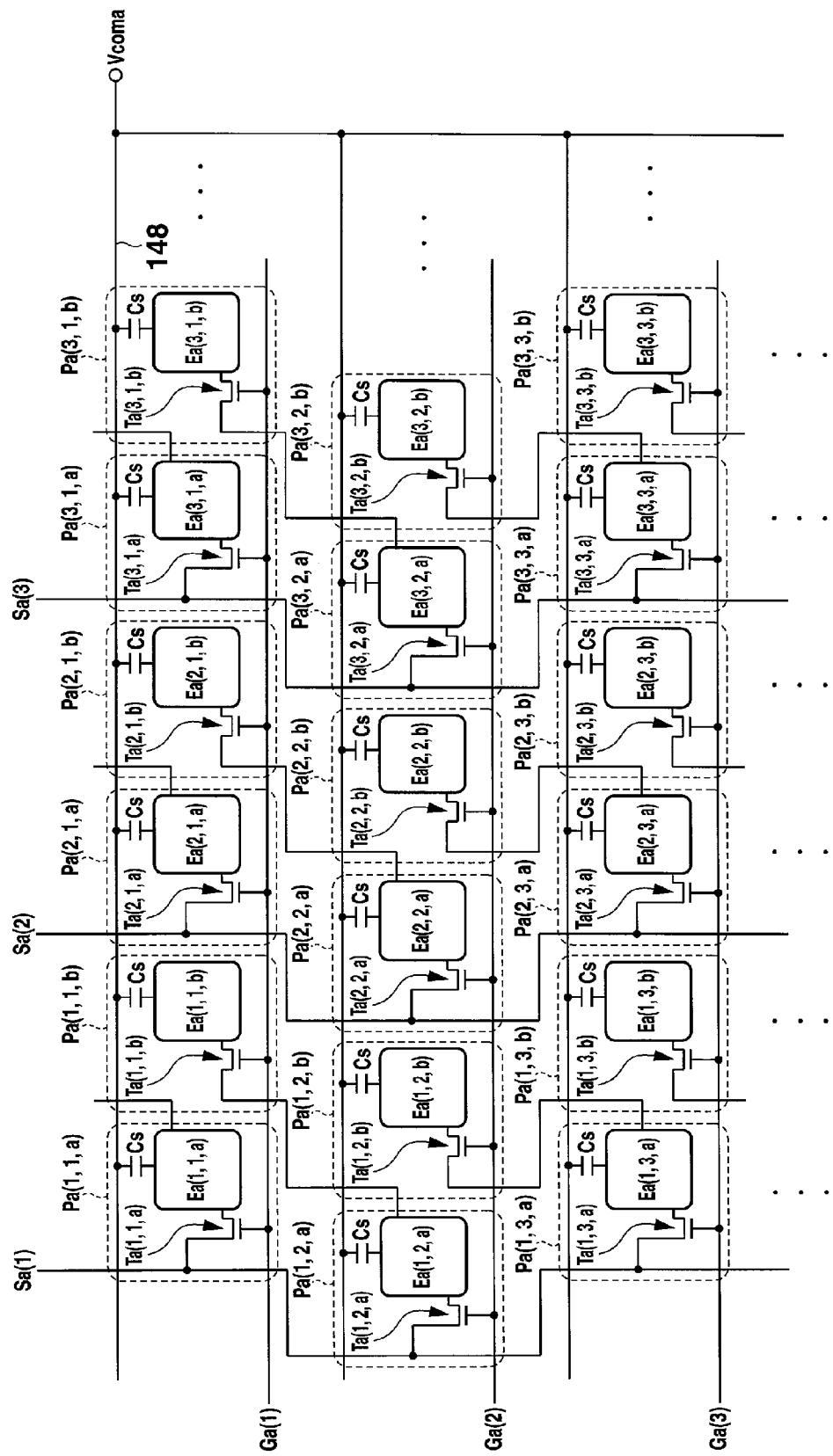
FIG. 14 is a figure showing an exemplary pixel location in case of delta-formation with respect to the exemplary variation of the pixel location in the display apparatus of the first exemplary embodiment.

However, as shown in FIGS. 9 to 12, as an alternative, the gate of the second thin film transistor Ta (i, j−1, b) for controlling the electrical connection between the first pixel electrode Ea (i, j, a) and the second pixel electrode Ea (i, j−1, b) can be connected to the scanning line that is located between the j−1th row of pixels and the j-th row of pixels (i.e., between the first pixel electrode Ea (i, j, a) and the second pixel electrode Ea (i, j−1, b)). The structure can result in a high aperture ratio of each pixel because the length of the interconnection lines La can be shortened in comparison with the above-described first exemplary embodiment. In addition, because the pixel electrodes Ea (i, j, a) and Ea (i, j−1, b) can be connected via the second thin film transistor Ta (i, j−1, b) without the intersections Ri of the scanning line Ga (i) and the interconnection lines La (which existed in FIG. 4, but not in FIG. 10), parasitic capacities caused between the scanning line Ga (i) and the interconnection lines La can be maintained relatively small, and therefore the above structure is favorable. The display apparatus using the above-described structure can also provide an appropriate video display in accordance with the video signal by the same operation as that of the first exemplary embodiment. Furthermore, in the above-described first exemplary embodiment, in each column of pixels, the first or second pixels Pa (i, j, a), Pa (i, j, b) are disposed in a stripe shape. However, the pixels adjacent in the column direction can be disposed in a staggered manner by shifting one over the other by a half of the pixel length, resulting in a delta arrangement, as shown in FIGS. 13 and 14.

Second Embodiment

Figure 15:
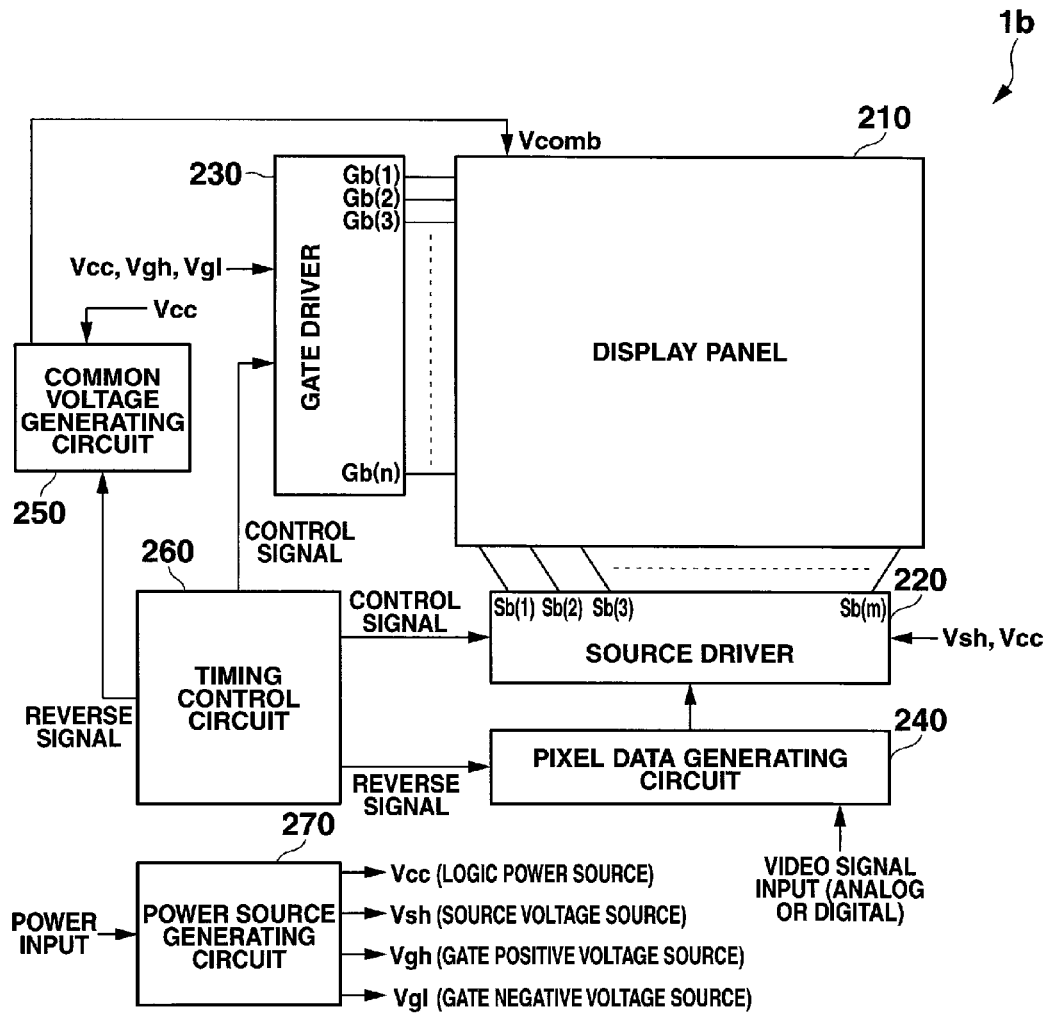
FIG. 15 is a block diagram showing a schematic whole structure of a display apparatus of a second exemplary embodiment.
Figure 16:
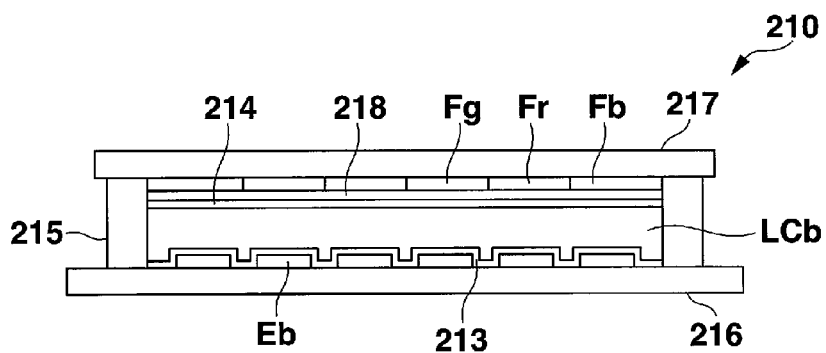
FIG. 16 is a figure showing a cross-section structure of a display panel of the second exemplary embodiment.

A schematic whole structure of a display apparatus 1b in a second exemplary embodiment of the present invention is shown in FIG. 15. The display apparatus 1b is an LCD apparatus that includes a display panel 210, a source driver 220, a gate driver 230, an pixel data generating circuit 240, a common-voltage generating circuit 250, a timing control circuit 260 and a power source generating circuit 270. The display panel 210 includes two transparent substrates 216, 217 located opposite with respect to each other and a liquid crystal LCb sandwiched between the transparent substrates 216 and 217 that are bonded by a sealing material 215 as shown in FIG. 16. On substrate 216, a plurality of scanning lines Gb (for instance, scanning lines of n lines) is formed so as to extend in rows, and a plurality of signal lines Sb (for instance, signal lines of m lines) is formed so as to extend in columns. The transparent substrate 216 also includes a plurality of pixel electrodes Eb that are disposed in matrix so as to correspond to respective pixels Pb, and includes a plurality of thin film transistors the source electrodes of which are connected to the corresponding pixel electrodes Eb. On the substrate 217, a common electrode 218 is formed so as to face the pixel electrodes Ea, to apply a common potential for each pixel Pb. On the pixel electrode Eb and the common electrode 118, alignment films 213, 214, respectively, are formed, which determine an initial alignment of the liquid crystal.

Figure 17:
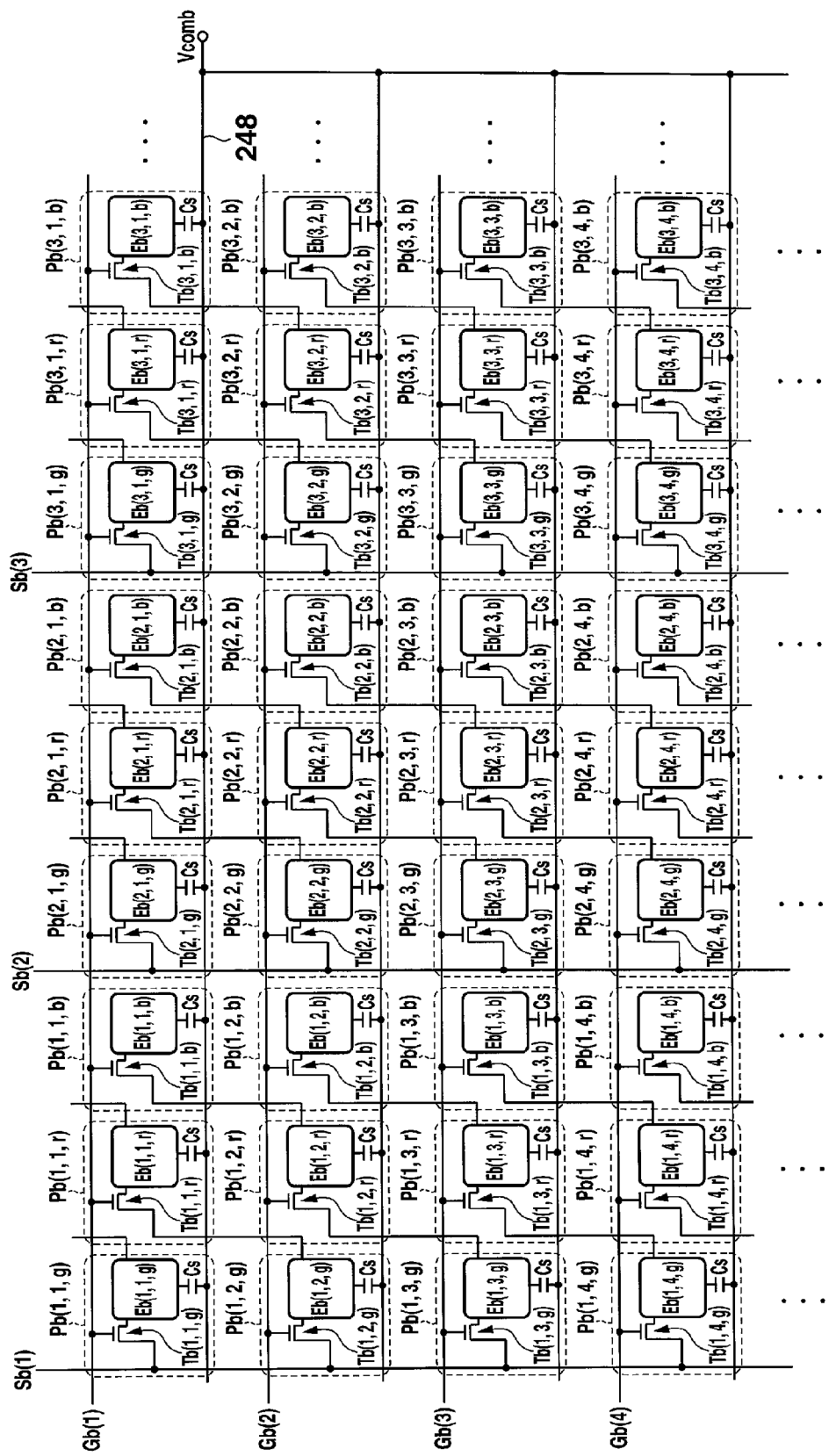
FIG. 17 is a figure showing a pixel location in the display apparatus of the second exemplary embodiment.
Figure 18:
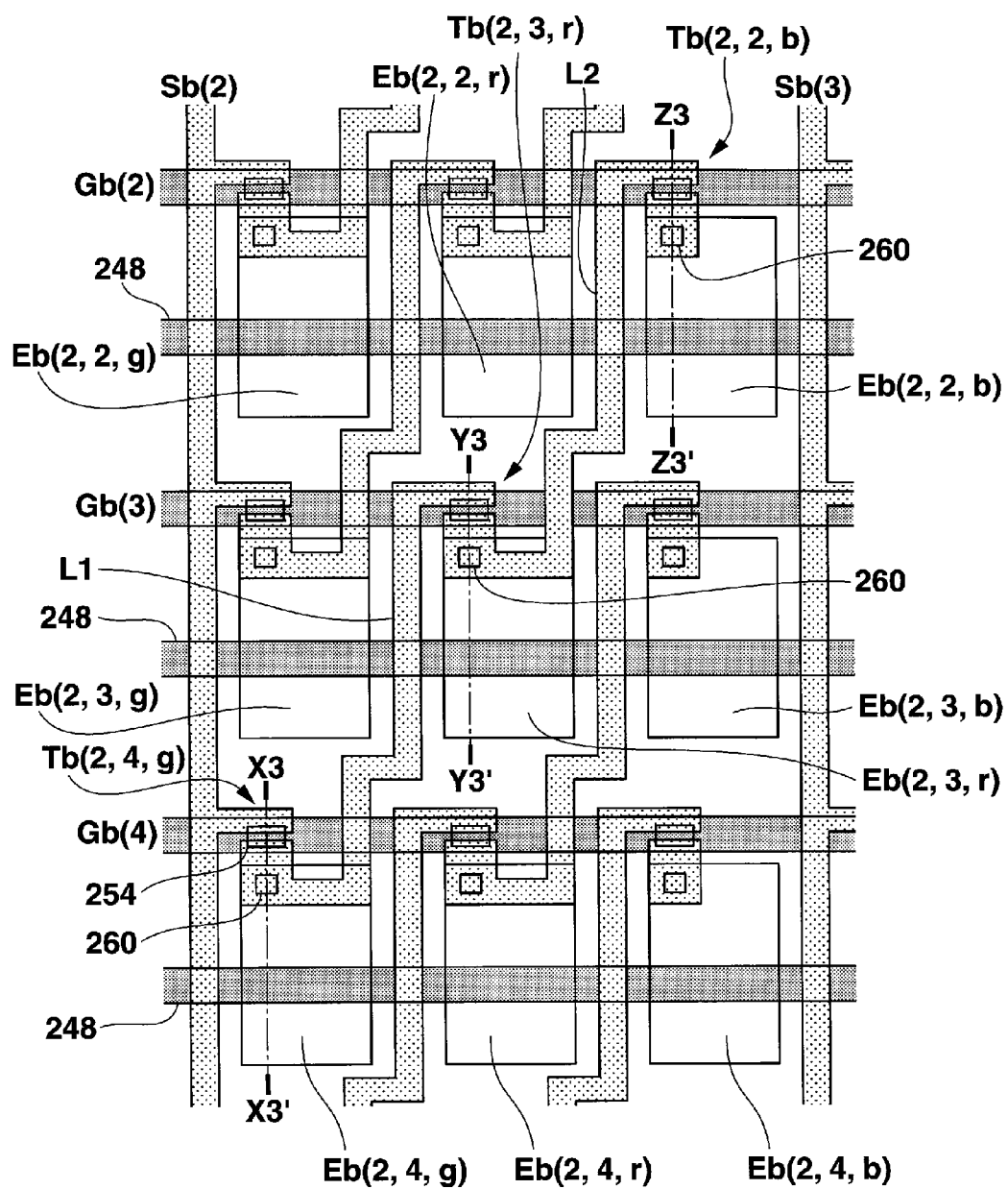
FIG. 18 is a top view depicting a pixel structure in the display apparatus of the second exemplary embodiment.
Figure 19:
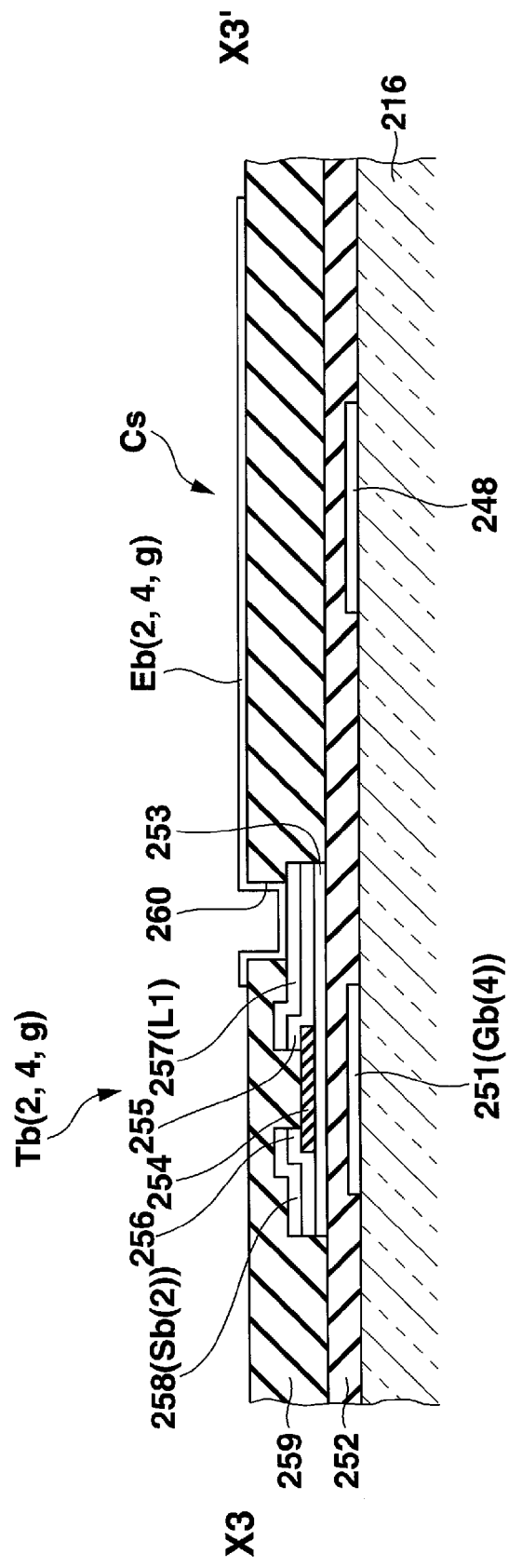
FIG. 19 is a cross-section view depicting the pixel structure in the display apparatus of the second exemplary embodiment and depicting a cross-section view of a line X3-X3' shown in FIG. 18.
Figure 20:
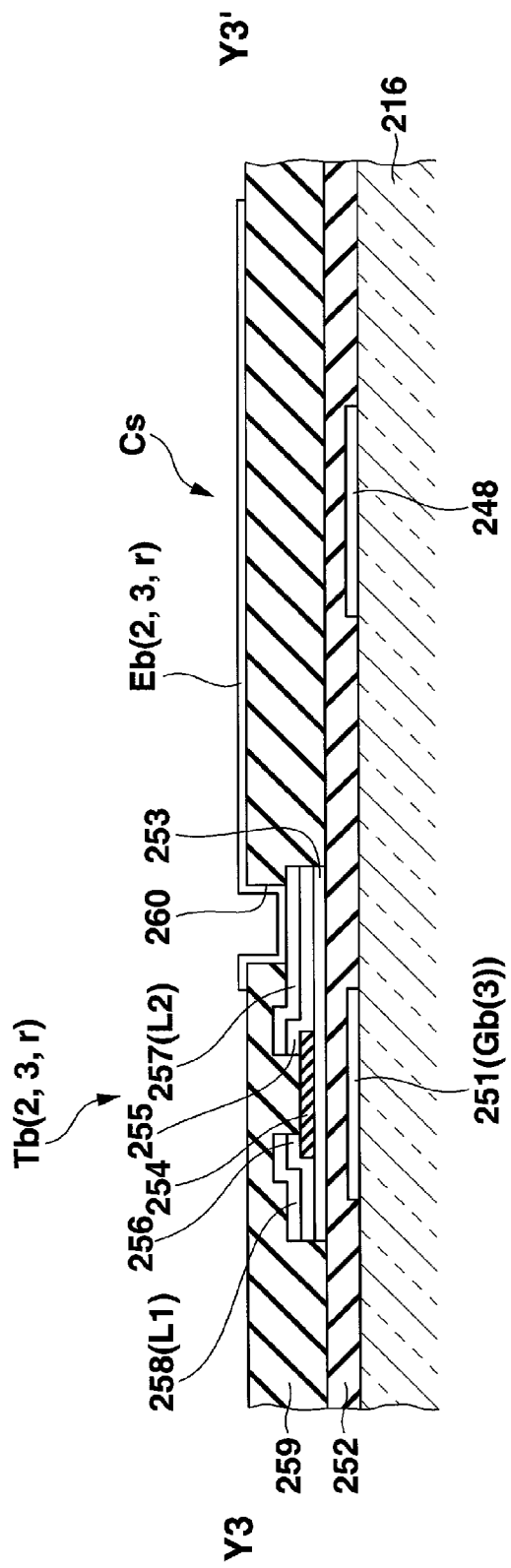
FIG. 20 is a cross-section view depicting the pixel structure in the display apparatus of the second exemplary embodiment and depicting a cross-section view of a line Y3-Y3' shown in FIG. 18.
Figure 21:
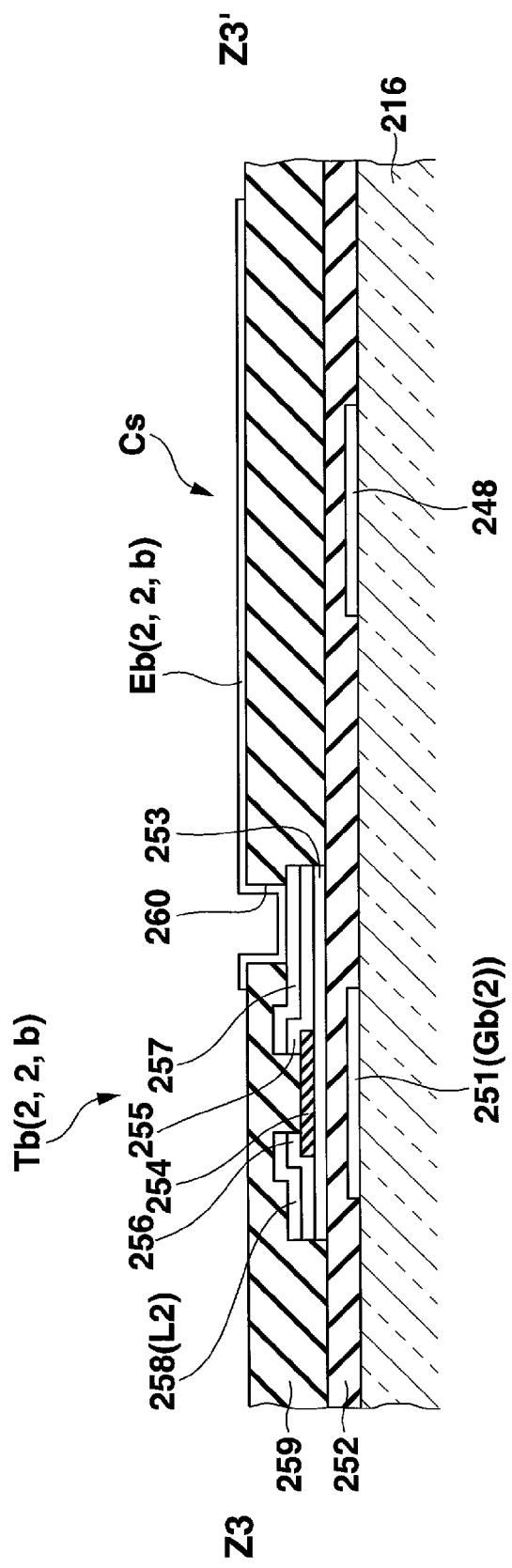
FIG. 21 is a cross-section view depicting the pixel structure in the display apparatus of the second exemplary embodiment and depicting a cross-section view of a line Z3-Z3' shown in FIG. 18.

In the display panel 210, the plurality of scanning lines Gb (j) extending in rows and the plurality of signal lines Sb (i) extending in columns intersect with each other (for example, at right angle as shown in FIG. 17). For each intersection (i, j) of the scanning line Gb (j) and the signal line Sb (i), there are provided a first pixel Pb (i, j, g) used for green color, a second pixel Pb (i, j, r) used for blue color and a third pixel Pb (i, j, b) used for red color, which are disposed in the extending direction of the scanning lines. That is to say, in each row, the first pixel Pb (i, j, g), the second pixel Pb (i, j, r) and the third pixels Pb (i, j, b) are repeated in that order. For each column, the first pixel Pd (i, j, g), the second pixel Pb (i, j, r), or the third pixel Pb (i, j, b) is repeated. Here, i=1, 2, . . . , m and j=1, 2, . . . , n. - - - , to m and "j" is 1, 2, - - - , to n.

The first pixel Pb (i, j, g) includes a first pixel electrode Eb (i, j, g) and a first thin film transistor Tb (i, j, g) adjacent thereto, and the first pixel electrode Eb (i, j, g) is connected to a source electrode (or the drain electrode; they may be interchangeable) of the first thin film transistor Tb (i, j, g). The first thin film transistor Tb (i, j, g) has a gate electrode connected to the scanning line Gb (j), and had a drain electrode connected to the signal line Sb (i). The second pixel Pb (i, j, r) used for red color includes a second pixel electrode Eb (i, j, r) and a second thin film transistor Tb (i, j, r) adjacent thereto, and the second pixel electrode Eb (i, j, r) is connected to a source electrode of the second thin film transistor Tb (i, j, r). The second thin film transistor Tb (i, j, r) has a gate electrode connected to the scanning line Gb (j), and has a drain electrode connected to a first pixel electrode Eb (i, j+1, g) that is disposed in the next row. Therefore, the second pixel Pb (i, j, r) is configured to receive a gray scale signal applied to the signal line S (i) at the second pixel electrode Eb (i, j, r) via the first pixel electrode Eb (i, j+1, g) that is located in the next row.

The third pixel Pb (i, j, b) used for blue color includes a third pixel electrode Eb (i, j, b) and a third thin film transistor Tb (i, j, b) adjacent thereto, and the third pixel electrode Eb (i, j, b) is connected to a source electrode of the third thin film transistor Tb (i, j, g). The third thin film transistor Tb (i, j, g) has a gate electrode connected to the scanning line Gb (j), and has a drain electrode connected to a second pixel electrode Eb (i, j+1, r) that is located in the next row. Therefore, the third pixel Pb (i, j, b) is configured to receive a gray scale signal applied to the signal line S (i) at the third pixel electrode Eb (i, j, b) via the second pixel electrode Eb (i, j+1, r) in the next row and via the first pixel Pb (i, j+2, g) that is located two rows below. For the first pixel Pb (i, j, g) used for green color, the transparent substrate 217 has a color filter of green Fg so as to face the first pixel electrode Eb (i, j, g). For the first pixel Pb (i, j, r), there is provided a color filter of red Fr so as to face the second pixel electrode Eb (i, j, r). Similarly, for the third pixel Pb (i, j, b) used for blue color, the transparent substrate 217 has a color filter of blue Fb so as to face the third pixel electrode Eb (i, j, b).

Thus, the display panel 210 is structured such that the first pixel Pb (i, j, g) used for green color, the second pixel Pb (i, j, r) used for red color and the third pixel Pb (i, j, b) used for blue color are disposed successively tin the extending direction of rows as sub-pixels that collectively constitute one image pixel for color display. The display panel 210 is configured to assign three columns of pixels to one signal line and to assign three different colors of video signal (green/red/blue) to each of the scanning lines. In the pixel structure of the display panel 210, the number of signal lines can be reduced to one third of that required for a display panel that assigns one pixel column with one signal line. In other words, the number of signal lines can be reduced to one-third of the number of pixels in one row. In this case, the number of scanning lines remains essentially the same. In this example, the number of scanning lines needs to be increased by 2 (e.g., in the case of 240 rows of pixel, add 2 to 240, yielding 242). Thus, the number of scanning lines can nearly equal the number of pixels in one column.

A specific structure of each pixel will now described with reference to FIGS. 18-21. On the substrate 216, the scanning line Ga (j) including gate electrodes 251 is provided, and auxiliary capacity lines 248 are provided on the same level as the scanning line Ga (j). The scanning line Ga (j) and the auxiliary capacity lines 248 are formed at once, and a gate insulating film 252 is formed on the scanning line Ga (j) and the auxiliary capacity lines 248. Semiconductor thin film 253 composed of intrinsic amorphous silicon is provided on the gate insulating film 252. Channel protection film 254 is provided at a center portion on an area of the semiconductor films 253 over the scanning line Ga (j), and contact layers 255, 256 composed of n-typed amorphous silicon are provided on the respective sides of the channel protection film 254 on top surface of the semiconductor film 253. On the contact layer 255, source electrode 257 is provided, and on the other contact layer 256, drain electrode 258, which may be part of signal line Sa (i), first interconnection line L1, or second interconnection lines L2, is formed. Thus, the first thin film transistor Tb (i, j, g), the second thin film transistor Tb (i, j, r) and the third thin film transistor Tb (i, j, b) each include the gate electrodes 251, a gate insulating film 252, the semiconductor film 253, the channel protection film 254, the contact layers 255, 256, the source electrode 257 and the drain electrode 258.

The source electrode 257 of the first thin film transistor Tb (i, j, g) and a drain electrode 258 of a second thin film transistor Tb (i, j−1, r) that is formed in one row above are connected via the first interconnection line L1. The source electrode 257 of the second thin film transistor Tb (i, j−1, r) and a drain electrode 258 of a third thin film transistor Tb (i, j−2, b) that is formed in one row above are connected via the second interconnection line L2. A planarization film 259 is provided on the entire surface over the gate film 252, the first thin film transistor Tb (i, j, g), the second thin film transistor Tb (i, j, r), the third thin film transistor Tb (i, j, b) and the like. The planarization film 259 is provided with contact holes 260 at portions corresponding to the source electrodes 257. On the planarization film 259, there is provided the first pixel electrode Eb (i, j, g), the second pixel electrode Eb (i, j, r) and the third pixel electrode Eb (i, j, b), each of which is composed of ITO. The pixel electrodes Eb (i, j, g), Eb (i, j, r) and Ea (i, j, b) are electrically connected to the corresponding source electrodes 257 via the contact holes 260.

Portions of the auxiliary capacity lines 248 that overlap with the pixel electrodes Eb (i, j, g), Eb (i, j, r), and Ea (i, j, b), respectively, function as auxiliary capacity electrodes, and therefore, auxiliary capacities Cs are formed between the auxiliary capacity lines 248 and the pixel electrodes Eb (i, j, g), Eb (i, j, r), and Ea (i, j, b), respectively. At the first pixel Pb (i, j, g), the second pixel Pb (i, j, r) and the third pixel Pb (i, j, b), respectively, the display status can be controlled by changing the alignment state of the liquid crystal LC located between the corresponding pixel electrode (Eb (i, j, g), Eb (i, j, r), or Ea (i, j, b)) and the opposing common electrode 218 in accordance with the voltage differential between the corresponding pixel electrode and the common electrode 218. The source driver 220 is connected to the signal line Sa (i), and receives the pixel data from the pixel data generating circuit 240 in a prescribed unit in accordance with a horizontal synchronous signal (e.g. clock signal, start signal, latch control signal) output from the timing control circuit 260. The source driver 220 outputs gray scale signals corresponding to the above pixel data to the signal lines Sa (i) at a prescribed timing.

The gate driver 230 is connected to the scanning lines Gb (j), and provides a scanning signal for turning on/off each of the first, second and third thin film transistors Tb (i, j, g), Tb (i, j, r), Tb (i, j, b) connected to the signal line Gb (j) through the scanning line Gb (j) in accordance with a vertical control signal output from the timing control circuit 260. The pixel data generating circuit 240 generates the pixel data for each color component (e.g. data green/red/blue) based on, for example, a color video signal (analog or digital) provided from an external of the display apparatus 1b, and outputs the pixel data to the source driver 220. Here, the pixel data generating circuit 240 receives a reverse signal (FRP) from the timing control circuit 260 at a prescribed interval (e.g. every one frame or one field, for one line). The pixel data generating circuit 240 reverses the bit data of the pixel data that is to be output to the source driver 220 every time the circuit 240 receives the reverse signal. As described above, the polarity of the gray scale signal applied to each pixel is reversed at the desirable interval by reversing the bit data of the pixel data at the prescribed interval, and therefore a driving voltage of the liquid crystal in each pixel can become alternating current voltage.

The common-voltage generating circuit 250 generates a common signal Vcoma the polarity of which is reversed at a prescribed interval in accordance with the reverse signal output from the timing control circuit 260, and provides the common signal to the common electrode 218. The timing control circuit 260 generates control signals such as a vertical control signal, a horizontal control signal, a reverse signal, etc. For instance, the timing control circuit 260 outputs the reverse signal to the pixel data generating circuit 240 and to the common-voltage generating circuit 250, outputs the vertical control signal to the gate driver 230, and outputs the horizontal control signal to the source driver 220. The power source generating circuit 270 generates voltage sources Vgh, Vgl that are needed for generating the scanning signal, and provides the above voltage sources to the gate driver 230. The power source generating circuit 270 also generates a voltage source Vsh that is needed for generating the gray scale signal, and provides the voltage source to the source driver 220. In addition, the power source generating circuit 270 generates logic power source Vcc, and provides the power source Vcc to the source driver 220 and the gate driver 230.

Figure 22:
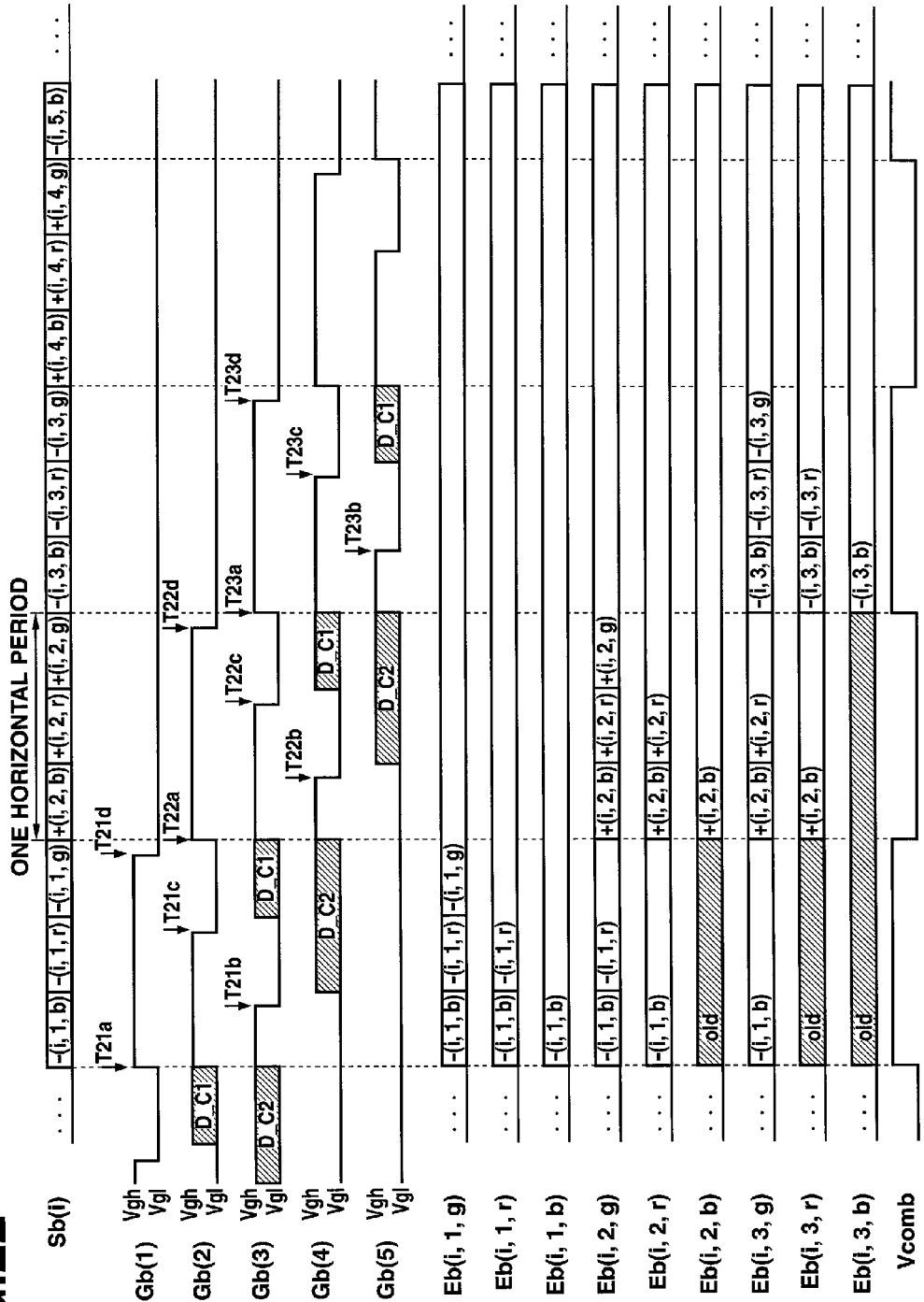
FIG. 22 is a timing chart showing an operation of the display apparatus of the second exemplary embodiment.

An operation of the display apparatus 1b will now be given with reference to a timing chart shown in FIG. 22. From the top, FIG. 22 shows: a gray scale signal applied to the signal line Sb (i), a first scanning signal applied to a first scanning line Gb (1), a second scanning signal applied to a second scanning line Gb (2), a third scanning signal applied to a third scanning line Gb (3), a fourth scanning signal applied to a fourth scanning line Gb (4), a fifth scanning signal applied to a fifth scanning line Gb (5), an applying state of a gray scale signal at a first pixel electrode Eb (i, 1, g) in the first row, an applying state of a gray scale signal at a second pixel electrode Eb (i, 1, r) in the first row, an applying state of a gray scale signal at a third pixel electrode Eb (i, 1, b) in the first row, an applying state of a gray scale signal at a first pixel electrode Eb (i, 2, g) in the second row, an applying state of a gray scale signal at a second pixel electrode Ea (i, 2, r) in the second row, an applying state of a gray scale signal at a third pixel electrode Ea (i, 2, b) in the second row, an applying state of a gray scale signal at a first pixel electrode Eb (i, 3, g) in the third row, an applying state of a gray scale signal at a second pixel electrode Ea (i, 3, r) in the third row, an applying state of a gray scale signal at a third pixel electrode Ea (i, 3, b) in the third row, and the common signal Vcoma applied to the common electrode 218. The gray scale signals provided on the signal line Sb (i) in FIG. 22 are expressed in terms of the coordinates and color components for which the gray scale signals are designed to be applied. The mark "old" indicates an applying state as a result of the gray scale signal written in a previous frame.

In the display apparatus 1b, a pixel data for the green color component (for Eb (i, j, g)), a pixel data for the red color component (for Eb (i, j, r)), and a pixel data for the blue color component (for Eb (i, j, b)) are successively input to the source driver 220 at the respective interval of one-third of the horizontal period. More specifically, the pixel data related to the third pixel electrode Eb (i, j, b) in one row is input during the first one-third of the horizontal period, the pixel data related to the second pixel electrode Eb (i, j, r) in the same row is input during the second one-third of the horizontal period and the pixel data related to the first pixel electrode Eb (i, j, b) in the same row is input during the last one-third of the horizontal period. The reverse signal is controlled so as to reverse the bit data of the pixel data (that is, the polarity of gray scale data) every frame and every horizontal period. When the reversal of the bit data of the pixel data is not carried out, the gray scale signal bears the mark "+" in FIG. 22, and when the reversal of the bit data of the pixel data is carried out, the gray scale signal bears the mark "−".

As shown in FIG. 22, the gray scale signal for the first pixel electrode Eb (i, j, g), the gray scale signal for the second pixel electrode Eb (i, j, r) and the gray scale signal for the third pixel electrode Eb (i, j, b) in the respective rows of pixels for one frame are provided to the signal line Sb (i) in the following sequence: −(i, 1, b), −(i, 1, r), −(i, 1, g), +(i, 2, b), +(i, 2, r), +(i, 2, g), −(i, 3, b), −(i, 3, r), −(i, 3, g). Similar gray scale signals are provided to the signal line Sb (i) every frame. In the display apparatus 1b, each of the scanning signals on the corresponding scanning lines Gb (i) is raised to High (Vgh) thrice per each frame. In a particular prescribed horizontal period of each frame, the first, second and third pixels Pb (i, 1, g), Pb (i, 1, r), (i, 1, b) in the first pixel row, for example, are written with the desired gray scale signals. In such a horizontal period, the scanning signals on the first, second and third scanning lines Gb (1), Gb (2), Gb (3) are all turned to High in synchronization with a start time T21a of the horizontal period.

In the horizontal period, the period during which the scanning signal on the first scanning line Gb (1) should remain at High is, for example, from the moment at which the gray scale signal −(i, 1, b) for the third pixel Pb (i, 1, b) is supplied to the signal line Sb (i) until just before the gray scale signal −(i, 1, g) for the first pixel Pb (i, 1, g) is terminated. The period during which the scanning signal on the second scanning line Gb (2) should remain at High in the horizontal period is, for example, from the moment at which the gray scale signal −(i, 1, b) for the third pixel Pb (i, 1, b) is supplied to the signal line Sb (i) until just before the gray scale signal −(i, 1, r) for the second pixel Pb (i, 1, r) is terminated. The period during which the scanning signal on the third scanning line Gb (3) should remain at High in the horizontal period is, for example, from the moment at which the gray scale signal −(i, 1, b) for the third pixel Pb (i, 1, b) is supplied to the signal line Sb (i) until just before the gray scale signal −(i, 1, b) is terminated. The starting time at which the scanning signal on the second scanning line Gb (2) becomes High can be shifted in advance of the start time T21a by one-third of the horizontal period, for example. That period is shown as "D_C1" in FIG. 22. Similarly, the starting time at which the scanning signal on the third scanning line Gb (3) becomes High can be shifted in advance of T21a by two-third of the horizontal period, for example. That earlier starting period is shown as "D_C2" in FIG. 22.

The first, second, and third thin film transistors Tb (i, 1, g), Tb (i, 1, r), Tb (i, 1, b) that are connected to the first scanning line Gb (1) are turned on when the scanning signal on the first scanning line Gb (1) is raised to High at the timing of T21a. The first, second and third thin film transistors Tb (i, 2, g), Tb (i, 2, r), Tb (i, 2, b) that are connected to the second scanning line Gb (2) are turned on when the scanning signal ohm the second scanning line Gb (2) is turned to High. In addition, the first, second and third thin film transistors Tb (i, 3, g), Tb (i, 3, r), Tb (i, 3, b) that are connected to the third scanning line Gb (3) are turned on when the scanning signal of the third scanning line Gb (3) is turned to High. Therefore, during this first one-third period, the gray scale signal −(i, 1, b) applied to the signal line Sa (i) is written onto the first, second and third pixel electrodes Eb (i, 1, g), Eb (i, 1, r), Eb (i, 1, b) in the first pixel row, the first and second pixel electrodes Eb (i, 2, g), Eb (i, 2, r) in the second pixel row, and onto the first pixel electrode Eb (i, 3, g) in the third pixel row.

At a time T21b, the scanning signal on the third scanning line Gb (3) is turned from High to Low (Vgl) while maintaining the scanning signals on the first and second scanning lines Gb (1), Gb (2) at High. At the time T21b, the third thin film transistor Tb (i, 1, b) connected to the first scanning line Gb (1) and the second thin film transistor Tb (i, 2, r) connected to the second scanning line Gb (2) are maintained in the state of on, however, the first thin film transistor Tb (i, 3, g) connected to the third scanning line Gb (3) is turned off. Therefore, the third pixel electrode Eb (i, 1, b) in the first pixel row maintains the gray scale signal −(i, 1, b) that has been written thereon. In the case, the second pixel electrode Eb (i, 2, r) in the second pixel row and the first pixel electrode Eb (i, 3, g) in the third pixel row are provided with gray scale signal −(i, 1, b) that is not intended for these pixels; however, this state does not cause a problem in the display because this state lasts only for a brief period and is resolved within approximately one horizontal period to three horizontal periods as seen below.

Shortly after the time T21b, the gray scale signal applied to the signal line Sb (i) changes from −(i, 1, b) to −(i, 1, r). Thus, the first and second pixel electrodes Eb (i, 1, g), Eb (i, 1, r) in the first pixel row and the first pixel electrode Eb (i, 2, g) in the second pixel row are applied with the gray scale signal −(i, 1, r) via the thin film transistors that are maintained in the state of on.

At a time T21c, the scanning signal on the second scanning line Gb (2) is turned from High to Low while maintaining the scanning signal on the first scanning line Gb (1) at High. At the time T21c, the second thin film transistor Tb (i, 1, r) connected to the first scanning line Gb (1) is maintained in state of on, however, the first thin film transistor Tb (i, 2, g) connected to the second scanning line Gb (2) is turned off. Therefore, the second pixel electrode Eb (i, 1, r) in the first pixel row maintains the gray scale signal −(i, 1, r) thereafter. The first pixel electrode Eb (i, 2, g) in the second pixel row is written with the gray scale signal −(i, 1, r) that is not intended for that pixel; however, the display performance is not affected because that state lasts only for a brief period, and is resolved within approximately one horizontal period to two horizontal periods as readily understood form below descriptions. The electrical connection between the first pixel electrode Eb (i, 3, g) in the third pixel row and the two pixel electrodes (Eb (i, 1, b) in the first pixel row and the second pixel electrode Eb (i, 2, r) in the second pixel row) is cut off by the second thin film transistor Tb (i, 2, r) (which is OFF now) connected to the second scanning line Gb (2).

Shortly after the time T21c, the gray scale signal applied to the signal line Sb (i) is turned from −(i, 1, r) to −(i, 1, g), and therefore the first pixel electrode Eb (i, 1, g) in the first pixel row is applied with the gray scale signal −(i, 1, g) via the thin film transistor that has been maintained in the state of on. At a time T21d, the scanning signal of the first scanning line Gb (1) is turned from High to Low, and the first thin film transistor Tb (i, 1, g) connected to the first scanning line Gb (1) is turned off. Therefore, the first pixel electrode Eb (i, 1, g) in the first pixel row maintains the gray scale signal −(i, 1, g) corresponding to the coordinate thereof. At this point, the electrical connection between the third pixel electrode Eb (i, 1, b) in the first pixel row and the second pixel electrode Eb (i, 2, r) in the second pixel row is cut off by the third thin film transistor Tb (i, 1, b) connected to the first scanning line Gb (1), and also the electrical connection between the second pixel electrode Eb (i, 1, r) in the first pixel row and the first pixel electrode Eb (i, 2, g) in the second pixel row is cut off by the second thin film transistor Tb (i, 1, r) connected to the first scanning line Gb (1). Accordingly, in the horizontal period as described above, the appropriate gray scale signals are written onto the first, second and third pixels Pb (i, 1, g), Pb (i, 1, r), Pb (i, 1, b) in the first pixel row and will be maintained respectively after the horizontal period (because Gb(1) remains LOW until the next frame).

In the next horizontal period, gray scale signals are written onto the first, second and third pixels Pb (i, 2, g), Pb (i, 2, r), Pb (i, 2, b) in the second pixel row in a similar manner. In this horizontal period, each of the scanning signals of the second, third and fourth scanning lines Gb (2), Gb (3), Gb(4) is turned to High in synchronization with a start time T22a of the horizontal period. The period during which the scanning signal on the second scanning line Gb (2) should remain at High in the horizontal period is, for example, from the moment at which the gray scale signal +(i, 2, b) for the third pixel Pb (i, 2, b) in the second pixel column starts being supplied to the signal line Sb (i) until just before the gray scale signal +(i, 2, g) for the first pixel Pb (i, 2, g) in the second pixel column is terminated in Sb(i) (see FIG. 22). In this horizontal period, the period during which the scanning signal of the third scanning line Gb (3) should remain at High is, for example, from the moment at which the gray scale signal +(i, 2, b) for the third pixel Pb (i, 2, b) in the second pixel column starts being supplied to the signal line Sb (i) until just before the gray scale signal +(i, 2, r) for the second pixel Pb (i, 2, r) in the second pixel column in terminated in Sb(i). The period during which the scanning signal of the fourth scanning line Gb (4) should remain at High in this horizontal period is, for example, from the moment at which the gray scale signal +(i, 2, b) for the third pixel Pb (i, 2, b) in the second pixel column starts being supplied to the signal line Sb (i) until just before the gray scale signal +(i, 2, b) is terminated in Sb(i). The timing at which the scanning signal on the third scanning line Gb (3) is raised to High can be shifted to an earlier time in advance of the start time T22a by one-third of the horizontal period duration, for example. That period is marked as "D_C1" in FIG. 22. The time at which the scanning signal on the fourth scanning line Gb (4) is raised to High can be shifted to an earlier time in advance of the start time T22a of the horizontal period by two-third of the horizontal period duration, for example. That period is marked as "D_C2" in FIG. 22.

At the timing T22a, the first, second and third thin film transistors Tb (i, 2, g), Tb (i, 2, r), Tb (i, 2, b) that are connected to the second scanning line Gb (2) are turned on because the scanning signal on the second scanning line Gb (2) is raised to High. The first, second and third thin film transistors Tb (i, 3, g), Tb (i, 3, r), Tb (i, 3, b) that are connected to the third scanning line Gb (3) are also turned on because the scanning signal on the third scanning line Gb (3) is raised to High. In addition, the first, second and third thin film transistors Tb (i, 4, g), Tb (i, 4, r), Tb (i, 4, b) that are connected to the fourth scanning line Gb (4) are also turned on because the scanning signal on the fourth scanning line Gb (4) is raised to High. Thus, the gray scale signal +(i, 2, b) applied to the signal line Sb (i) is written onto the first, second and third pixel electrodes Eb (i, 2, g), Eb (i, 2, r) Eb (i, 2, b) in the second pixel row, the first and second pixel electrodes Eb (i, 3, g), Eb (i, 3, r) in the third pixel row, and onto the first pixel electrode Eb (i, 4, g) in the fourth pixel row.

At a time T22b, the scanning signal on the fourth scanning line Gb (4) is turned from High to Low while maintaining the scanning signals on the second scanning line Gb (2) and the third scanning line Gb (3) at High. At the time T22b, the third thin film transistor Tb (i, 2, b) connected to the second scanning line Gb (2) and the second thin film transistor Tb (i, 3, r) connected to the third scanning line Gb (3) are maintained in the ON state, however, the first thin film transistor Tb (i, 4, g) connected to the fourth scanning line Ga (4) is turned off. Therefore, the third pixel electrode Eb (i, 2, b) in the second pixel row is written with the gray scale signal +(i, 2, b) corresponding to the coordinate thereof and is kept in that state thereafter. The second pixel electrode Eb (i, 3, r) in the third pixel row and the first pixel electrode Eb (i, 4, g) in the fourth pixel row are written with the gray scale signal +(i, 2, b) that is not intended for these pixels; however, the state does not cause a problem in the display because the state lasts only for a brief period and is resolved within around one horizontal period to three horizontal periods, as will be seen below.

Shortly after the time T22b, the gray scale signal applied to the signal line Sb (i) is turned from +(i, 2, b) to +(i, 2, r). Therefore, the first and second pixel electrodes Eb (i, 2, g), Eb (i, 2, r) in the second pixel row and the first pixel electrode Eb (i, 3, g) in the third pixel row are applied with the gray scale signal +(i, 2, r) via the thin film transistors that are maintained in the ON state. Thus, in the second pixel Pb (i, 2, r) in the second pixel column, the temporarily stored wrong gray scale signal +(i, 2, b) is replaced with the right gray scale signal +(i, 2, r).

At a time T22c, the scanning signal of the second scanning line Gb (3) is turned from High to Low while maintaining the scanning signal of the second scanning line Gb (2) at High. At the time T22c, the second thin film transistor Tb (i, 2, r) connected to the second scanning line Gb (2) is maintained in the ON state, however, the first thin film transistor Tb (i, 3, g) connected to the third scanning line Gb (3) is turned off. Therefore, the second pixel electrode Ea (i, 2, r) in the second pixel row maintains the gray scale signal +(i, 2, r) corresponding to the coordinate thereof. The first pixel electrode Eb (i, 3, g) in the third pixel row is written with the gray scale signal +(i, 2, r) that is not intended for that pixel, however, the state does not cause a problem in the display because the state lasts only for a brief period and is resolved within approximately one horizontal period to two horizontal periods, as seen below. At this point, the electrical connection between the first pixel electrode Eb (i, 4, g) in the fourth pixel row and the two pixel electrodes (the third pixel electrode Eb (i, 2, b) in the second pixel row and the second pixel electrode Eb (i, 3, r) in the third pixel row) is cut off by the second thin film transistor Tb (i, 3, r) (which is now off) that is connected to the third scanning line Gb (3).

Shortly after the time T22c, the gray scale signal applied to the signal line Sb (i) is turned from +(i, 2, r) to +(i, 2, g). Consequently, the first pixel electrode Eb (i, 2, g) in the second pixel row is applied with the gray scale signal +(i, 2, g) via the thin film transistor that is maintained in the ON state. That is to say, in the first pixel Pb (i, 2, g) in the second pixel row, the previous applied wrong gray scale signal is replaced with the correct gray scale signal corresponding to its coordinates thereof. At a time T22d, the scanning signal on the second scanning line Gb (2) is turned from High to Low. At the time T22d, the first thin film transistor Tb (i, 2, g) connected to the second scanning line Gb (2) is turned off, and therefore the first pixel electrode Eb (i, 2, g) in the second pixel row maintains the gray scale signal +(i, 2, g) corresponding to the coordinates thereof. The electrical connection between the third pixel electrode Eb (i, 2, b) in the second pixel row and the second pixel electrode Eb (i, 3, r) in the third pixel row is cut off by the third thin film transistor Tb (i, 2, b) connected to the second scanning line Gb (2), and also the electrical connection between the second pixel electrode Eb (i, 2, r) in the second pixel row and the first pixel electrode Eb (i, 3, g) in the third pixel row is cut off by the second thin film transistor Tb (i, 2, r) that is connected to the second scanning line Gb (2). Accordingly, in the horizontal period as described above, appropriate gray scale signals are written onto the first, second and third pixels Pb (i, 2, g), Pb (i, 2, r), Pb (i, 2, b) in the second pixel row.

In the next horizontal period, appropriate gray scale signals are provided for the first, second and third pixels Pb (i, 3, g), Pb (i, 3 r), Pb (i, 3, b) in the third pixel row in a manner similar to above. In this horizontal period, each of the scanning signals of the third, fourth and fifth scanning lines Gb (3), Gb (4), Gb (5) is turned to High in synchronization with a start time T23a of the horizontal period. In the horizontal period, the period during which the scanning signal of the third scanning line Gb (3) should remain at High is, for example, from the moment at which the gray scale signal −(i, 3, b) for the third pixel Pb (i, 3, b) in the third pixel row starts being supplied to the signal line Sb (i) until just before the gray scale signal −(i, 3, g) for the first pixel Pb (i, 3, g) in the third pixel row is terminated. In the horizontal period, the period during which the scanning signal of the fourth scanning line Gb (4) remains at High is, for example, from the moment at which the gray scale signal −(i, 3, b) for the third pixel Pb (i, 3, b) in the third pixel row starts being supplied to the signal line Sb (i) until just before the gray scale signal −(i, 3, r) for the second pixel Pb (i, 3, r) in the third pixel column is terminated. In this horizontal period, the period during which the scanning signal on the fifth scanning line Gb (5) should remain at High is, for example, from the moment at which the gray scale signal −(i, 3, b) for the third pixel Pb (i, 3, b) in the third pixel row starts being supplied to the signal line Sb (i) until just before that gray scale signal is terminated in Sb(i). The timing at which the scanning signal on the fourth scanning line Gb (4) is raised to High can be shifted to an earlier time in advance of the start time T23a by one-third of the horizontal period duration, for example. That period is marked as "D_C1" in FIG. 22. The time at which the scanning signal on the fifth scanning line Gb (5) is raised to High can be shifted to an earlier time in advance of the start time T23a of the horizontal period by two-third of the horizontal period duration, for example. That period is marked as "D_C2" in FIG. 22. As in the similar cases described above, by adjusting the HIGH period appropriately in this way, the pulse width of the three HIGH pulses in each scanning signal can be made the same, which may be advantageous from the circuit design perspectives.

At the time T23a, the first, second and third thin film transistors Tb (i, 3, g), Tb (i, 3, r), Tb (i, 3, b) connected to the third scanning line Gb (3) are turned on as a result of turning the scanning signal on the third scanning line Gb (3) to High. The first, second and third thin film transistors Tb (i, 4, g), Tb (i, 4, r), Tb (i, 4, b) connected to the fourth scanning line Gb (4) are also turned on as a result of turning the scanning signal on the third scanning line Gb (4) to High. In addition, the first, second and third thin film transistors Tb (i, 5, g), Tb (i, 5, r), Tb (i, 5, b) connected to the fifth scanning line Gb (5) are turned on as a result of turning the scanning signal on the fifth scanning line Gb (5) to High. Therefore, the gray scale signal −(i, 3, b) applied to the signal line Sb (i) is written onto at the first, second and third pixel electrodes Eb (i, 3, g), Eb (i, 3, r), Eb (i, 3, b) in the third pixel row, the first and second pixel electrodes Eb (i, 4, g), Eb (i, 4, r) in the fourth pixel row, and onto the first pixel electrode Eb (i, 5, g) in the fifth pixel row.

At a time T23b, the scanning signal on the fifth scanning line Gb (5) is turned from High to Low while maintaining the scanning signals on the third and fourth scanning lines Gb (3), Gb(4) at High. At the time T23b, the third thin film transistor Tb (i, 3, b) connected to the third scanning line Gb (3) and the second thin film transistor Tb (i, 4, r) connected to the fourth scanning line Gb (4) are maintained in the ON state, however, the first thin film transistor Tb (i, 5, g) connected to the fifth scanning line Gb (5) is turned off. Therefore, the third pixel electrode Eb (i, 3, b) in the third pixel row maintains the gray scale signal −(i, 3, b) thereafter. The second pixel electrode Eb (i, 4, r) in the fourth pixel row and the first pixel electrode Eb (i, 5, g) in the fifth pixel row are written with the gray scale signal −(i, 3, b) that is not intended for those pixels; however, the display performance is not affected because the state lasts only for a brief period and is resolved within about one horizontal period to three horizontal periods.

Shortly after the time T23b, the gray scale signal applied to the signal line Sb (i) is turned from −(i, 3, b) to −(i, 3, r). Thus, the first and second pixel electrodes Eb (i, 3, g), Eb (i, 3, r) in the third pixel row and the first pixel electrode Eb (i, 4, g) in the fourth pixel row are applied with the gray scale signal −(i, 3, r) via the thin film transistors that are maintained in the ON state. Thus, in the second pixel Pb (i, 3, r) of the third pixel column, the previously applied wrong gray scale signal is replaced with the correct gray scale signal.

At a time T23c, the scanning signal on the fourth scanning line Gb (4) is turned from High to Low while maintaining the scanning signal of the third scanning line Gb (3) at High. At the time T23c, the second thin film transistor Tb (i, 3, r) connected to the third scanning line Gb (3) is maintained in the ON state, however, the first thin film transistor Tb (i, 4, g) connected to the fourth scanning line Gb (4) is turned off. Therefore, the second pixel electrode Ea (i, 3, r) in the third pixel row maintains the gray scale signal −(i, 3, r) corresponding to the coordinate thereof. The first pixel electrode Eb (i, 4, g) in the fourth pixel row is written with the gray scale signal −(i, 3, r) that is not intended for that pixel, however, the state does not cause any problem in the display because the state lasts only for a brief duration and is resolved within approximately one horizontal period to two horizontal periods, as readily understood. At this point, the electrical connection between the first pixel electrode Eb (i, 5, g) in the fifth pixel row and two pixel electrodes (the third pixel electrode Eb (i, 3, b) in the third pixel row and the second pixel electrode Eb (i, 4, r) in the fourth pixel row) is cut off by the second thin film transistor Tb (i, 4, r) (which is now off) connected to the fourth scanning line Gb (4).

Shortly after the time T23c, the gray scale signal applied to the signal line Sb (i) changes from −(i, 3, r) to −(i, 3, g), and therefore, the first pixel electrode Eb (i, 3, g) in the third pixel row is applied with the gray scale signal −(i, 3, g) via the thin film transistor that is maintained in the ON state. Thus, in the first pixel Pb (i, 3, g) in the third pixel row, the previously applied wrong gray scale signal is replaced with the correct gray scale signal. At a time T23d, the scanning signal on the second scanning line Gb (3) is turned from High to Low. At the time T23d, the first thin film transistor Tb (i, 3, g) connected to the third scanning line Gb (3) is turned off. Therefore, the first pixel electrode Eb (i, 3, g) in the third pixel row maintains the gray scale signal −(i, 3, g) corresponding to the coordinate thereof thereafter. The electrical connection between the third pixel electrode Eb (i, 3, b) in the third pixel row and the second pixel electrode Eb (i, 4, r) in the fourth pixel row is cut off by the third thin film transistor Tb (i, 3, b) connected to the third scanning line Gb (3), and also the electrical connection between the second pixel electrode Eb (i, 3, r) in the third pixel row and the first pixel electrode Eb (i, 4, g) in the fourth pixel row is cut off by the second thin film transistor Tb (i, 3, r) connected to the third scanning line Gb (3). Accordingly, in this horizontal period as described above, the appropriate gray scale signals are written onto the first, second and third pixels Pb (i, 3, g), Pb (i, 3, r), Pb (i, 3, b) in the third pixel row.

In the subsequent horizontal periods, similar operations are performed on the subsequent rows of pixels, and as a result, the display apparatus 1b can display an appropriate image in accordance with the video signal provided. As described above, in the display apparatus 1b, the number of signal lines and the number of output terminals in the source driver can be reduced while the number of scanning lines essentially remains the same because pixels connected to one signal line are also connected to separate set(s) of pixels via an array(s) of thin film transistors. Thus, a pitch between terminals of the LSI of the source driver can be made wider, and the source driver can be easily connected when mounting the source driver on the display panel 210. In addition, the invention allows the LSI of the source driver to be miniaturized because the number of output terminals in the source driver can be significantly reduced.

In the above-described second exemplary embodiment, the first pixel, the second pixel and the third pixel in each group are used for green color, red color and blue color, respectively. Different assignments of color are, of course, possible. For example, the first pixel may be used for red or green color, the second pixel for blue or green color, and the third pixel for green or red color. Furthermore, the roles of the pixels do not have to be determined in accordance with color they represent. For example, two or more of the three pixels in the group can represent the same color.

Figure 23:
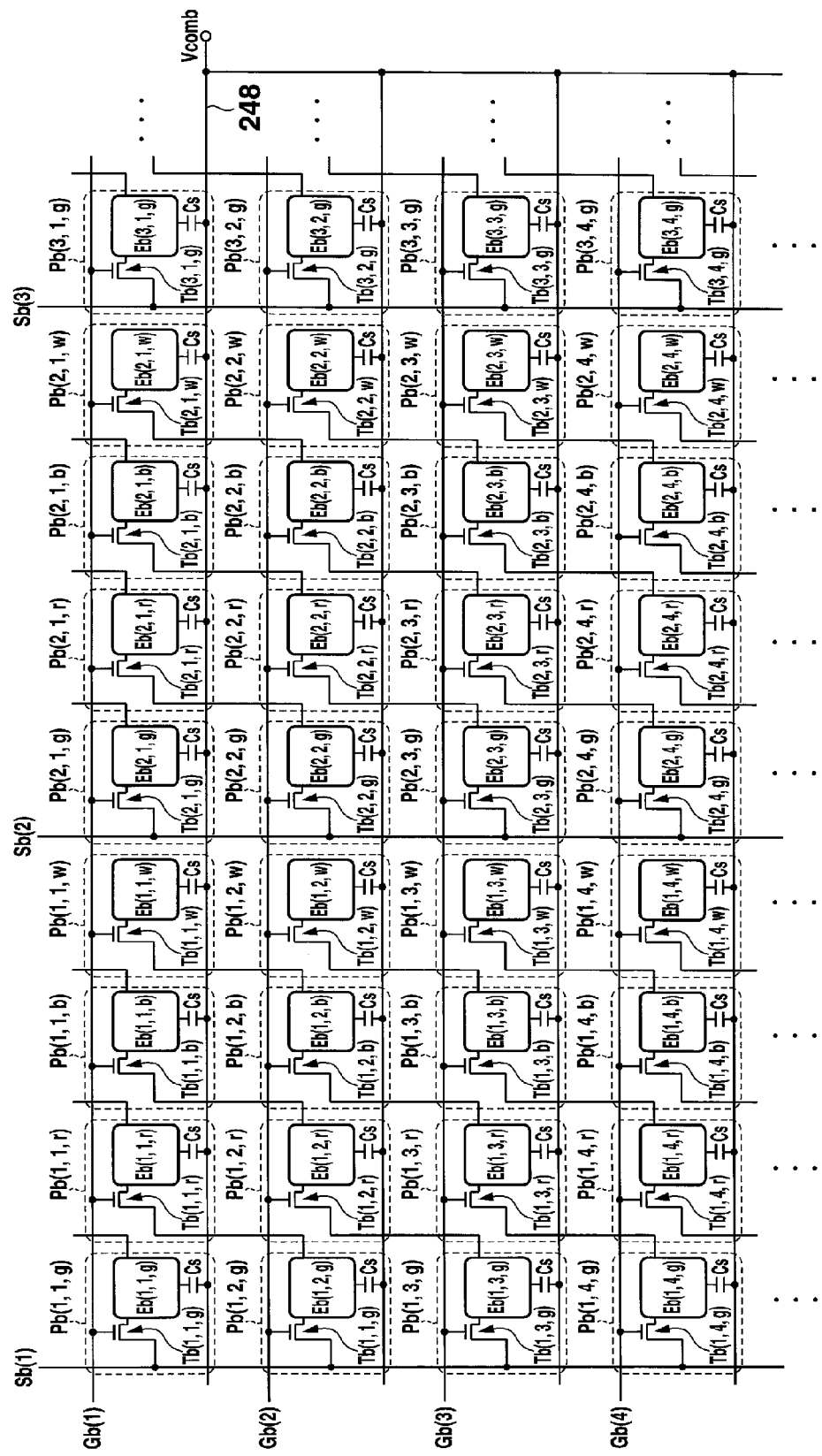
FIG. 23 is a figure showing an exemplary variation of the pixel location in the display apparatus of the second exemplary embodiment.
Figure 24:
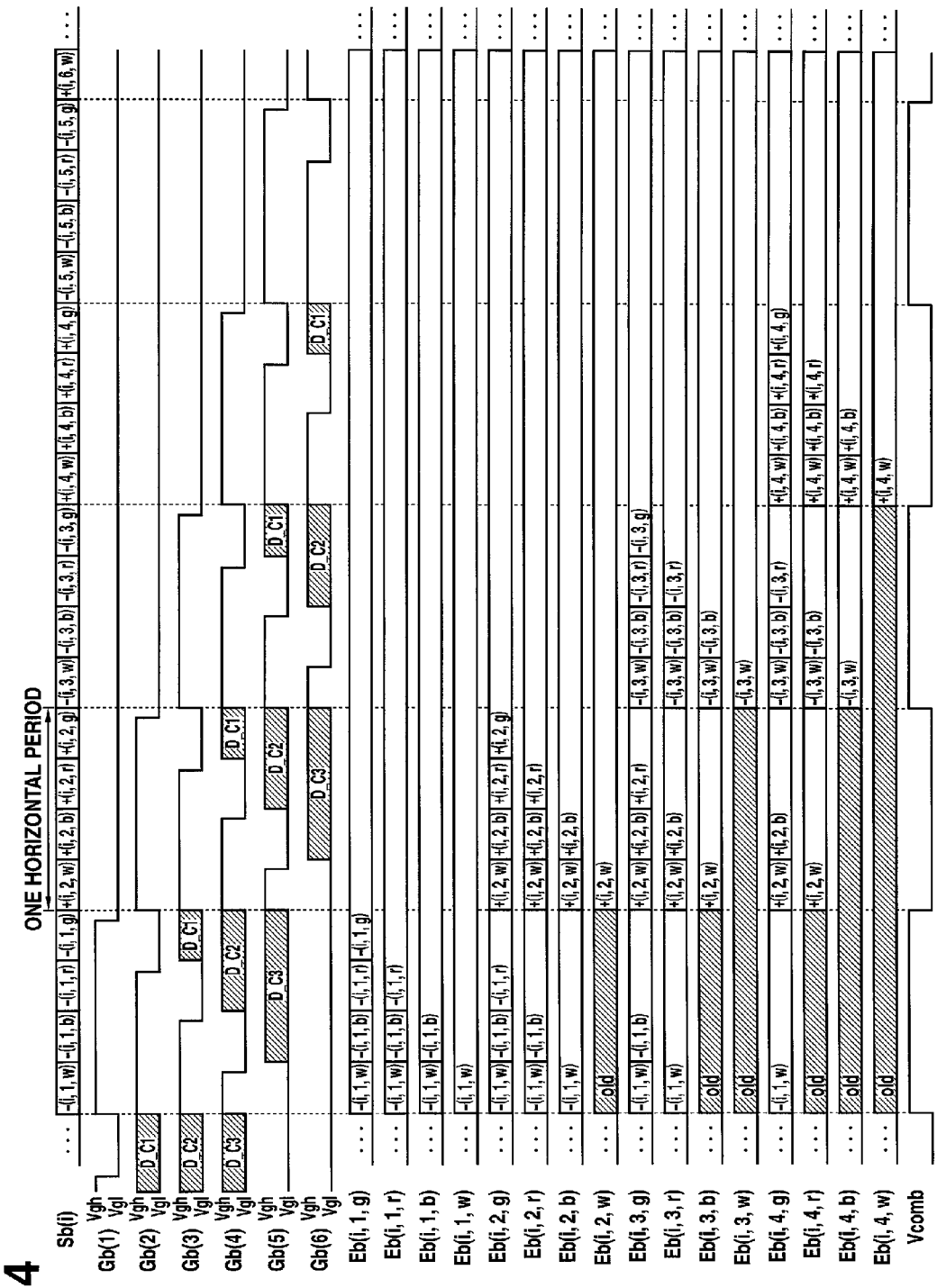
FIG. 24 is a timing chart showing an operation of the display apparatus in case of the pixel location of FIG. 23.

In the above-described second exemplary embodiment, three columns of pixels are taken care of by one signal line. As shown in FIGS. 23-24, a larger number of columns of pixels can be assigned to one signal line. When the horizontal period is divided into the number n (n=3 in FIG. 17, n=4 in FIG. 24), the scanning signal on each scanning line is turned to High n times in each frame. Then, for example, for a given row of pixels (n pixels in general; 4 pixels in FIG. 23), the pixel that needs to be written with help of the largest number of thin film transistors (the rightmost pixels in the above case and in FIG. 23) is written first, and subsequently, the pixel that requires the second largest number of transistors to write thereon is written with a corresponding gray scale signal, and so on so forth. FIGS. 23 and 24 show an example of using four sub-pixels that are composed of a first pixel Pb (i, j, g) used for green color, a second pixel Pb (i, j, r) used for red color, a third pixel Pb (i, j, b) used for blue color and a forth pixel Pb (i, j, w) used for white color located in that order in the extending direction of the scanning lines.

Figure 25:
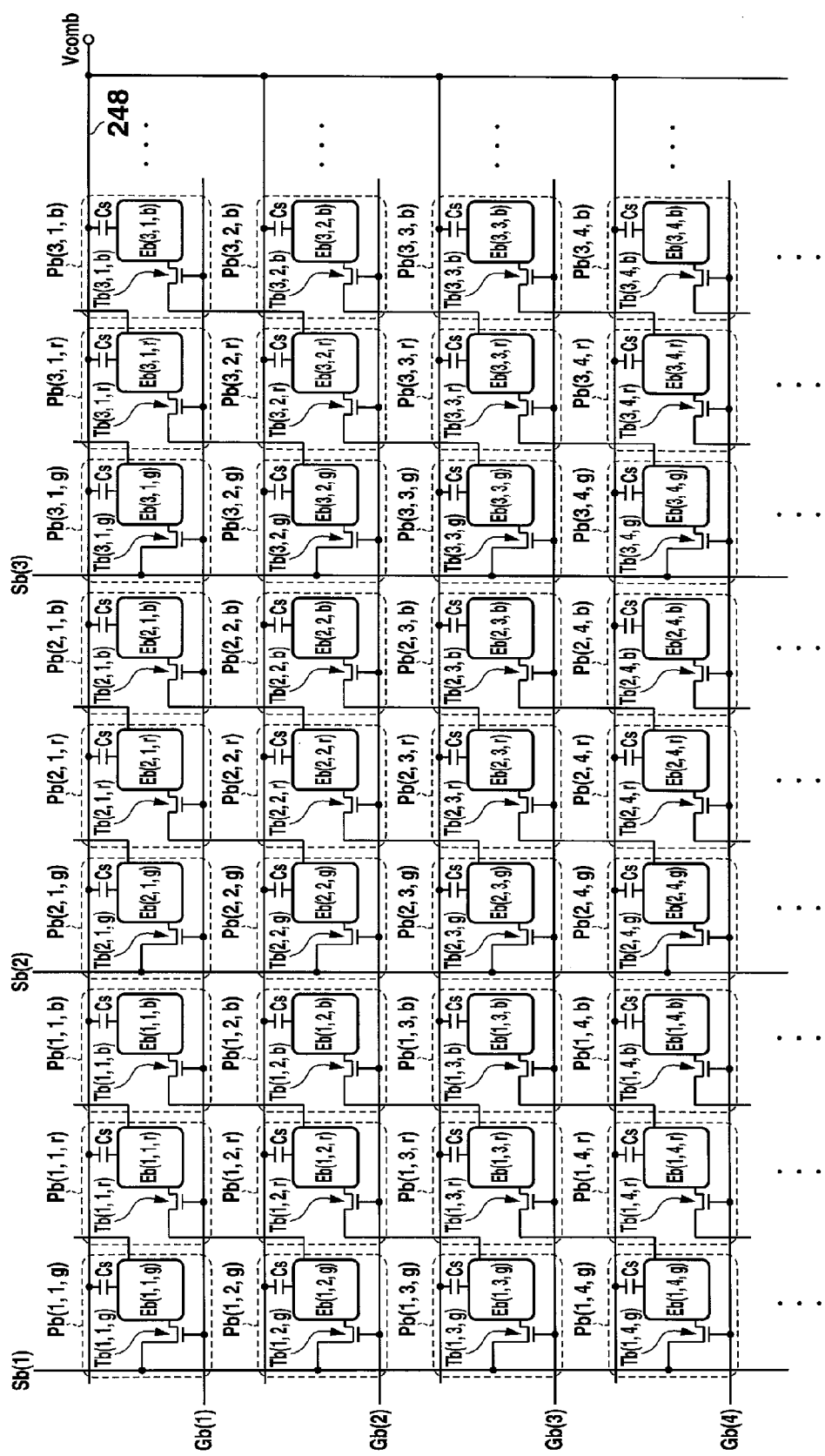
FIG. 25 is a diagram depicting an exemplary variation of the pixel location in the display apparatus of the second exemplary embodiment.
Figure 26:
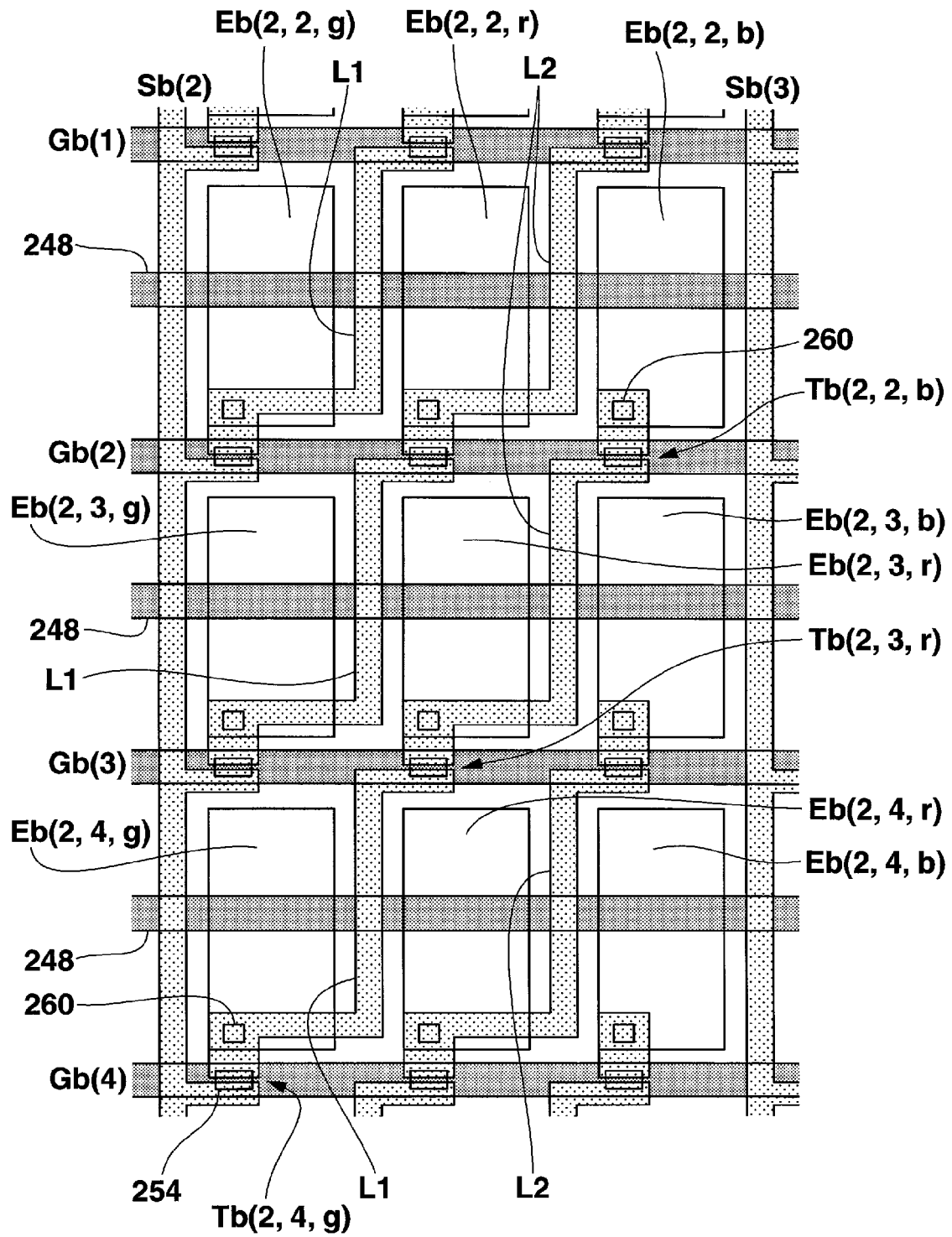
FIG. 26 is a top view depicting a pixel structure in case of the pixel location of FIG. 25.

The above-described second exemplary embodiment describes an exemplary structure of the display panel 210, in which the second thin film transistor Tb (i, j−1, r), which controls an electrical connection between the first pixel electrode Eb (i, j, g) located in the j-th row and the second pixel electrode Eb (i, j−1, r) located in the j−1th row, is connected to a scanning line on the upper side of the j−1th row of pixels. In other words, the scanning line connected to the first to third transistors for a particular row is disposed on the upper side of the row. However, as shown FIGS. 25 and 26, such a scanning line can be disposed on the lower side of the row in question. As shown in FIGS. 25 and 26, the second thin film transistor Tb (i, j−1, r), which controls an electrical connection between the first pixel electrode Eb (i, j, g) located in the jth row and the second pixel electrode Eb (i, j−1, r) located in the j−1th row can be connected to a scanning line can be disposed the j−1th row and jth row. This structure can be advantageous in that it can provide for a larger aperture ratio and a higher reliability due to its simpler structure. The display apparatus using the above structure can be driven by the same driving operation as that of the second exemplary embodiment.

Third Embodiment

Figure 27:
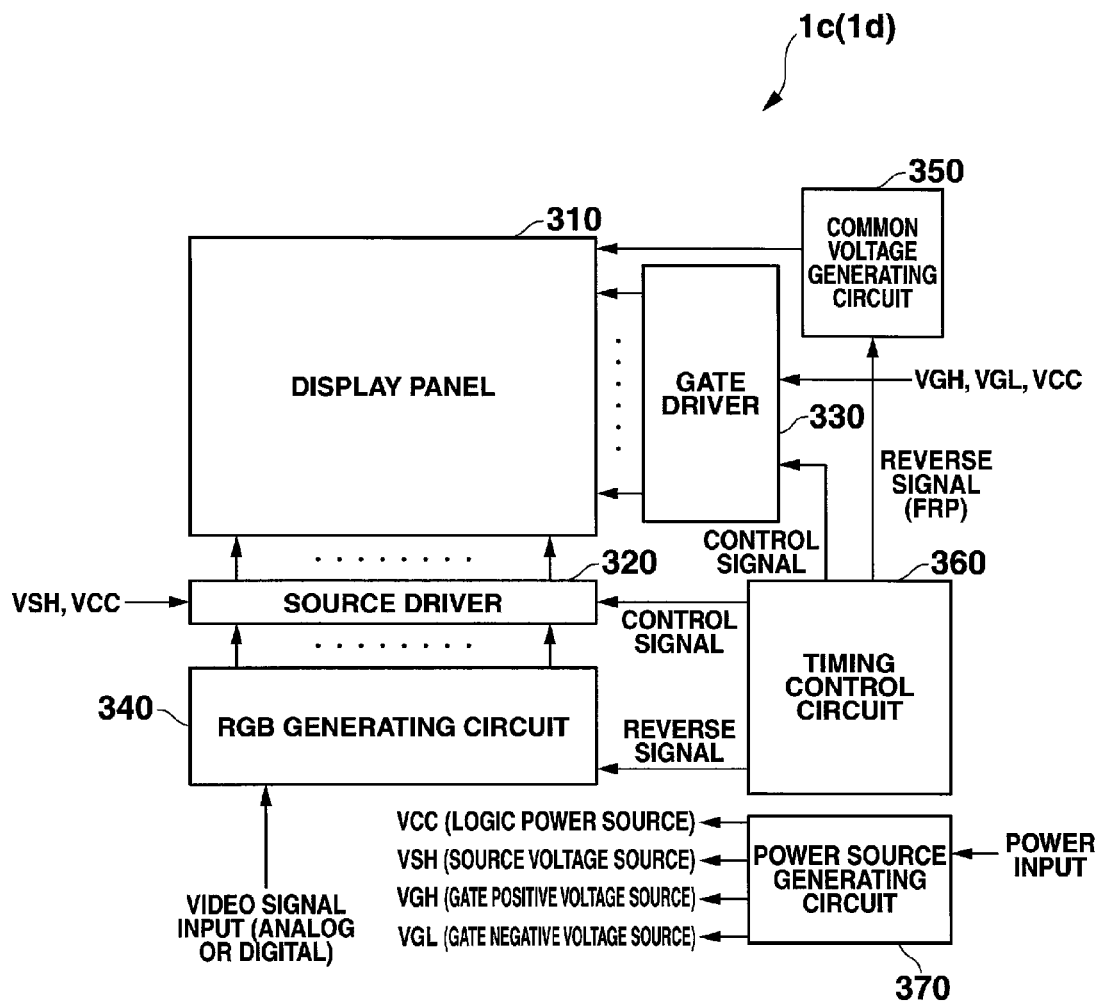
FIG. 27 is a block diagram showing a schematic whole structure of a display apparatus of a third exemplary embodiment.
Figure 28:
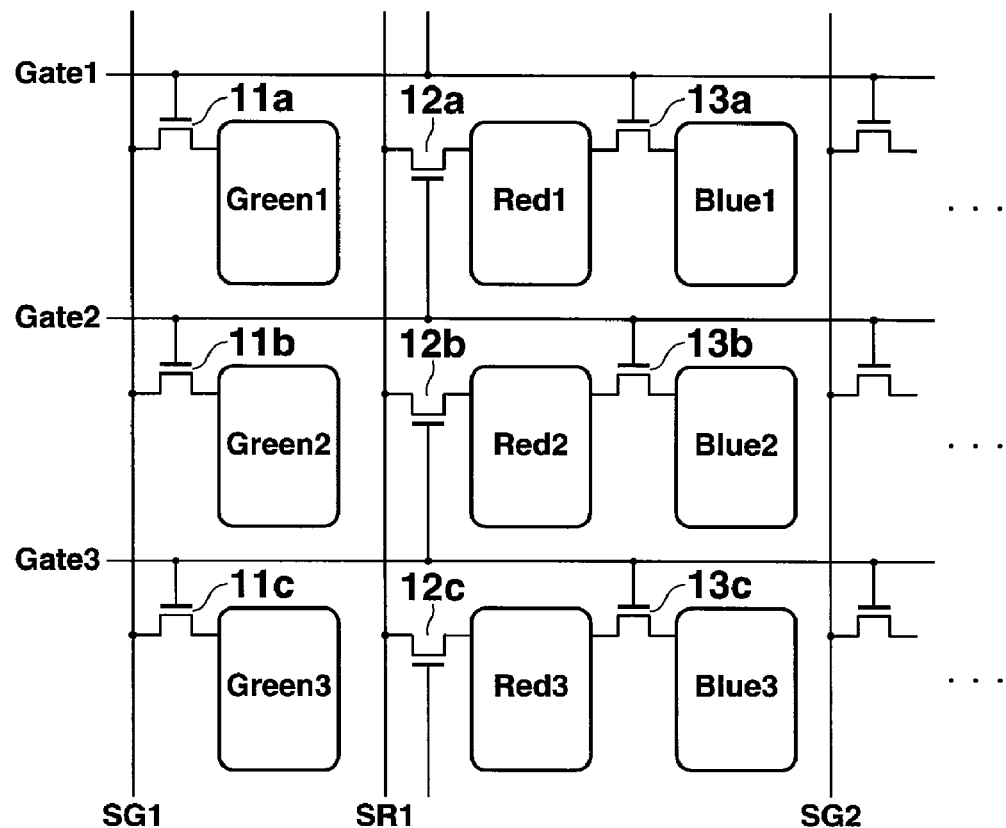
FIG. 28 is a figure showing a connecting structure of pixels in the display apparatus of the third exemplary embodiment.

A schematic whole structure of a display apparatus 1c according to a third exemplary embodiment of the present invention is shown in FIG. 27. The display apparatus 1c is an LCD apparatus that includes a display panel 310, a source driver 320, a gate driver 330, an RGB generating circuit 340, a common-voltage generating circuit 350, a timing control circuit 360 and a power source generating circuit 370. FIG. 28 shows a connecting structure of pixels in the third exemplary embodiment. FIG. 28 shows a structure of nine pixels in the display panel 310. However, other pixels are configured with the same connecting structure as that of FIG. 28. In addition, FIG. 28 shows an example of color display. Therefore, color filter of red, green and blue are located in front of the corresponding pixels. The pixels used for a green display are marked as "Green N" (N=1, 2, 3)", the pixels used for a red display are marked as "Red N" (N=1, 2, 3) and the pixels for a blue display are marked as "Blue N" (N=1, 2, 3) in FIG. 28.

In the third exemplary embodiment, scanning lines Gate 1, Gate 2 and Gate 3 and signal lines SG1, SR1 and SG2 are located so as to intersect with each other (substantially at right angle, for example). Adjacent to the respective intersections of the scanning lines Gate 1, Gate 2 and Gate 3 and the signal line SG1, pixels (pixel electrodes) Green 1, Green 2 and Green 3 are disposed respectively. The pixels Green 1, Green 2 and Green 3 are connected to the scanning lines Gate 1, Gate 2 and Gate 3, respectively, and the signal line SG1 via the thin film transistors 11a, 11b and 11c, respectively. More specifically, the pixels Green 1, Green 2 and Green 3 are connected to the respective drains (or source) of the thin film transistors 11a, 11b and 11c, respectively. The sources (or drains) of the thin film transistors 11a, 11b and 11c are connected to the signal line SG1, and the gates of the thin film transistors 11a, 11b and 11c are connected to the scanning lines Gate 1, Gate 2 and Gate 3, respectively.

Adjacent to the respective intersections of the scanning lines Gate 1, Gate 2 and Gate 3 and the signal line SR1, the pixels (pixel electrodes) Red 1, Red 2 and Red 3 are disposed respectively. The pixels Red 1, Red 2 and Red 3 are connected to the scanning lines Gate 1, Gate 2 and Gate 3, respectively, and the signal line SR1 via the thin film transistors 12a, 12b and 12c, respectively. More specifically, the pixels Red 1, Red 2 and Red 3 are connected to the respective drains (or sources) of the thin film transistors 12a, 12b and 12c, respectively. The sources (or drains) of the thin film transistors 12a, 12b and 12c are connected to the signal line SR1, and the gates of the thin film transistors 12a, 12b and 12c are connected to the scanning lines one row below (Gate 2, Gate 3, ... ). The pixels Red 1, Red 2 and Red 3 are connected to the pixels Blue 1, Blue 2 and Blue 3, respectively, via the thin film transistors 13a, 13b and 13c, respectively. More specifically, the pixels Blue 1, Blue 2 and Blue 3 are connected to the respective drains (or sources) of the thin film transistors 13a, 13b and 13c. The sources (or drains) of the transistors 13a, 13b, and 13c are connected to the drains (or sources) of the thin film transistors 12a, 12b and 12c, respectively, via the pixels Red 1, Red 2 and Red 3, respectively. The respective gates of the thin film transistors 13a, 13b, 13c are connected to the scanning lines Gate 1, Gate 2, and Gate 3, respectively.

In the above-described structure, the scanning lines Gate 1, Gate 2 and Gate 3 are applied with the respective scanning signals from the gate driver 330. The signal line SG1 is applied with a gray scale signal related to the green display from the source driver 320, and the signal line SR1 carries a gray scale signal related to the blue display and a gray scale signal related to the red display, which come from the source driver 320, using time sharing. Thus, in an example of the display panel 310, the color arrangement is such that pixels for the same color are disposed in columns and for each row, pixels for different colors repeat, for example, in the order of red, green and blue. The pixels used for the red display are connected (via transistors) to the pixels used for the blue display, and are connected to the signal line (e.g. SR1) in respective rows. The pixels used for the green display are connected to a signal line (SG1) that is different from the signal line (SR1) to which the pixels for the red display are connected. In the structure of the third exemplary embodiment as shown in FIG. 28, the number of signal lines can be reduced to two-third of the number of pixels in one row. However, the number of scanning lines essentially remains the same.

Figure 29:
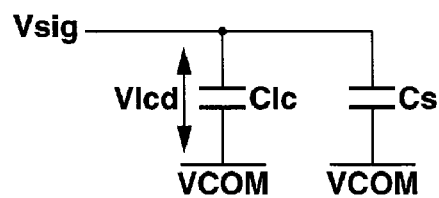
FIG. 29 is a diagram showing an equivalent circuit of one pixel in the display apparatus of the third exemplary embodiment.

FIG. 29 is a diagram showing an equivalent circuit of one pixel of pixels used in the display apparatus 310. Each pixel includes a pixel capacity Clc and a compensation capacity (or auxiliary capacity) Cs as shown in FIG. 29. The pixel capacity Clc is connected to the thin film transistors, and is composed of a liquid crystal disposed between electrodes that are located in parallel. The pixel capacity Clc and the compensation capacity Cs are connected to a common signal line and are applied with a common signal VCOM. In this structure, when the thin film transistor connected to the pixel capacity Clc is turned on, a gray scale signal Vsig is applied to the pixel capacity Clc via the thin film transistor. When the pixel capacity Clc is applied with the gray scale signal Vsig, an alignment of the liquid crystal changes according to a voltage differential between the gray scale signal Vsig and the common signal VCOM, and therefore, the permeability of liquid crystal changes. Thus, the display panel is displayed by changing the permeability of light emitted from a backlight unit that is located behind the pixels shown in FIG. 29.

The source driver 320 is connected to the signal lines of FIG. 28 and receives the pixel data for R, G, B output from the RGB generating circuit 340 in a prescribed unit in accordance with a horizontal synchronous signal (e.g. clock signal, start signal, latch control signal) output from the timing control circuit 360. The gate driver 330 is connected to the scanning lines of FIG. 28 and applies the scanning signal for turning on/off each of the first thin film transistors connected to the scanning lines in accordance with a vertical control signal output from the timing control circuit 360. The RGB generating circuit 340 outputs each pixel data to the source driver 320. For example, it outputs the pixel data of R, G, B generated by the circuit 340 according to a video signal (analog or digital) provided from an external of the display apparatus 1c. In the case, the RGB generating circuit 340 receives a reverse signal (FRP) from the timing control circuit 360 at a prescribed interval (e.g. every frame, every field, for one line), and reverses the bit data of the pixel data for outputting to the source driver 320 every time the circuit 340 receives the reverse signal. The polarity of the gray scale signal applied to each pixel is reversed at the prescribed interval by reversing the bit data of the pixel data at that interval, and therefore a driving voltage of each pixel can become alternating current voltage.

The common-voltage generating circuit 350 generates the common signal VCOM that is reversed in polarity at a prescribed interval in accordance with the reverse signal output from the timing control circuit 360 and applies the common signal to each pixel. The timing control circuit 360 generates control signals such as a vertical control signal, a horizontal control signal, a reverse signal and the like. The timing control circuit 360 outputs the reverse signal to the RGB generating circuit 340 and to the common-voltage generating circuit 350, outputs the vertical control signal to the gate driver 330, and outputs the horizontal control signal to the source driver 320. The power source generating circuit 370 generates voltage sources Vgh, Vgl that are needed for generating the scanning signal, and provides the above voltage sources with the gate driver 330. The power source generating circuit 370 also generates a voltage source Vsh that is needed for generating the gray scale signals, and provides the voltage source to the source driver 320. In addition, the power source generating circuit 370 generates logic power source Vcc, and provides the power source Vcc to the source driver 320 and the gate driver 330.

Figure 30:
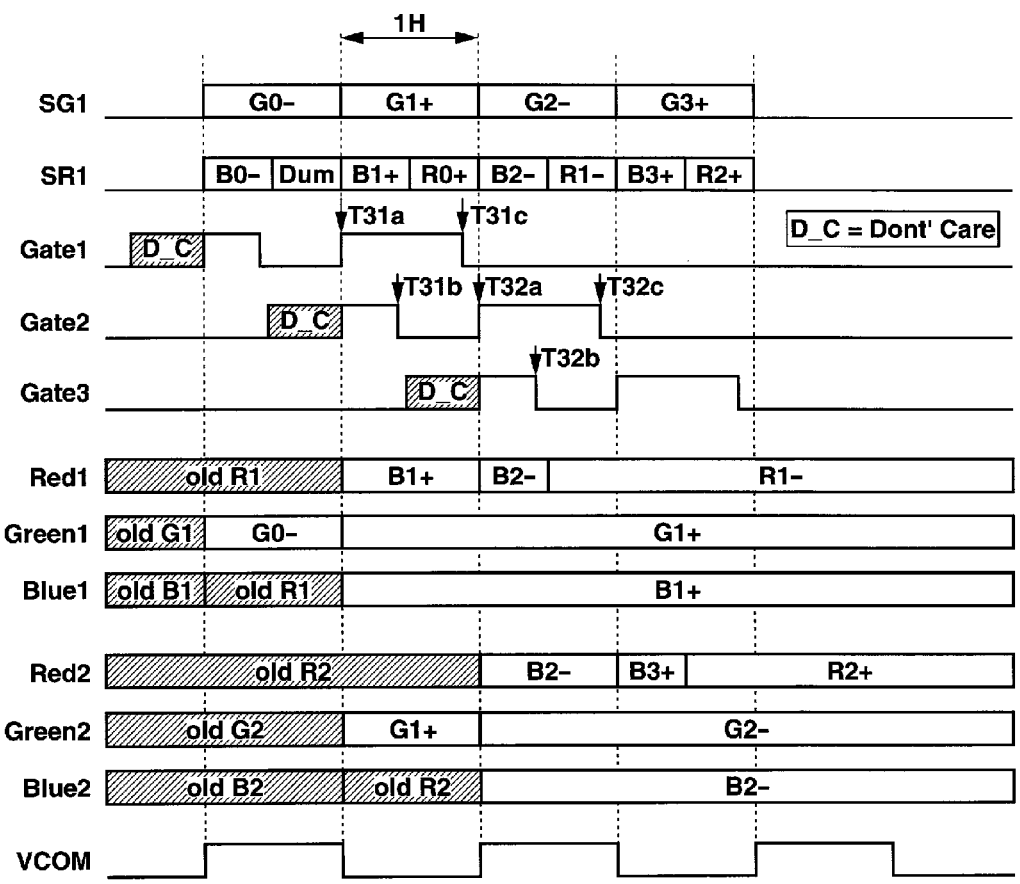
FIG. 30 is a timing chart showing an operation of the display apparatus of the third exemplary embodiment.

An operation of the display apparatus of the third exemplary embodiment will now be given. FIG. 30 is a timing chart showing the operation of the display apparatus 1c of the third exemplary embodiment. From the top, FIG. 30 shows: a gray scale signal applied to the signal line SG1, a gray scale signal applied to the signal line SR1, the scanning signal applied to the scanning line Gate 1, the scanning signal applied to the scanning line Gate 2, the scanning signal applied to the scanning line Gate 3, a display state of the pixel Red1, a display state of the pixel Green1, a display state of the pixel Blue1, a display state of the pixel Red2, a display state of the pixel Green2, a display state of the pixel Blue2, and a common signal VCOM. In the third exemplary embodiment, the red display data and the blue display data are alternately input to the source driver 320 every half horizontal period and are output in that manner onto the signal line SR1. In this example, for a given horizontal period, the pixel data related to the red display is delayed by one horizontal period relative to the data for the blue display and is input to the source driver 320 in that manner. The pixel data related to the blue display (for instance, the display data related to the signal line SG1) is input to the source driver 320 every one horizontal period in synchronization with the pixel data related to the red display and the blue display. More specifically, in the first half of one horizontal period, the pixel data for the blue display for a particular associated row is input, and in the latter half of the horizontal period, the pixel data for the red display for the preceding row is input. In other words, in the first half of one horizontal period (the horizontal period during which the pixel data for the green display in a particular row is supplied to the signal line SG1), the pixel data for the blue display in the same row is input to the signal line SR1, and in the latter half of the horizontal period, the pixel data for the red display in the preceding row is input to the signal line SR1.

The reverse signal is controlled so as to reverse the bit data of the pixel data (that is, the polarity of gray scale data) for the red, blue and green displays every horizontal period. When the reversal of the bit data in the pixel data is not carried out, the gray scale signal is marked as "+" in FIG. 30, and when the polarity reversal of the bit data in the pixel data is carried out, the gray scale signal is marked as "−". For example, the polarity of the common signal VCOM may be reversed every horizontal period in accordance with the polarity reversal of the gray scale signal as shown in FIG. 30. In this example, therefore, as shown in FIG. 30, for this frame, the gray scale signals for the blue and red displays: B0−, Dum, B1+, R0+, B2−, R1−, . . . , are successively applied to the signal line SR1 in synchronization with the gray scale signals for the green display: G0−, G1+, G2−, . . . which are applied to the signal line SG1. The mark "Dum" indicates a dummy gray scale signal, and is provided for delaying the gray scale signal related to the red display by half horizontal period with respect to the gray scale signal for the blue display. The dummy signal may be, for example, the gray scale signal in the previous frame for the red display in the last row, but can be any other signal or arbitrary signal.

An exemplary operation at the pixels Green 1, Blue 1 and Red 1 connected to the scanning line Gate 1 and the pixels Green 2, Blue 2 and Red 2 connected to the scanning line Gate 2 will now be described with reference to the drawings. The other column pixels are controlled in the same manner as the pixels described below. The mark "old" shown in FIG. 30 is the pixel data of the previous frame, and signals R0, G0 and B0 are the corresponding pixel data for a preceding row of pixels. In the third exemplary embodiment, the scanning signal on the scanning lines is raised to High twice every frame. In a prescribed horizontal period of each frame, gray scale signals G1+ and B1+ are written onto the pixels Green 1 and Blue 1, respectively. In this horizontal period, the scanning signals on the scanning line Gate 1 and the scanning line Gate 2 are both turned to High in synchronization with a start timing T31a of the horizontal period. The period during which the scanning signal on the scanning line Gate 1 should remain at High is, for example, from the moment at which the gray scale signal G1+ start being supplied to the signal line SG1 until just before the gray scale signal G1+ ends. In this example, the above period equals the period form the moment at which the gray scale signal B1+ starts being supplied to the signal line SR1 until just before the gray scale signal R0+ on the signal line SR1 ends. In this horizontal period, the period during which the scanning signal on the scanning line Gate 2 should remain at High is, for example, from the moment at which the gray scale signal B1+ starts being supplied to the signal line SR1 until just before the gray scale signal B1+ ends. The starting time at which the scanning signal on the scanning line Gate 2 is raised to High can be shifted to an earlier time in advance of the time T31a by a half of the horizontal period duration. FIG. 30 shows this period as "D_C." By appropriately adjusting the width of the D.C., the HIH pulses necessary in each scanning signal may have the same pulse width, for example, in which case the circuit design may become easier.

At the time T31a, the thin film transistor 11a and the thin film transistor 13a are both turned on as a result of turning the scanning signal on the scanning line Gate 1 to High. The thin film transistors 11b, 12a and 13b are also turned on as a result of turning the scanning signal on the scanning line Gate 2 to High. Thus, the gray scale signal G1+ applied to the signal line SG1 is written onto the pixels Green 1 and Green 2. At the same time, the gray scale signal B1+ applied to the signal line SR1 is written onto the pixels Red 1 and Blue 1. In this case, because the thin film transistor 12b is turned off despite the fact that the thin film transistor 13b is in the ON state, there is no electrical connection between the signal line SR1 and the pixel Red 2 although the electrical connection between the pixels Red 2 and Blue 2 may cause charges to move there between. Consequently, the pixels Red 2 and Blue 2 exhibit the mean voltage level that is determined by the respective pixel voltages Vlcd that are applied in the previous frame to these pixels and the values of the respective compensation capacities Cs thereof. However, this state does not cause a problem in the displays because the state only last for a brief period and is resolved within approximately one horizontal period to two horizontal periods as will be seen below. Here, the pixel Green 2 is also written with the gray scale signal G1+ applied to the pixel Green 1, however, a problem in the display is not caused because this state only lasts for a brief period and is resolved within about one horizontal period to two horizontal periods as will be seen below.

At a time T31b, while maintaining the scanning signal on the scanning line Gate 1 at High, the scanning signal on the scanning line Gate 2 is turned from High to Low. At the time T31b, the thin film transistor 12a is turned off while the thin film transistor 13a is maintained in the ON state. Therefore, the pixels Red 1 and Blue 1 are electrically connected with respect to each other, and are not connected to the signal line SR1. In the case, the pixel voltage Vlcd appeared at the pixel Red 1 is the gray scale voltage B1+ applied to the pixel Blue 1. However, the state does not cause any problem in the display because the state lasts only for a brief period and is resolved within about one horizontal period to two horizontal periods as described later. The pixel Green 1 is connected to the signal line SG1 applied with the gray scale signal G1+ via the thin film transistor 11a. At a time T31c, the scanning signal on the scanning line Gate 1 is turned from High to Low. At the time T31c, the thin film transistors 11a and 13a are turned off, and therefore, the pixels Green 1 and Blue 1 maintain the respective pixel voltages Vlcd (G1+ and B1+, respectively) with help of the respective compensation capacities Cs until the scanning signal of the scanning line Gate 1 is turned on again in the next frame. As described above, the pixels Green 1 and Blue 1 are written with the gray scale signals G1+ and B1+, respectively, during this horizontal period.

In the next horizontal period, the pixels Red 1, Green 2 and Blue 2 are written with the gray scale signals R1−, G2−, B2−, respectively. In this horizontal period, the scanning signals on the scanning lines Gate 2 and Gate 3 is turned to High in synchronization with a start time T32a of the horizontal period. The period during which the scanning signal on the scanning line Gate 2 should remain at High is, for example, from the moment at which the gray scale signal G2− starts being applied to the signal line SG1 until just before the gray scale signal G2− ends. In other words, in this example, the above period starts from the leading edge of the gray scale signal B2− on the signal line SR1, and ends at the tailing edge of the gray scale signal R1− applied to SR1 after the gray scale signal B2−. The period during which the scanning signal on the scanning line Gate 3 should remain at High is, for example, from the moment at which the gray scale signal B2− starts being supplied to the signal line SR1 until just before the gray scale signal B2− ends. Here, the leading edge of the scanning signal on the scanning line Gate 3 may be started earlier in advance of T32a by a half of the horizontal period duration. FIG. 30 shows this offset period as "D_C."

At a time T32a, the thin film transistors 11b, 12a and 13b are all turned on as a result of turning the scanning signal on the scanning line Gate 2 to High as described above. The thin film transistors 11c, 12b and 13c are also turned on as a result of turning the scanning signal on the scanning line Gate 3 to High. Thus, the gray scale signal G2− applied to the signal line SG1 is written onto the pixels Green 2 and Green 3. In the pixel Green 2, the gray scale signal G1+ applied thereto in the previous horizontal period is now replaced with the appropriate gray scale signal G2−. At the same time, the gray scale signal B2− applied to the signal line SR1 is written onto the pixels Red 1, Red 2 and Blue 2. In the pixel Blue 2, the above-described applying state in which Blue 2 carries an arbitrary voltage determined by the previous data on Red2 and Blue2 is replaced with the appropriate gray scale signal B2− and therefore is now resolved. In the case, because the thin film transistor 12c is maintained in the OFF state although the thin film transistor 13c is in the ON state, there is no electrical connection between the signal line SR1 and the pixel Red 3. However, there exists an electrical connection between the pixels Red 3 and Blue 3, thereby allowing charge movements there between. Therefore, the pixels Red 3 and Blue 3 now carry the mean voltage value determined by the respective pixel voltages Vlcd applied thereto in the previous frame and the values of the compensation capacities Cs thereof. This state does not cause any problem in the displays because the state lasts only for a brief period and is resolved within approximately one horizontal period to two horizontal periods. (This is the same situation that occurred with respect to Red2 and Blue 2 in the previous horizontal period and that has been resolved, as explained just above.) Also, here, the pixel Green 3 is written with the gray scale signal G2− applied to the pixel Green 2. However, the display performance is likewise not affected because that state lasts only for a brief period and is resolved within approximately one horizontal period.

At a time T32b, while maintaining the scanning signal on the scanning line Gate 2 at High, the scanning signal on the scanning line Gate 3 is turned from High to Low. At the time T32b, the thin film transistor 12b is turned off while the thin film transistor 13b keeps the ON state. Therefore, the pixels Red 2 and Blue 2 are electrically connected with respect to each other, and are not connected to the signal line SR1. In this case, the pixel voltage Vlcd stored at the pixel Red 2 corresponds to the gray scale voltage B2− applied to the pixel Blue 2. However, the state does not cause any problem in the display because the state last only for a brief duration and is resolved within about one horizontal period duration. Here, the pixel Green 2 is still connected to the signal line SG1 that carries the gray scale signal G2− via the thin film transistor 11b, which is still on. Shortly after the time T32b, the gray scale signal applied to the signal line SR1 changes from the gray scale signal B2− for the pixel Blue 2 to the gray scale signal R1− to be applied to the pixel Red 1. Here, the scanning signal on the scanning line Gate 2 remains in the state of High (although the scanning signal on the scanning line 3 is turned to Low). Therefore the gray scale signal R1− applied newly to the signal line SR1 is written onto the pixel Red 1. Therefore, at the pixel Red 1, the above-described temporary state of having the gray scale signal B2− thereon is resolved and now is provided with the designed gray scale signal R1−. In this case, while the thin film transistor 12a is in the ON state so that the gray scale signal R1− is written onto the pixel Red 1, the gray scale signal R1− is not written onto the pixel Blue 1 again because the thin film transistor 13a had been turned off in the previous horizontal period.

At a time T32c, the scanning signal on the scanning line Gate 2 is turned from High to Low. At the time T32c, the thin film transistors 11b and 13b are turned off. Therefore, the pixels Green 2 and Blue 2 maintain the respective pixel voltages Vlcd (G2− and B2−, respectively) thereof with help of the respective compensation capacities Cs thereof until the scanning signal of the scanning line Gate 2 is turned to HIGH again in the next frame. In the horizontal period as described above, the pixels Red 1, Green 2 and Blue 2 are written with the gray scale signals R1−, G2− and B2−, respectively. In the subsequent horizontal periods, the display apparatus can perform similar writing operations with respect to the corresponding pixels based on video signals provided, thereby enabling excellent and efficient display of the appropriate vide images. In the third exemplary embodiment, while the red pixels (Red1, Red2, . . . ) receives the corresponding gray scale signal a little late as compared with the cases for green and blue pixels, such a delay (only about one horizontal period) is not noticeable to human eyes and accurate and desired displays of the image data are possible.

As described above, in the third exemplary embodiment, the number of signal lines and the number of output terminals in the source driver 320 can be significantly reduced while the number of scanning lines essentially remain the same by way of connecting pixels associated with one signal line to another group of pixels via an array(s) of thin film transistors. Thus, the pitch between terminals of the LSI for the source driver 320 can become wider, and the source driver 320 can be easily connected when mounting the source driver 320 on the display panel 310. In addition, the invention allows the LSI of the source driver 320 to be further miniaturized because the number of output terminals in the source driver 320 can be reduced. As a modification of the above example the blue pixel Blue i and the red pixel Red i can be exchanged. In such a case, pixel data for the red and blue displays input to the source driver 320 also need to be changed accordingly.

In the exemplary embodiment of FIG. 30, the polarity of voltage Vlcd applied to the pixels (i.e., the polarity of the voltage differential between the gray scale signal and the common signal) is reversed by the dot inversion scheme in which the polarity is reversed on a pixel-to-pixel basis. Alternatively, it is possible to employ the frame inversion scheme in which the bit data of the display data and the polarity of the common signal VCOM are reversed every frame. Furthermore, in the third exemplary embodiment, the pixel Green N used for the green display is not combined with the pixels used for the other color displays. Thus, the data writing time for the pixel Green N is full one horizontal period (1H), and therefore, the pixel Green N can be displayed with more fine-tuned gray scale as compared with the pixels for other color components. The reason why the pixel Green is constructed as described above is that because the spectral sensitivity of the human eyes is the highest in green, a high display quality can be achieved when the gray scale display of the green color component is appropriate while the gray scale displays of the red and blue color components is relatively inferior.

Figure 31:
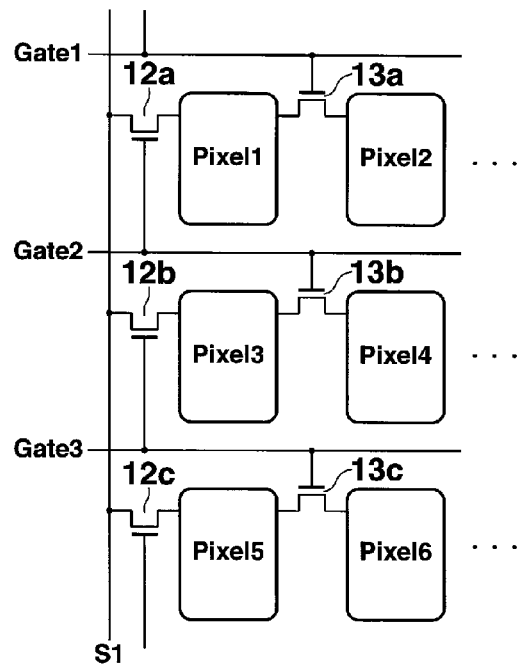
FIG. 31 is a figure showing an exemplary variation of the pixel location in the display apparatus of the third exemplary embodiment.
Figure 32:
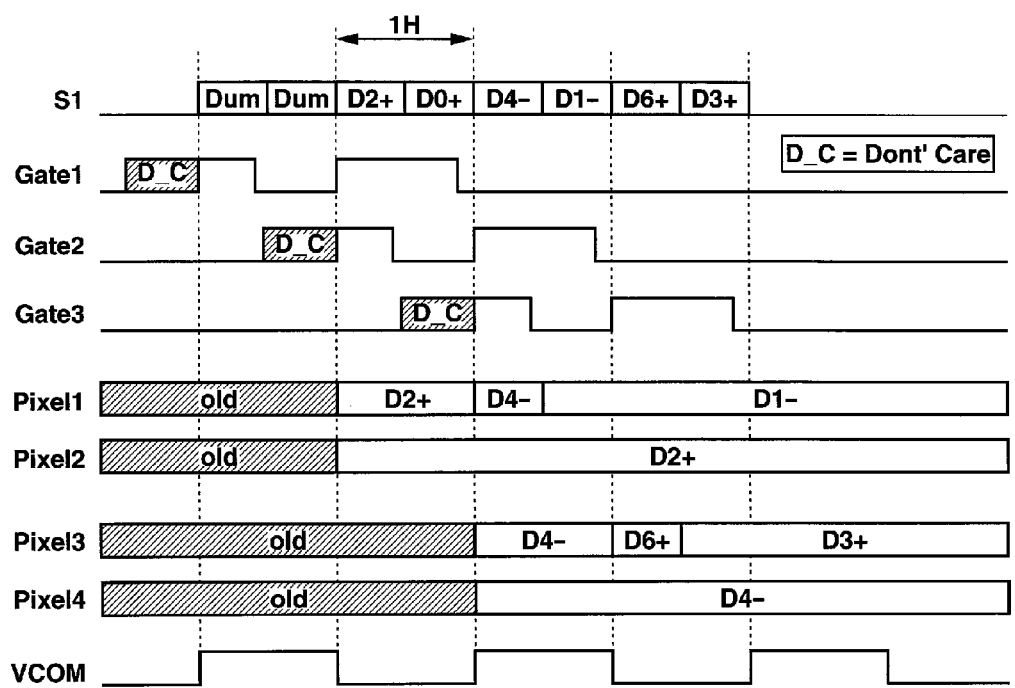
FIG. 32 is a timing chart showing an operation of the display apparatus in case of the pixel location of FIG. 31.

If the color components need not be considered, as shown in FIG. 31, for each of the signal lines, two adjacent pixels located in the extending direction of the scanning lines can be connected to a single common signal line via two TFTs (thin film transistors). In this case, the number of signal lines can be reduced to half the number of pixels in one row, and therefore, the number of signal lines can be reduced further as compared with the third exemplary embodiment described above. FIG. 32 is a timing chart showing an operation of the display apparatus in case of the pixel configuration of FIG. 31. As can be readily seen, the pixels Blue 1, Blue 2 and Blue 3 in FIG. 30 correspond to the pixels Pixel 2, Pixel 4 and Pixel 6 in FIG. 32, respectively, and the pixels Red 1, Red 2 and Red 3 in FIG. 30 correspond to Pixel 1, Pixel 3 and Pixel 5 in FIG. 32, respectively. The basic operation and idea for controlling the scanning lines Gate 1, Gate 2 and Gate 3 and the data writing operations are the same between FIG. 32 and FIG. 30.

Fourth Embodiment

Figure 33:
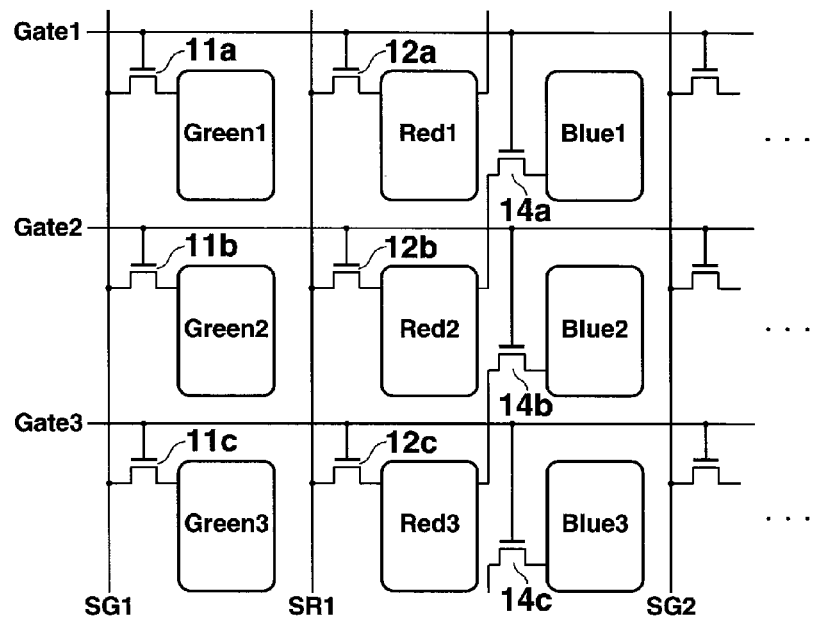
FIG. 33 is a figure showing a connecting structure of pixels in a display apparatus of the fourth exemplary embodiment.

A fourth exemplary embodiment of the invention will now be given. In the display apparatus 1d of the fourth exemplary embodiment, a connecting structure of pixels and the operation of the display apparatus are different from these in the third exemplary embodiment. Because the basic structure of the display apparatus 1d is the same as that shown in FIG. 27, the description is abbreviated. FIG. 33 is a figure showing a connecting structure of pixels in a display apparatus of the fourth exemplary embodiment. In FIG. 33, nine pixels in the display panel 310 are shown in a manner similar to FIG. 28. In the fourth exemplary embodiment, the scanning lines Gate 1, Gate 2 and Gate 3 and the signal lines SG1, SR1 and SG 2 are located so as to intersect with respect to each other (e.g., substantially at right angle). Adjacent to the respective intersections of the scanning lines Gate 1, Gate 2 and Gate 3 and the signal line SG1, there are provided the pixels Green 1, Green 2 and Green 3, respectively. The pixels Green 1, Green 2 and Green 3 are connected to the scanning lines Gate 1, Gate 2 and Gate 3, respectively, and the signal line SG1 via the thin film transistors 11a, 11b and 11c, respectively. More specifically, the pixels Green 1, Green 2 and Green 3 are connected to each drain (or source) of the thin film transistors 11a, 11b and 11c, respectively. The sources (or drains) of the thin film transistors 11a, 11b and 11c are connected to the signal line SG1, and the gates of the thin film transistors 11a, 11b and 11c are connected to the scanning lines Gate 1, Gate 2 and Gate 3, respectively.

Adjacent to the respective intersections of the scanning lines Gate 1, Gate 2 and Gate 3 and the signal line SR1, the pixels Red 1, Red 2 and Red 3 are located. The pixels Red 1, Red 2 and Red 3 are connected to the scanning lines Gate 1, Gate 2 and Gate 3, respectively, and to the signal line SR1 via the thin film transistors 12a, 12b and 12c, respectively. More specifically, the pixels Red 1, Red 2 and Red 3 are connected to the respective drains (or sources) of the thin film transistors 12a, 12b and 12c, respectively. The sources (or drains) of the thin film transistors 12a, 12b and 12c are connected to the signal line SR1. In addition, the pixels Red 2 and Red 3 are connected to the pixels Blue 1 and Blue 2, respectively, located one row above via the thin film transistors 14a and 14b, respectively. Specifically, the pixels Blue 1 and Blue 2 are connected to the respective drains (or sources) of the thin film transistors 14a and 14b, and the sources (or drains) of the thin film transistors 14a and 14b are connected to the respective drains (or sources) of the thin film transistors 12b and 12c via the pixels Red 2 and Red 3, respectively. The gates of the thin film transistors 11a, 12a, 14a are connected to the scanning line (a first scanning line) that is located on the upper side of the pixels associated thereto.

In the above-described structure, the scanning lines Gate 1, Gate 2 and Gate 3 are applied with the corresponding scanning signals from the gate driver 330. The signal line SG1 is applied with a gray scale signal related to the green display from the source driver 320, and the signal line SR1 is applied with a gray scale signal related to the blue display and a gray scale signal related to the red display by using time-sharing from the source driver 320. Therefore, in this example, the display panel 310 has a color arrangement in which same color pixels are disposed in columns (in the extending direction of signal lines) in a strip shape, and different color pixels alternate in the directions of rows, e.g., in the order of red, green and blue arranged in rows. The pixels used for the red display are connected to the respective pixels used for the blue display. However, the red pixel and the blue pixel so related are connected to differing scanning lines through the respective thin film transistors. Furthermore, the pixels used for green display are connected to the signal line that is different from the signal line that is connected to the pixels used for the red display. Even in the structure shown in FIG. 33, the number of scanning lines can be reduced to two-third of the number of pixels in one row. However the number of scanning lines needed essentially remains the same as the number of pixels in one column.

Figure 34:
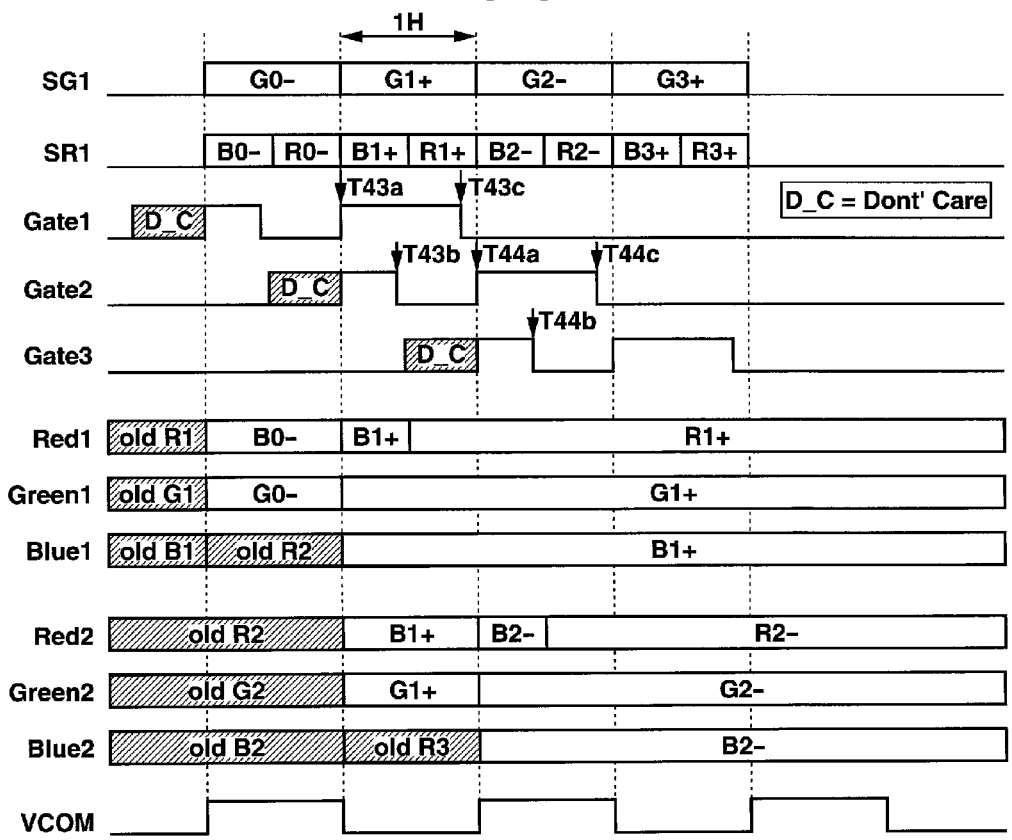
FIG. 34 is a timing chart showing an operation of the display apparatus of the fourth exemplary embodiment.

An operation of the display apparatus in the fourth exemplary embodiment will now be described. FIG. 34 is a timing chart showing an operation of the display apparatus according to the fourth exemplary embodiment. From the top, FIG. 34 shows; a gray scale signal applied to the signal line SG1, a gray scale signal applied to the signal line SR1, the scanning signal applied to the scanning line Gate 1, the scanning signal applied to the scanning line Gate 2, the scanning signal applied to the scanning line Gate 3, a display state of the pixel Red1, a display state of the pixel Green1, a display state of the pixel Blue1, a display state of the pixel Red2, a display state of the pixel Green2, a display state of the pixel Blue2. In the fourth exemplary embodiment, the pixel data related to the green display and the pixel data related to the red display or the blue display are input to the source driver 320 at the same timing. The pixel data related to the red and blue displays are alternately input to the source driver 320 every half horizontal period. That is to say, in a first half period of the horizontal period, the pixel data related to the blue display for that horizontal period is input, and in the last half period of the horizontal period, the pixel data related to the red display for that horizontal period is input. The reverse signal is controlled so as to reverse the bit data of the pixel data (that is, the polarity of the gray scale signal) related to the red, blue and green displays every horizontal period. The polarity of common signal VCOM is reversed in synchronization with the polarity reversal of the gray scale signal as shown in FIG. 34.

The gray scale signals B0−, R0−, B1+, R1+, B2−, R2−, . . ., for the blue and red displays are successively applied to the signal line SR1 in synchronization with the signal line SG 1 bearing the gray scale signal G0−, G1+, G2−, . . . , related to the green display for that particular frame, as shown in FIG. 34. The above-described inputs of gray scale signals are carried very frame. In this example, a dummy signal in the gray scale signals is not required as shown in FIG. 34. The pixels Green 1, Blue 1 and Red 1 connected to the scanning line Gate 1 and the pixels Green 2, Blue 2 and Red 2 connected to the scanning line Gate 2 will now be described. The pixels in other columns are controlled in a manner similar to the following descriptions.

In the fourth exemplary embodiment, the scanning signals input to the scanning lines are turned to High twice every frame. For each frame, during a prescribed horizontal period, the gray scale signals for the pixels Green 1, Red 1 and Blue 1 are written onto the respective pixels. At the beginning of the horizontal period, the scanning signals on the scanning line Gate 1 and the scanning line Gate 2 are turned to High in synchronization with a start time T43*a* of the horizontal period. The period during which the scanning signal on the scanning line Gate 1 should remain at High is, for example, from the moment at which the gray scale signal G1+ starts being supplied to the signal line SG1 until just before the gray scale signal G1+ ends. In this example, the above period begins from the moment at which the gray scale signal B1+ starts being supplied to the signal line SR1 until just before the gray scale signal R1+, which is provided after the gray scale signal B1+, ends in SR1. In this horizontal period, the period during which the scanning signal on the scanning line Gate 2 should remain at High is, for example, from the moment at which the gray scale signal B1+ starts being supplied to the signal line SR1 until just before the gray scale signal B1+ ends. The leading edge of the HIGH pulse of the scanning signal on the scanning line Gate 2 may be shifted to an earlier point in time in advance of the time T43*a* by a half of the horizontal period duration. FIG. 34 shows this period as "D_C."

At the time T43*a*, the thin film transistors 11*a*, 12*a* and 14*a* are all turned on as a result of turning the scanning signal on the scanning line Gate 1 to High. The thin film transistors 11*b*, 12*b* and 14*b* are also turned on as a result of turning the scanning signal on the scanning line Gate 2 to High. Thus, the gray scale signal G1+ applied to the signal line SG1 is written onto the pixels Green 1 and Green 2. At the same time, the gray scale signal B1+ applied to the signal line SR1 is written onto the pixels Red 1, Red 2 and Blue 1. In the case, because the thin film transistor 12*c* remains in the Off state although the thin film transistor 14*b* is on, the pixel Blue 2 is not affected and maintains the state that was established in the previous frame.

At a time T43*b*, while maintaining the scanning signal on the scanning line Gate 1 at High, the scanning signal on the scanning line Gate 2 is turned from High to Low. At the time T43*b*, the thin film transistor 12*b* is turned off while the thin film transistor 14*a* remains on. Therefore, the pixels Red 2 and Blue 1 are electrically connected with respect to each other, but are not connected to the signal line SR1. The pixel Blue 1 maintains the pixel voltage Vlcd established based on the gray scale signal B1+ thereafter. The pixel voltage Vlcd stored at the pixel Red 2 corresponds to the gray scale voltage B1+ applied to the pixel Blue 1. However, this state does not cause a problem in the display because the state lasts only for a brief period and is resolved within about one horizontal period to two horizontal periods as will be described later. The pixel Green 1 remains connected to the signal line SG1 and the gray scale signal G1+ is written thereon via the thin film transistor 11*a*.

Shortly after the time T43*b*, the gray scale signal applied to the signal line SR1 changes from the gray scale signal B1+ to the gray scale signal R1+, which is to be applied to the pixel Red 1. Therefore, the pixel Red 1 is written with the gray scale signal R1+ via the thin film transistor T12*a* that has been maintained in the ON state. At a time T43*c*, the scanning signal on the scanning line Gate 1 is turned from High to Low. Therefore, the pixels Green 1 and Blue 1 maintain the respective pixel voltages Vlcd (established based on G1+ and B1+, respectively) thereof with help of the respective compensation capacities Cs thereof until the respective corresponding thin film transistors are turned on again in the next frame. Accordingly, in the horizontal period as described above, the pixels Red 1, Green 1 and Blue 1 are written with appropriate gray scale signals R1+, G1+ and B1+, respectively.

In the next horizontal period, the pixels Green 2, Red 2 and Blue 2 are with corresponding gray scale signals. In this horizontal period, the scanning signals on the scanning lines Gate 2 and Gate 3 are turned to High in synchronization with a start time T44*a* of the horizontal period. The period during which the scanning signal on the scanning line Gate 2 should remain at High is, for example, from the moment at which the gray scale signal G2− starts being supplied to the signal line SG1 until just before the gray scale signal G2− ends. In other words, in this example, the period is from the start time of the gray scale signal B2− in signal line SR1 until just before the gray scale signal R2−, which appears after the gray scale signal B2−, ends. The period during which the scanning signal on the scanning line Gate 3 should remain at High is, for example, from the moment at which the gray scale signal B2− starts being supplied to the signal line SR1 until just before the gray scale signal B2− ends. In this case, the leading edge of the HIH pulse of the scanning line Gate 3 can be shifted to an earlier point in time in advance of the time T44*a* by a half of the horizontal period duration. FIG. 30 shows this period as "D_C." Because of this flexibility, as in the many similar cases described above, the pulse width the scanning signal can be adjusted to be the same, which is advantageous from the circuit design perspectives.

At the time T44*a*, the thin film transistors 11*b*, 12*b* and 14*b* are all turned on as a result of turning the scanning signal on the scanning line Gate 2 to High as described above. The thin film transistors 11*c*, 12*c* and 14*c* are also turned on as a result of turning the scanning signal of the scanning line Gate 3 to High. Thus, the gray scale signal G2− applied to the signal line SG1 is written onto the pixels Green 2 and Green 3. The gray scale signal B2− on the signal line SR1 is written onto the pixels Red 2, Red 3 and Blue 2. The pixel Blue 3 maintains the pixel voltage Vlcd established in the previous frame with help of the compensation capacity Cs thereof.

At a time T44*b*, while maintaining the scanning signal on the scanning line Gate 2 at High, the scanning signal on the scanning line Gate 3 is turned from High to Low. At the time T44*b*, the thin film transistor 12*c* is turned off while the thin film transistor 14*b* maintains its ON state. Therefore, the pixels Red 3 and Blue 2 are electrically connected with respect to each other, but are disconnected from the signal line SR1. The pixel Blue 2 maintains the pixel voltage Vlcd established based on the gray scale signal B2− thereafter. The pixel voltage Vlcd stored at the pixel Red 3 corresponds to the gray scale signal voltage B2− applied to the pixel Blue 2. However, that state does not cause any problem in the display because the state lasts only for a brief period and is resolved within about one horizontal period or so. The pixel Green 2 remains electrically connected to the signal line SG1 bearing the gray scale signal G2− via the thin film transistor 11b. Shortly after the time T44b, the gray scale signal applied to the signal line SR1 changes from the gray scale signal B2−, which was applied to the pixel Blue 2, to the gray scale signal R2−, which is to be applied to the pixel Red 2. Therefore, the pixel Red 2 is written with the gray scale signal R2− via the thin film transistor 12b, which remains On. Here, the thin film transistor 14a remains OFF because the scanning signal on the scanning line Gate1 remains at LOW. Therefore, the pixels Red 2 and Blue 1 are not electrically connected, and the respective pixels bear the respective pixel voltages Vlcd established based on the gray scale signals R2− and B1+, respectively.

At a time T44c, the scanning signal on the scanning line Gate 2 changes from High to Low. The pixels Green 2 and Blue 2 thereafter maintain the respective pixel voltages Vlcd that have been established based on G2− and B2− with help of the respective compensation capacities Cs thereof until the respective corresponding thin film transistors are turned on in the next frame. In the horizontal period as described above, the pixels Red 2, Green 2 and Blue 2 are written with the gray scale signals R2−, G2−, and B2−, respectively. In the subsequent horizontal periods, similar data writing operations are performed to the pixels so that the display apparatus can provide an appropriate video display in accordance with the video signal provided. As is clear form the above description, the number of signal line can be significantly reduced while essentially maintaining the number of the scanning lines.

In the connecting structure of pixels shown in FIG. 33, the blue pixels Blue N and the red pixels Red N can be exchanged. In such a case, the corresponding pixel data for the red and blue displays input to the source driver 320 need to be changed accordingly. In the above example, the polarity of voltage Vlcd applied to the pixels (the polarity of the voltage differential between the gray scale signal and the common signal) is reversed the a line inversion scheme in which the polarity is reversed every horizontal period. Alternatively, the frame inversion method in which the bit data of the pixel data and the polarity of the common signal Vcom is reversed every frame.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents. In particular, although the present invention has been described with reference to the first and fourth embodiments and their various modifications above, it is apparent to those having ordinary skill in the art that part or all of some of the embodiments described herein can be combined with pat or all of the other embodiment(s) depending on the product needs and specifications.

What is claimed is:

1. A display apparatus, comprising:
a substrate;
a first scanning line formed on the substrate and disposed in a first direction;
a second scanning line disposed on the substrate in parallel with the first scanning line to accompany the first scanning line;
a first signal line disposed on the substrate so as to cross the first and second scanning lines;
a first switching element formed on the substrate, the first switching element having: a first gate electrode; a gate insulating film covering said first gate electrode; a first semiconductor layer formed on the gate insulating film; and a first source electrode and a first drain electrode formed on the first semiconductor layer, one of the first source electrode and the first drain electrode being connected to said first signal line, the first gate electrode being connected to said first scanning line;
a second switching element formed on the substrate, the second switching element having: a second gate electrode; said gate insulating film covering said second gate electrode; a second semiconductor layer formed on the gate insulating film; and a second source electrode and a second drain electrode formed on the second semiconductor layer, one of the second source electrode and the second drain electrode being connected to the other one of the first source electrode and the first drain electrode of said first switching element, the second gate electrode being connected to said second scanning line;
a first pixel electrode connected to said other one of the first source electrode and the first drain electrode of said first switching element so that the first pixel electrode is applied with a gray scale signal that is supplied to the first signal line under control of the first switching element; and
a second pixel electrode connected to the other one of the second source electrode and the second drain electrode of said second switching element so that the second pixel electrode is applied with a gray scale signal that is applied to the first signal line through said first pixel electrode under control of the first switching element and the second switching element;
a first auxiliary capacitance line formed on the substrate opposite to said first pixel electrode;
a second auxiliary capacitance line formed on the substrate opposite to said second pixel electrode;
an interconnection line that connects said other one of the first source electrode and the first drain electrode of said first switching element to said one of the second source electrode and the second drain electrode of said second switching element,
wherein said first auxiliary capacitance line and said second auxiliary capacitance line are formed in a same layer as said first and second gate electrodes, and are covered by said gate insulating film, and
wherein said interconnection line is formed on said gate insulating film so as to overlap said first auxiliary capacitance line and said second auxiliary capacitance line through said gate insulting film.

2. The display apparatus according to claim 1, wherein the first and second pixel electrodes are respectively disposed on different sides of the first scanning line or on different sides of the second scanning line.

3. The display apparatus according to claim 1, wherein the first and second pixel electrodes are disposed in different rows.

4. The display apparatus according to claim 1, further comprising:

a source driver providing the first signal line with the gray scale signal for the first pixel electrode after providing the first signal with the gray scale signal for second pixel electrode; and a gate driver applying a scanning signal for turning on the second switching element to the second scanning line and applying a scanning signal for turning on the first switching element to the first scanning line when the gray scale signal for the second pixel electrode is supplied to the first signal line from the source driver, the gate driver applying a scanning signal for turning off the second switching element to the second scanning line and applying the scanning signal for turning on the first switching element to the first scanning line when the gray scale signal for the first pixel electrode is applied to the first signal line from the source driver.

5. The display apparatus according to claim 1, wherein the second pixel electrode is disposed between the first and second scanning lines.

6. The display apparatus according to claim 1, wherein the first and second pixel electrodes are disposed on one side of the first signal line.

7. The display apparatus according to claim 1, further comprising:

a second signal line disposed in parallel with the first signal line; and a third pixel electrode connected to the second signal line via a third switching element, the third switching element being connected to and controlled by the second scanning line so that the third pixel electrode is applied with a gray scale signal on the second signal line under control of the third switching element.

8. The display apparatus according to claim 7, wherein the first pixel electrode is used for one of a red display and a blue display, the second pixel electrode is used for the other one of the red and blue displays, and the third pixel electrode is used for a green display.

9. The display apparatus according to 7, wherein the third pixel electrode is disposed between the first and second signal lines.

10. A display apparatus, comprising:

a first scanning line disposed in a first direction;

a signal line crossing the first scanning line;

a first pixel located adjacent to an intersection of the first scanning line and the signal line, the first pixel having a first pixel electrode; and a second pixel having a second pixel electrode, the second pixel electrode being applied with a gray scale signal applied to the signal line via the first pixel, wherein the first pixel is connected to the signal line via a first switching element that is connected to the first scanning line intersecting with the signal line, and the second pixel electrode is connected to the signal line via the first switching element, an interconnection line, and a second switching element that is connected to a second scanning line different from the first scanning line connected to the first switching element;

a first auxiliary capacitance line opposite to said first pixel electrode;

a second auxiliary capacitance line opposite to said second pixel electrode, wherein said first switching element includes: a first gate electrode; a gate insulating film covering said first gate electrode; a first semiconductor layer formed on the gate insulating film; and a first source electrode and a first drain electrode formed on the first semiconductor layer, one of the first source electrode and the first drain electrode is connected to said signal line, the other one of the first source electrode and the first drain electrode is connected to the first pixel electrode and to one end of the interconnection line, and the first gate electrode is connected to said first scanning line, wherein said second switching element includes: a second gate electrode; said gate insulating film covering said second gate electrode; a second semiconductor layer formed on the gate insulating film; and a second source electrode and a second drain electrode formed on the second semiconductor layer, one of the second source electrode and the second drain electrode is connected to the other end of the interconnection line, the other one of the second source electrode and the second drain electrode is connected to the second pixel electrode, and the second gate electrode is connected to said second scanning line, wherein said first auxiliary capacitance line and said second auxiliary capacitance line are formed in a same layer as said first and second gate electrodes, and are covered by said gate insulating film, and wherein said interconnection line is formed on said gate insulating film so as to overlap said first auxiliary capacitance line and said second auxiliary capacitance line through said gate insulting film.

11. The display apparatus according to claim 10, further comprising:

a source driver configured to apply a gray scale signal for the first pixel to the signal line after applying a gray scale signal for the second pixel to the signal line; and a gate driver configured to apply a scanning signal for turning on the second switching element to the scanning line connected to the second switching element while applying a scanning signal for turning on the first switching element to the scanning line connected to the first switching element when the gray scale signal for the second pixel is applied to the signal line from the source driver, and configured to apply a scanning signal for turning on the second switching element to the scanning line connected to the second switching element while applying a scanning signal for turning off the first switching element to the scanning line connected to the first switching element when the gray scale signal for the first pixel is applied to the signal line.

12. A display apparatus, comprising:

a first scanning line disposed in a first direction;

a signal line crossing the first scanning line;

a first pixel located adjacent to an intersection of the first scanning line and the signal line, the first pixel having a first pixel electrode;

a second pixel applied with a gray scale signal applied to the signal line via the first pixel, the second pixel having a second pixel electrode;

a first auxiliary capacitance line opposite to said first pixel electrode;

a second auxiliary capacitance line opposite to said second pixel electrode, wherein the first pixel is connected to the signal line via a first switching element that is connected to the first scanning line at an intersection with the signal line, and is connected to the second pixel via an interconnection line and via a second switching element that is connected to a second scanning line different from the first scanning line connected to the first switching element, wherein said first switching element includes: a first gate electrode; a gate insulating film covering said first gate electrode; a first semiconductor layer formed on the gate insulating film; and a first source electrode and a first drain electrode formed on the first semiconductor film, one of the first source electrode and the first drain electrode is connected to said signal line, the other one of the first source electrode and the first drain electrode is connected to the first pixel electrode and to one end of the interconnection line, and the first gate electrode is connected to said first scanning line, wherein said second switching element includes: a second gate electrode; said gate insulating film covering said second gate electrode; a second semiconductor layer formed on the gate insulating film; and a second source electrode and a second drain electrode formed on the second semiconductor layer, one of the second source electrode and the second drain electrode is connected to the other end of the interconnection line, the other one of the second source electrode and the second drain electrode is connected to the second pixel electrode, and the second gate electrode is connected to said second scanning line, wherein said first auxiliary capacitance line and said second auxiliary capacitance line are formed in a same layer as said first and second gate electrodes, and are covered by said gate insulating film, and wherein said interconnection line is formed on said gate insulating film so as to overlap said first auxiliary capacitance line and said second auxiliary capacitance line through said gate insulting film.

13. The display apparatus according to claim 12, further comprising:
  a source driver configured to apply a gray scale signal for the first pixel to the signal line after applying a gray scale signal for the second pixel to the signal line; and
  a gate driver configured to apply a scanning signal for turning on the second switching element to the scanning line connected to the second switching element and applying a scanning signal for turning on the first switching element to the scanning line connected to the first switching element when the gray scale signal for the second pixel is applied to the signal line from the source driver, and the gate driving applying a scanning signal for turning off the second switching element to the scanning line connected to the second switching element while applying a scanning signal for turning on the first switching element to the scanning line connected to the first switching element when the gray scale signal for the first pixel is applied to the signal line from the source driver.

* * * * *